US012112936B2

(12) United States Patent

Jarrold et al.

(10) Patent No.: US 12,112,936 B2

(45) Date of Patent: Oct. 8, 2024

(54) APPARATUS AND METHOD FOR PULSED MODE CHARGE DETECTION MASS SPECTROMETRY

(71) Applicant: THE TRUSTEES OF INDIANA UNIVERSITY, Bloomington, IN (US)

(72) Inventors: Martin F. Jarrold, Bloomington, IN (US); Aaron A. Todd, Bloomington, IN (US)

(73) Assignee: THE TRUSTEES OF INDIANA UNIVERSITY, Bloomington, IN (US)

(*) Notice: Subject to any disclaimer, the term of this patent is extended or adjusted under 35 U.S.C. 154(b) by 250 days.

(21) Appl. No.: 17/760,501

(22) PCT Filed: Sep. 22, 2020

(86) PCT No.: PCT/US2020/052009

§ 371 (c)(1),
(2) Date: Mar. 15, 2022

(87) PCT Pub. No.: WO2021/061650

PCT Pub. Date: Apr. 1, 2021

(65) Prior Publication Data

US 2022/0344145 A1 Oct. 27, 2022

Related U.S. Application Data

(60) Provisional application No. 62/905,921, filed on Sep. 25, 2019.

(51) Int. Cl.
*H01J 49/42* (2006.01)
*H01J 49/40* (2006.01)

(52) U.S. Cl.
CPC ........ *H01J 49/4245* (2013.01); *H01J 49/406* (2013.01); *H01J 49/4265* (2013.01)

(58) Field of Classification Search
CPC ... H01J 49/4245; H01J 49/4265; H01J 49/406
See application file for complete search history.

(56) References Cited

U.S. PATENT DOCUMENTS 3,019,168 A 1/1962 Taylor
5,285,063 A 2/1994 Schwartz et al.
(Continued)

FOREIGN PATENT DOCUMENTS

CN 103493173 A 1/2014
JP 11144675 5/1999
(Continued)

OTHER PUBLICATIONS

PCT International Search Report and Written Opinion completed by the ISA/US on Oct. 11, 2021 and issued in connection with PCT/US2021/034480.
(Continued)

*Primary Examiner* — David E Smith

(74) *Attorney, Agent, or Firm* — Barnes & Thornburg LLP

(57) ABSTRACT

A charge detection mass spectrometer includes an ion trap configured to receive and store ions therein and to selectively release stored ions therefrom, and an electrostatic linear ion trap (ELIT) spaced apart from the ion trap, the ELIT including first and second ion mirrors and a charge detection cylinder positioned therebetween, and means for selectively controlling the ion trap to release at least some of the stored ions therefrom to travel toward and into the ELIT, and for controlling the first and second ion mirrors in a manner which traps in the ELIT a single one of the ions traveling therein and causes the trapped ion to oscillate back and forth between the first and second ion mirrors each time passing through and inducing a corresponding charge on the charge detection cylinder.

17 Claims, 20 Drawing Sheets

(56) References Cited

U.S. PATENT DOCUMENTS

| | | | |
|---|---|---|---|
| 5,478,745 | A | 12/1995 | Samulski |
| 5,572,025 | A | 11/1996 | Cotter |
| 5,770,857 | A | 6/1998 | Fuerstenau et al. |
| 5,863,541 | A | 1/1999 | Samulski et al. |
| 5,869,248 | A | 2/1999 | Yuan et al. |
| 5,877,022 | A | 3/1999 | Stinchcomb et al. |
| 5,880,466 | A | 3/1999 | Benner |
| 5,882,652 | A | 3/1999 | Valdes et al. |
| 5,886,346 | A | 3/1999 | Makarov |
| 5,905,040 | A | 5/1999 | Mazzara et al. |
| 5,916,563 | A | 6/1999 | Young et al. |
| 5,965,358 | A | 10/1999 | Carrion et al. |
| 6,013,487 | A | 1/2000 | Mitchell |
| 6,083,702 | A | 7/2000 | Mitchell et al. |
| 6,156,303 | A | 12/2000 | Russell et al. |
| 6,183,950 | B1 | 2/2001 | Madonna |
| 6,583,408 | B2 | 6/2003 | Smith et al. |
| 6,744,042 | B2 | 6/2004 | Zajfman et al. |
| 6,753,523 | B1 | 6/2004 | Whitehouse |
| 6,888,130 | B1 | 5/2005 | Gonin |
| 7,314,912 | B1 | 1/2008 | Hallek et al. |
| 7,829,842 | B2 | 11/2010 | Makarov |
| 8,294,085 | B2 | 10/2012 | Ding |
| 8,395,112 | B1 | 3/2013 | Bier |
| 8,409,870 | B2 | 4/2013 | Van Wuijckhuijse |
| 8,766,170 | B2 | 7/2014 | Guna et al. |
| 9,095,793 | B2 | 8/2015 | Flagan |
| 9,472,390 | B2 | 10/2016 | Verenchikov et al. |
| 10,056,244 | B1 | 8/2018 | Quarmby et al. |
| 2002/0185606 | A1 | 12/2002 | Smith et al. |
| 2003/0155502 | A1 | 8/2003 | Grosshans et al. |
| 2004/0169137 | A1 | 9/2004 | Westphall et al. |
| 2005/0236375 | A1 | 10/2005 | Gefter et al. |
| 2007/0102634 | A1 | 5/2007 | Frey et al. |
| 2007/0254352 | A1 | 11/2007 | Schaffer et al. |
| 2009/0020694 | A1 | 1/2009 | Flory |
| 2009/0057553 | A1 | 3/2009 | Goodenowe |
| 2009/0078866 | A1 | 3/2009 | Li et al. |
| 2009/0108194 | A1 | 4/2009 | Page et al. |
| 2009/0294641 | A1 | 12/2009 | Konicek et al. |
| 2009/0294655 | A1 | 12/2009 | Ding et al. |
| 2010/0084549 | A1 | 4/2010 | Ermakov et al. |
| 2010/0084552 | A1 | 4/2010 | Kawana |
| 2010/0090102 | A1 | 4/2010 | Rather et al. |
| 2010/0227310 | A1 | 9/2010 | Manalis et al. |
| 2010/0234837 | A1 | 9/2010 | Alfano |
| 2010/0314538 | A1 | 12/2010 | Makarov et al. |
| 2010/0320377 | A1 | 12/2010 | Cotter |
| 2011/0095175 | A1 | 4/2011 | Bateman |
| 2011/0240845 | A1 | 10/2011 | Ding et al. |
| 2012/0112056 | A1 | 5/2012 | Brucker et al. |
| 2012/0282641 | A1 | 11/2012 | Reilly et al. |
| 2013/0124099 | A1 | 5/2013 | Ecker et al. |
| 2013/0175440 | A1 | 7/2013 | Perelman et al. |
| 2013/0200261 | A1 | 8/2013 | Mizutani et al. |
| 2013/0234017 | A1 | 9/2013 | Kaltashov et al. |
| 2013/0327934 | A1 | 12/2013 | Makarov et al. |
| 2014/0197333 | A1 | 7/2014 | Jolliffe et al. |
| 2014/0346344 | A1 | 11/2014 | Chen |
| 2015/0008316 | A1 | 1/2015 | Guna |
| 2015/0021472 | A1 | 1/2015 | Makarov |
| 2015/0325425 | A1 | 11/2015 | Makarov |
| 2015/0331000 | A1 | 11/2015 | Collier et al. |
| 2016/0005580 | A1 | 1/2016 | Grinfeld |
| 2016/0035556 | A1 | 2/2016 | Berkout et al. |
| 2016/0181084 | A1 | 6/2016 | Smith |
| 2016/0336165 | A1 | 11/2016 | Guna |
| 2017/0040152 | A1 | 2/2017 | Makarov |
| 2017/0307565 | A1 | 10/2017 | Clemmer et al. |
| 2017/0372883 | A1 | 12/2017 | Verenchikov |
| 2020/0243317 | A1 | 7/2020 | Lopez-Hilfiker et al. |
| 2020/0357626 | A1 | 11/2020 | Jarrold et al. |

FOREIGN PATENT DOCUMENTS

| | | | | | |
|---|---|---|---|---|---|
| JP | 2008186730 | A | | 8/2008 | |
| JP | 2011523172 | A | | 8/2011 | |
| JP | 2014501429 | A | | 1/2014 | |
| WO | 1998011244 | A1 | | 3/1998 | |
| WO | 1999061601 | A1 | | 12/1999 | |
| WO | 2000028004 | A1 | | 5/2000 | |
| WO | 2000028061 | A1 | | 5/2000 | |
| WO | 2001092551 | A2 | | 5/2001 | |
| WO | 2003042704 | A1 | | 5/2003 | |
| WO | 2006130474 | A2 | | 12/2006 | |
| WO | 2010135830 | A1 | | 12/2010 | |
| WO | 2012080352 | A1 | | 6/2012 | |
| WO | 2012083031 | A1 | | 6/2012 | |
| WO | 2012/116765 | A1 | | 9/2012 | |
| WO | 2012145037 | A1 | | 10/2012 | |
| WO | 2016073850 | A1 | | 5/2016 | |
| WO | 2017162779 | A1 | | 9/2017 | |
| WO | 2017190031 | A1 | | 11/2017 | |
| WO | WO-2018217778 | A1 | * | 11/2018 | ........... G01N 27/624 |
| WO | 2019118242 | A1 | | 6/2019 | |
| WO | WO-2019140233 | A1 | * | 7/2019 | .......... H01J 49/0036 |
| WO | 2019231854 | A1 | | 12/2019 | |

OTHER PUBLICATIONS

Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.

Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.

Kiss et al. "Size, weight and position: ion mobility spectrometry and imaging MS combined", Anal Bioanal Chem. 2011. 399: pp. 2623-2634, especially: p. 2626, col. 1, para 1.

Office Action and Search Report for CN patent application No. 201980051696.1, dated Sep. 25, 2023. (translation appended).

Japanese Office Action dispatched Jan. 18, 2023 for 2020-568469—16 pages (References 1, 2, 3 and 5 , and prior art document JP 2010-515210 English equivalent US 2013/327934A1, cited in this document have been previously submitted).

Japanese Office Action dispatched Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).

PCT International Search Report and Written Opinion completed by the ISA/US on Nov. 23, 2020 and issued in connection with PCT/US2020/052009.

Japanese Office Action dispatched Jan. 24, 2023 for co-pending application 2021-527871—4 pages (Prior art reference Alexander Makarov has been previously submitted).

Japanese Office Action dispatched Jan. 6, 2023 for application 2020-568366—9 pages (References 1 and 2 and the Doussineau article cited in this document have been previously submitted).

Chiorini, John A., et al. "Cloning of Adeno-Associated Virus Type 4 (MV4) and Generation of Recombinant MV4 Particles",Journal of Virology, vol. 71, pp. 6823-6833 (Sep. 1997).

Chiorini, John A., "Cloning and Characterization of Adeno-Associated Virus Type 5", Journal of Virology, vol. 73, DP-1309-1319 (Feb. 1999).

Chernushevich, et al., Collisional cooling of large ions in electrospray mass spectrometry. Anal. Chem 76. H54-1760 (2004).

Cleves, Ann E., "Protein transport: The nonclassical ins and outs", Current Biology, vol. 7, No. 5, pp. 318-320 (1997).

Contino, Nathan Colby, "Ion trap charge detection mass spectrometry: Lowering limits of detection and improving signal to noise", ISBN: 9781303535048, Jul. 30, 2013 (Jul. 30, 2013).

(56) References Cited

OTHER PUBLICATIONS

Ding, et al., A simulation study of the digital ion trap mass spectrometer. Int. J. Mass Spectrom. 221, 117-138 (2002).
Ding, et al, A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., et al. "The FUNPET—a New Hybrid lon Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Emerson, S., et al. "Hepatitis E Virus", Virology, vol. 2, Chapter 70; (4th ed., Lippincott-Raven Publishers).
Fields, Bernard, et al. "Parvoviridae: The Viruses and Their Replication" Virology, vol. 2, Chapter 69, pp. 2327-2359; 4th ed., Lippincott-Raven Publishers).
Fuerstenau, et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human Gene Therap", .; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids", .; Molecular Therapy, vol. 3, No. 6, pp. 964-975 (Jun. 2001).
Grinfeld, Dmitry, et al. "Space-Charge Effects in an Electrostatic Multireflection Ion Trap", European Journal of Mass Spectrometry, vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David et al., "Charge Detection Mass Spectrometry of Bacteriophage P22 Procapsid Distributions Above 20MDa", Rapid Communications in Mass Spectrometry, vol. 28, No. 5.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied o digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Mori, Seiichiro, Mori, et al. "Two novel adeno-associated viruses from cynomolgus monkey: pseudotyping characterization of capsid protein", Virology 330, pp. 375-383 (2004).
Miyamura, K., et al. "Parvovirus Particles as Platforms for Protein Presentation", National Academy of Sciences, vol. 1, No. 18,pp. 8507-8511 (Aug. 30, 1994).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Padron, Eric, et al. "Structure of Adeno-Associated Virus Type 4", Journal of Virology, vol. 79, No. 8, pp. 5047-5058 Apr. 2005).
Puttaraju, M., et al. "Spliceosome-mediated RNA trans-splicing as a tool for gene therapy", Nature Biotechnology, vol. 17, pp. 246-252 (Mar. 1999).
Nie et al., Frequency scan of a quadrupole mass analyzer in the third stability region for protein analysis. J. Chin. Chem_ Soc., 53, 47-52 (2006).
Kosaka, Nobuyoshi, et al., "Versatile roles of extracellular vesicles in cancer," J Clin Invest. 2016;126(4):1163-1172. https://doi.org/10.1172/JCI81130.
Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).

(56) References Cited

OTHER PUBLICATIONS

Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.

Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.

Pierson, Elizabeth, "Charge Detection Mass Spectrometry: Instrumentation & Applications to Viruses", Proquest Dissertations and Theses; Thesis (Ph.D.) vol. 76-09(E), Section: B. 168.

Richards et al., A new operating mode for the quadrupole mass filler. Int. J. Mass Spectrom. Ion Phys. 12, 317-339 1973).

Richards et al., Waveform parameter tolerances for the quadrupole mass filler with rectangular excitation. Int. J. Mass Spectrom. Ion Phys_ 15, 417-428 (1974).

Schlunegger et al., Frequency scan for the analysis of high mass ions generated by matrix-assisted laser esorption/ionization in a Paul trap_ Rapid Commun. Mass Spectrom. 13, 1792-1796 (1999).

Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.

Shinholt, Deven L., et al., "A Frequency and Amplitude Scanned Quadrupole Mass Filter for the Analysis of High m/z Ions", Review of Scientific Instruments 85, 113109 (2014); accepted Oct. 17, 2014; published online Nov. 21, 2014).

Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.

Sobott et al., A tandem mass spectrometer for improved transmission and analysis of large macromolecular Assemblies. Anal. Chem. 74, 1402-1407 (2002).

Syed, et al., Quadrupole mass filler: Design and performance for operation in stability zone 3. J. Am. Soc. Mass Spectrom. 24, 1493-1500 (2013).

Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).

Sharp, Phillip A., et al. "RNA Interference", American Association for the Advancement of Science; Science, New Series, vol. 287, No. 5462, pp. 2431-2433 (Mar. 31, 2000).

Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).

Srivastava, Arun, et al., "Nucleotide Sequence and Organization of the Adena-Associated Virus 2 Genome", Journal of Virology, vol. 45, No. 2, pp. 555-564 (Feb. 1983).

Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).

Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.

Walters, Robert W., "Structure of Adeno-Associated Virus Serotype 5", Journal of Virology, vol. 78, No. 7, pp. B361-B3371 (Apr. 2004).

Winger, Brian E., et al., "Observation and Implications of High Mass-to-Charge Ratio Ions from Electrospray Ionization Mass Spectrometry," 1993 American Society for Mass Spectrometry 4, 536-545.

Wang, Lei, et al., "Expanding the Genetic Code", Annual Review of Biophysics and Biomolecular Structure, vol. 35, pp. 25-249 (2006).

Weiss, Victor U., et al, "Analysis of a Common Cold Virus and Its Subviral Particles by Gas-Phase Electrophoretic Mobility Molecular Analysis and Native Mass Spectrometry", Anal Chem. 2015.

Wright, J. Fraser, "Product-Related Impurities in Clinical-Grade Recombinant AAV Vectors: Characterization and Risk Assessment", Biomedicines 2014, 2, 80-97.

Xie, Qing, et al., "Canine Parvovirus Capsid Structure, Analyzed at 2.9 A Resolution", Journal of Molecular Biology, vol. 64, pp. 497-520 (1996).

Xie, Qing, et al., "The atomic structure of adeno-associated virus (MV-2), a vector for human gene therapy", PNAS, vol. 99, No. 16, pp. 10405-10410 (Aug. 6, 2002).

Xiao, Weidong, et al., "Gene Therapy Vectors Based on Adena-Associated Virus Type 1", Journal of Virology, vol. 73, No. 5, pp. 3994-4003 (May 1999).

Uetrecht et al., "Stability and Shape of Hepatitis B Virus Capsids in Vacuo", Angew. Chem. Int. Ed. 2008, 47, 6247-6251.

Uetrecht et al., "High-resolution mass spectrometry of viral assemblies: Molecular composition and stability of dimorphic hepatitis B virus capsids", PNAS 2008, vol. 105, 9216-9920.

Xiong, et al., The development of charge detection-quadrupole ion trap mass spectrometry driven by rectangular and riangularwaves, Analyst 137, 1199-1204 (2012).

Yang, et al., Development of a palm portable mass spectrometer. J. Amer. Soc. Mass Spec. 19, 1442-1448 (2008).

Yost, et al., Selected ion fragmentation with a tandem quadrupole mass spectrometer. J. Am. Chem. Soc. 100, 274-2275 (1978).

Bioconjugate Techniques; Hermanson;Academic Press, 1st Edition (1996), (book reference, chapter guide attached; book/specific chapter(s) to be made available upon request).

European Office Action dated Sept. 2, 2021 for application 19 707 901.5—5 pages.

Japanese Office Action dispatched Feb. 17, 2023 for application 2020-568389—11 pages.

European Office Action issued Mar. 3, 2023 for application 19732193. 8—14 pages.

Extended European search report for counterpart EP application No. 20869925.6, dated Nov. 27, 2023.

PCT International Search Report and Written Opinion completed by the ISA/US on Jan. 12, 2016 and issued in connection with PCT/US2015/059463.

PCT International Search Report and Written Opinion completed by the ISA/US on Jun. 19, 2017 and issued in connection with PCT/US2017/030163.

PCT International Search Report and Written Opinion completed by the ISA/EP on Feb. 14, 2019 and issued in connection with PCT/US2018/051944.

PCT International Search Report and Written Opinion completed by the ISA/EP on Apr. 18, 2019 and issued in connection with PCT/US2019/013251.

PCT International Search Report and Written Opinion completed by the ISA/EP on Apr. 16, 2019 and issued in connection with PCT/US2019/013274.

PCT International Search Report and Written Opinion completed by the ISA/EP on Mar. 27, 2019 and issued in connection with PCT/US2019/013277.

PCT International Search Report and Written Opinion completed by the ISA/EP on Jul. 24, 2019 and issued in connection with PCT/US2019/013278.

PCT International Search Report and Written Opinion completed by the ISA/EP on Sep. 9, 2019 and issued in connection with PCT/US2019/013279.

PCT International Search Report and Written Opinion completed by the ISA/EP on Mar. 28, 2019 and issued in connection with PCT/US2019/013280.

PCT International Search Report and Written Opinion completed by the ISA/EP on Aug. 27, 2019 and issued in connection with PCT/US2019/013281.

PCT International Search Report and Written Opinion completed by the ISA/EP on Mar. 27, 2019 and issued in connection with PCT/US2019/013283.

(56) References Cited

OTHER PUBLICATIONS

PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/035381.
PCT International Search Report and Written Opinion completed by the ISA/EP on Sep. 9, 2019 and issued in connection with PCT/US2019/035379.
PCT International Search Report and Written Opinion completed by the ISA/US on Jan. 24, 2021 and issued in connection with PCT/US2020/054975.
PCT International Search Report and Written Opinion completed by the ISA/EP on Mar. 8, 2021 and issued in connection with PCT/US2020/065300.
PCT International Search Report and Written Opinion completed by the ISA/EP on Mar. 8, 2021 and issued in connection with PCT/US2020/065301.
PCT International Search Report and Written Opinion completed by the ISA/US on Mar. 18, 2021 and issued in connection with PCT/US2021/016325.
PCT International Search Report and Written Opinion completed by the ISA/US on Apr. 5, 2021 and issued in connection with PCT/US2021/016435.
PCT International Search Report and Written Opinion completed by the ISA/EP on Jul. 14, 2020 and issued in connection with PCT/US2020/029287.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro ion impact on solid surfaces. Nucl. Instrum. Methods. 170, 309-315 (1980).
Beuhler, et al., A study of the formation of high molecular weight water cluster ions (m/e < 59000) in expansion of onized gas mixtures, J. Chem. Phys. 77, 2549-2557 (1982).
Botamanenko, Daniel, et al., "Ion-Ion Interactions in Charge Detection Mass Spectrometry", J Am Soc Mass Spectrom. Dec. 2019 ; 30(12): 2741-2749. doi:10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, Brooke Ann, et al., "Charge Detection Mass Spectrometry Measurements of Exosomes and other Extracellular Particles Enriched from Bovine Milk" Anal. Chem., Just Accepted Manuscript • DOI: 10.1021/acs.analchem.9b05173 • Publication Date (Web): Jan. 28, 2020 Downloaded from pubs.acs.org on Jan. 30, 2020.
Brown, C., et al. "Chimeric Parvovirus B19 Capsids for the Presentation of Foreign Epitope",; Virology 198, pp. 477-488 (1994).
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
Japanese Office Action dispatched Jan. 31, 2023 for co-pending application 2020-568364—9 pages.
Official Action for counterpart CN Application No. 202080081713.9, dated Jul. 19, 2024.
English translation of an Office Action and Search Report for CN Application No. 202080081713.9, dated Jul. 19, 2024.

* cited by examiner

APPARATUS AND METHOD FOR PULSED MODE CHARGE DETECTION MASS SPECTROMETRY

CROSS-REFERENCE TO RELATED APPLICATIONS

This patent application is a U.S. national stage entry of PCT Application No. PCT/US2020/052009, filed Sep. 22, 2020, which claims the benefit of and priority to U.S. Provisional Patent Application No. 62/905,921, filed Sep. 25, 2019, the disclosures of which are expressly incorporated herein by reference in their entireties.

GOVERNMENT RIGHTS

This invention was made with government support under GM131100 awarded by the National Institutes of Health. The government has certain rights in the invention.

FIELD OF THE INVENTION

The present invention relates generally to charge detection mass spectrometry instruments, and more specifically to apparatuses and methods for conducting pulsed mode operation of such instruments.

BACKGROUND

Mass Spectrometry provides for the identification of chemical components of a substance by separating gaseous ions of the substance according to ion mass and charge. Various instruments and techniques have been developed for determining the masses of such separated ions, and one such technique is known as charge detection mass spectrometry (CDMS). In CDMS, ion mass is determined as a function of measured ion mass-to-charge ratio, typically referred to as "m/z," and measured ion charge.

High levels of uncertainty in m/z and charge measurements with early CDMS detectors has led to the development of an electrostatic linear ion trap (ELIT) detector in which ions are made to oscillate back and forth through a charge detection cylinder. Multiple passes of ions through such a charge detection cylinder provides for multiple measurements for each ion, and it has been shown that the uncertainty in charge measurements decreases with $n^{1/2}$, where n is the number of charge measurements. However, such multiple charge measurements necessarily limit the speed at which ion m/z and charge measurements can be obtained using current ELIT designs. Accordingly, it is desirable to seek improvements in ELIT design and/or operation which increase the rate of ion m/z and charge measurements over those obtainable using current ELIT designs.

SUMMARY

The present invention may comprise one or more of the features recited in the attached claims, and/or one or more of the following features and combinations thereof. In one aspect, a charge detection mass spectrometer may comprise an ion source configured to generate ions from a sample, an ion trap configured to receive and store the generated ions therein and to selectively release stored ions therefrom, an electrostatic linear ion trap (ELIT) spaced apart from the ion trap, the ELIT including first and second ion mirrors and a charge detection cylinder positioned therebetween, and means for selectively controlling the ion trap to release at least some of the stored ions therefrom to travel toward and into the ELIT, and for controlling the first and second ion mirrors in a manner which traps in the ELIT at least one of the ions traveling therein and causes the at least one trapped ion to oscillate back and forth between the first and second ion mirrors each time passing through and inducing a corresponding charge on the charge detection cylinder.

In another aspect, a charge detection mass spectrometer may comprise an ion source configured to generate ions from a sample, at least one voltage source configured to produce a plurality of output voltages, an ion trap coupled to a first set of the plurality of output voltages and configured to be responsive a trapping state thereof to receive and store the generated ions therein and to a transmission state thereof to selectively release stored ions therefrom, an electrostatic linear ion trap (ELIT) spaced apart from the ion trap, the ELIT including front and rear ion mirrors and a charge detection cylinder positioned therebetween, the front and rear ion mirrors each coupled to second and third sets respectively of the plurality of output voltages and configured to be responsive to transmission states thereof to transmit ions therethrough and to reflection states thereof to reflect ions entering therein from the charge detection cylinder back into the charge detection cylinder, and processing circuitry for controlling the first set of voltages to the transmission state thereof to cause the ion trap to release at least some of the stored ions therefrom to travel toward and into the ELIT via the front ion mirror, and to thereafter control the third set of voltages, followed by the second set of voltages, to the reflection states thereof to trap at least one of the ions traveling therein and cause the at least one trapped ion to oscillate back and forth between the front and rear ion mirrors each time passing through and inducing a corresponding charge on the charge detection cylinder.

In yet another aspect, a method is provided for operating a charge detection mass spectrometer including an electrostatic linear ion trap (ELIT) having a charge detection cylinder positioned between front and rear ion mirrors and an ion trap spaced apart from the front ion mirror. The method may comprise generating ions from a sample, storing the generated ions in the ion trap, controlling the ion trap to release at least some of the stored ions therefrom and travel toward and into the ELIT via the front ion mirror, after controlling the ion trap to release stored ions, controlling the rear ion mirror to a reflection state in which the rear ion mirror reflects ions entering therein from the charge detection cylinder back through the charge detection cylinder and toward the front ion mirror, and after controlling the rear ion mirror to the reflection state thereof, controlling the front ion mirror to a reflection state in which the front ion mirror reflects ions entering therein from the charge detection cylinder back through the charge detection cylinder and toward the rear ion mirror to trap in the ELIT at least one of the ions released from the ion trap such that the at least one trapped ion oscillates between the front and rear ion mirrors each time passing through and inducing a corresponding charge on the charge detection cylinder.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

This disclosure relates to an electrostatic linear ion trap (ELIT) array including two or more ELITs or ELIT regions and means for controlling them such that at least two of the ELITs or ELIT regions simultaneously operate to measure a mass-to-charge ratio and a charge of at least one ion captured therein. In this manner, the rate of ion measurement is increased by at a factor of two or more as compared with conventional single ELIT systems, and a corresponding reduction in total ion measurement time is realized. In some embodiments, an example of which will be described in detail below with respect to FIGS. 1-4E, an ELIT array may be implemented in the form of two or more ELIT regions arranged in series, i.e., cascaded, and ion mirror at opposite ends of each of the two or more cascaded ELITs or ELIT regions are controlled to sequentially capture at least one ion in each ELIT or ELIT region and to cause the captured ion(s) in at least two of the ELITs or ELIT regions to simultaneously oscillate back and forth through a respective charge detector positioned therein to measure the mass-to-charge ratio and charge of the captured ion(s). In other embodiments, as will be described in detail below with respect to FIGS. 6-10, an ELIT array may be implemented in the form of two or more ELITs arranged in parallel relative to one another. An ion steering array may be controlled to direct at least one ion sequentially or simultaneously into each of the parallel-arranged ELITs, after which the two or more ELITs are controlled to cause the captured ion(s) in at least two of the ELITs to simultaneously oscillate back and forth through a charge detector within each respective ELIT to measure the mass-to-charge ratio and charge of the captured ion(s).

Figure 1:
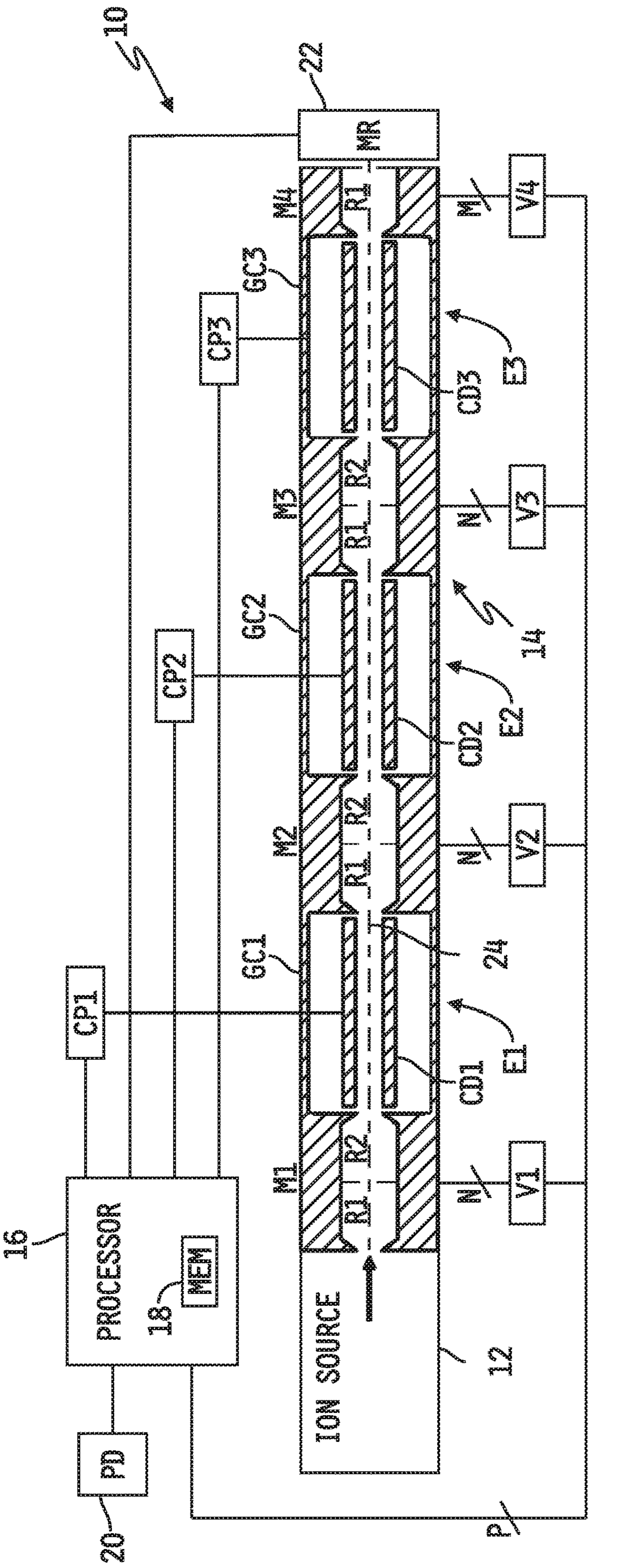
FIG. 1 is a simplified diagram of an ion mass detection system including an embodiment of an electrostatic linear ion trap (ELIT) array with control and measurement components coupled thereto.

Referring to FIG. 1, an ion mass detection system 10 is shown including an embodiment of an electrostatic linear ion trap (ELIT) array 14 with control and measurement components coupled thereto. In the illustrated embodiment, the ion mass detection system 10 includes an ion source 12 operatively coupled to an inlet of the ELIT array 14. As will be described with respect to FIG. 5, the ion source 12 illustratively includes any conventional device or apparatus for generating ions from a sample and may further include one or more devices and/or instruments for separating, collecting, filtering, fragmenting and/or normalizing ions according to one or more molecular characteristics. As one illustrative example, which should not be considered to be limiting in any way, the ion source 12 may include a conventional electrospray ionization source, a matrix-assisted laser desorption ionization (MALDI) source or the like, coupled to an inlet of a conventional mass spectrometer. The mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like. In any case, the ion outlet of the mass spectrometer is operatively coupled to an ion inlet of the ELIT array 14. The sample from which the ions are generated may be any biological or other material.

In the illustrated embodiment, the ELIT array 14 is illustratively provided in the form of a cascaded, i.e., series or end-to-end, arrangement of three ELITs or ELIT regions. Three separate charge detectors CD1, CD2, CD3, are each surrounded by a respective ground cylinder GC1-GC3 and are operatively coupled together by opposing mirror electrodes. A first mirror electrode M1 is operatively positioned between the ion source 12 and one end of the charge detector CD1, a second mirror electrode M2 is operatively positioned between the opposite end of the charge detector CD1 and one end of the charge detector CD2, a third mirror electrode M3 is operatively positioned between the opposite end of the charge detector CD2 and one end of the charge detector CD3, and a fourth mirror electrode is operatively positioned at the opposite end of the charge detector CD3. In the illustrated embodiment, each of the ion mirrors M1-M3 define axially adjacent ion mirror regions R1, R2, and the ion mirror M4 illustratively defines a single ion mirror region R1. Illustratively, the region R2 of the first mirror electrode M1, the charge detector CD1, the region R1 of the second mirror electrode M2 and the spaces between CD1 and the mirror electrodes M1, M2 together define a first ELIT or ELIT region E1 of the ELIT array 14, the region R2 of the second mirror electrode M2, the charge detector CD2, the region R1 of the third mirror electrode M3 and the spaces between CD2 and the mirror electrodes M2, M3 together define a second ELIT or ELIT region E2 of the ELIT array 14, and the region R2 of the third mirror electrode M3, the charge detector CD3, the region R1 of the mirror electrode M4 and the spaces between CD3 and the mirror electrodes M3, M4 together define a third ELIT or ELIT region E3 of the ELIT array 14. It will be understood that in some alternate embodiments, the ELIT array 14 may include fewer cascaded ELITs or ELIT regions, e.g., two cascaded ELITs or ELIT regions, and that in other alternate embodiments the ELIT array 14 may include more cascaded ELITs or ELIT regions, e.g., four or more cascaded ELITs or ELIT regions. The construction and operation of any such alternate ELIT array 14 will generally follow that of the embodiment illustrated in FIGS. 1-4E and described below.

In the illustrated embodiment, four corresponding voltage sources V1-V4 are electrically connected to the ion mirrors M1-M4 respectively. Each voltage source V1-V4 illustratively includes one or more switchable DC voltage sources which may be controlled or programmed to selectively produce a number, N, of programmable or controllable voltages, wherein N may be any positive integer. Illustrative examples of such voltages will be described below with respect to FIGS. 2A and 2B to separately and/or together establish one of two different operating modes of each ion mirror M1-M4 as will be described in detail below. In any case, a longitudinal axis 24 extends centrally through the charge detectors CD1-CD3 and the ion mirrors M1-M4, and the central axis 24 defines an ideal travel path along which ions move within the ELIT array 14 and portions thereof under the influence of electric fields selectively established by the voltage sources V1-V4.

The voltage sources V1-V4 are illustratively shown electrically connected by a number, P, of signal paths to a conventional processor 16 including a memory 18 having instructions stored therein which, when executed by the processor 16, cause the processor 16 to control the voltage sources V1-V4 to produce desired DC output voltages for selectively establishing electric fields within the regions R1, R2 of the respective ion mirrors M1-M4. P may be any positive integer. In some alternative embodiments, one or more of the voltage sources V1-V4 may be programmable to selectively produce one or more constant output voltages. In other alternative embodiments, one or more of the voltage sources V1-V4 may be configured to produce one or more time-varying output voltages of any desired shape. It will be understood that more or fewer voltage sources may be electrically connected to the mirror electrodes M1-M4 in alternate embodiments.

Each charge detector CD1-CD3 is electrically connected to a signal input of a corresponding one of three charge sensitive preamplifiers CP1-CP3, and the signal outputs of each charge preamplifier CP1-CP3 is electrically connected to the processor 16. The charge preamplifiers CP1-CP3 are each illustratively operable in a conventional manner to receive detection signals detected by a respective one of the charge detectors CD1-CD3, to produce charge detection signals corresponding thereto and to supply the charge detection signals to the processor 16. The processor 16 is, in turn, illustratively operable to receive and digitize the charge detection signals produced by each of the charge preamplifiers CP1-CP3, and to store the digitized charge detection signals in the memory 18. The processor 16 is further illustratively coupled to one or more peripheral devices 20 (PD) for providing signal input(s) to the processor 16 and/or to which the processor 16 provides signal output(s). In some embodiments, the peripheral devices 20 include at least one of a conventional display monitor, a printer and/or other output device, and in such embodiments the memory 18 has instructions stored therein which, when executed by the processor 16, cause the processor 16 to control one or more such output peripheral devices 20 to display and/or record analyses of the stored, digitized charge detection signals. In some embodiments, a conventional microchannel plate (MP) detector 22 may be disposed at the ion outlet of the ELIT array 14, i.e., at the ion outlet of the ion mirror M4, and electrically connected to the processor 16. In such embodiments, the microchannel plate detector 22 is operable to supply detection signals to the processor 16 corresponding to detected ions and/or neutrals.

As will be described in greater detail below, the voltage sources V1-V4 are illustratively controlled in a manner which causes ions to be introduced into the ELIT array 14 from the ion source 12, and which selectively captures and confines at least one ion to oscillate within each of three separate ELITs or ELIT regions E1-E3 such that each captured ion(s) repeatedly passes through a respective one of the charge detectors CD1-CD3 in a respective one of the three ELITs or ELIT regions E1-E3. A plurality of charge and oscillation period values are measured at each charge detector CD1-CD3, and the recorded results are processed to determine mass-to-charge ratio and mass values of the ion(s) captured in each of the three ELITs or ELIT regions E1-E3. Depending upon a number of factors including, but not limited to, the dimensions of the three ELITs or ELIT regions E1-E3, the ion oscillation frequency and the resident times of the ions within each of the three ELITs or ELIT regions E1-E3, captured ion(s) oscillate simultaneously within at least two of the three ELITs or ELIT regions E1-E3, and in typical implementations within each of the three of the ELITs or ELIT regions E1-E3, such that ion charge and mass-to-charge ratio measurements can be collected simultaneously from at least two of the three ELITs or ELIT regions E1-E3.

Figure 2B:
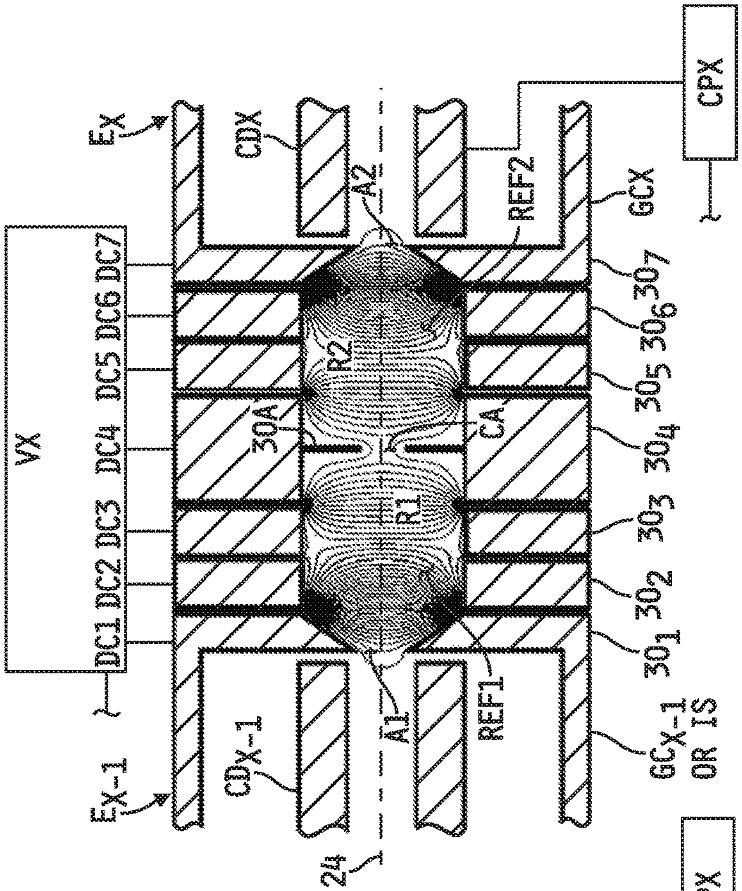
FIG. 2B is a magnified view of another example one of the ion mirrors of the ELIT array illustrated in FIG. 1 in which the mirror electrodes are controlled to produce an ion reflection electric field within the example ion mirror.
Figure 2A:
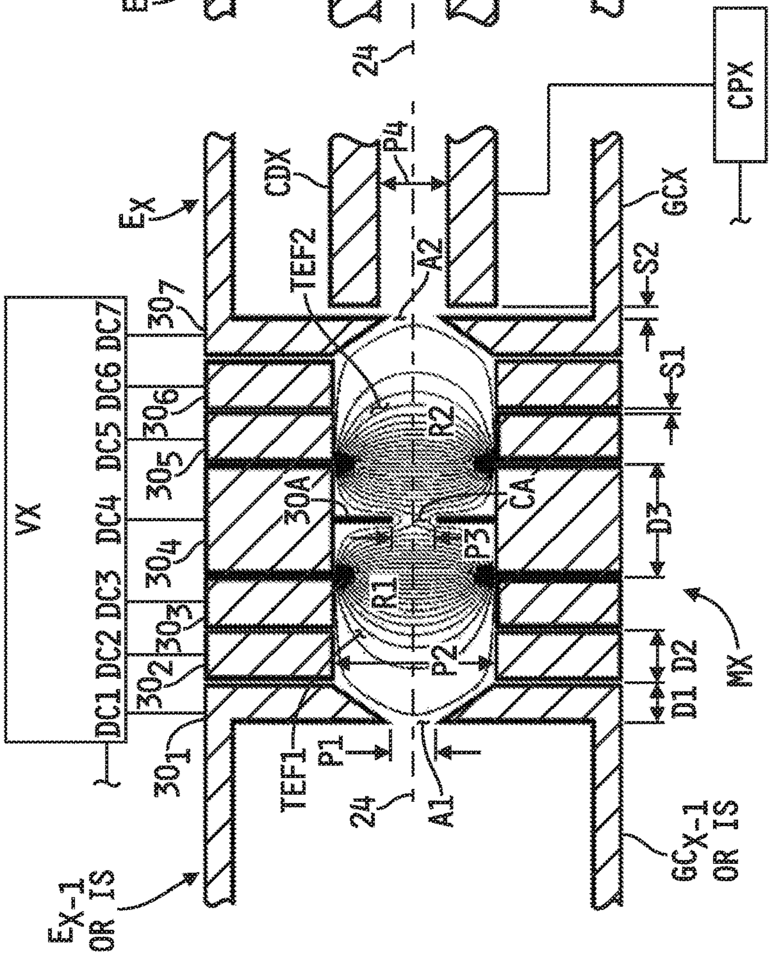
FIG. 2A is a magnified view of an example one of the ion mirrors of the ELIT array illustrated in FIG. 1 in which the mirror electrodes are controlled to produce an ion transmission electric field within the example ion mirror.

Referring now to FIGS. 2A and 2B, an embodiment is shown of one of the ion mirrors MX of the ELIT array 14 of FIG. 1, where X=1-4, illustrating example construction and operation thereof. In each of FIGS. 2A and 2B, the illustrated ion mirror MX includes a cascaded arrangement of 7 spaced-apart, electrically conductive mirror electrodes. For each of the ion mirrors M2-M4, a first electrode $30_1$ is formed by the ground cylinder, $GC_{X-1}$, disposed about a respective one of the charge detectors $CD_{X-1}$. The first electrode $30_1$ of the ion mirror M1, on the other hand, is formed by an ion outlet of the ion source 12 (IS) or as part of an ion focusing or transition stage between the ion source 12 and the ELIT array 14. FIG. 2B illustrates the former and FIG. 2A illustrates the latter. In either case, the first mirror electrode $30_1$ defines an aperture A1 centrally therethrough which serves as an ion entrance and/or exit to and/or from the corresponding ion mirror MX. The aperture A1 is illustratively conical in shape which increases linearly between the internal and external faces of $GC_{X-1}$ or IS from a first diameter P1 defined at the internal face of $GC_{X-1}$ or IS to an expanded diameter P2 at the external face of $GC_{X-1}$ or IS. The first mirror electrode $30_1$ illustratively has a thickness of D1.

A second mirror electrode $30_2$ of the ion mirror MX is spaced apart from the first mirror electrode $30_1$ and defines a passageway therethrough of diameter P2. A third mirror electrode $30_3$ is spaced apart from the second mirror electrode $30_2$ and likewise defines a passageway therethrough of diameter P2. The second and third mirror electrodes $30_2$, $30_3$ illustratively have equal thickness of D2≥D1. A fourth mirror electrode $30_4$ is spaced apart from the third mirror electrode $30_3$. The fourth mirror electrode $30_4$ defines a passageway therethrough of diameter P2 and illustratively has a thickness D3≈3D2. A plate or grid 30A is illustratively positioned centrally within the passageway of the fourth mirror electrode $30_4$ and defines a central aperture CA therethrough having a diameter P3. In the illustrated embodiment, P3<P1 although in other embodiments P3 may be greater than or equal to P1. A fifth mirror electrode $30_5$ is spaced apart from the fourth mirror electrode $30_4$, and a sixth mirror electrode $30_6$ is spaced apart from the fifth mirror electrode $30_5$. Illustratively, the fifth and sixth mirror electrodes $30_5$, $30_6$ are identical to the third and second mirror electrodes $30_3$, $30_2$ respectively.

For each of the ion mirrors M1-M3, a seventh mirror electrode $30_7$ is formed by the ground cylinder, $GC_X$, disposed about a respective one of the charge detectors $CD_X$. The seventh electrode $30_7$ of the ion mirror M4, on the other hand, may be a stand-alone electrode since the ion mirror M4 is the last in the sequence. In either case, the seventh mirror electrode $30_7$ defines an aperture A2 centrally therethrough which serves as an ion entrance and/or exit to and/or from the ion mirror MX. The aperture A2 is illustratively the mirror image of the aperture A1, and is of a conical shape which decreases linearly between the external and internal faces of $GC_X$ from expanded diameter P2 defined at the external face of $GC_X$ to the reduced diameter P1 at the internal face of $GC_X$. The seventh mirror electrode $30_7$ illustratively has a thickness of D1. In some embodiments, as illustrated by example in FIG. 1, the last ion mirror in the sequence, i.e., M4 in FIG. 2, may terminate at the plate or grid 30A such that M4 includes only the mirror electrodes $30_1$-$30_3$ and only part of the mirror electrode $30_4$ including the plate or grid 30A. In such embodiments, the central aperture CA of M4 defines an ion exit passageway from the ELIT array 14.

The mirror electrodes $30_1$-$30_7$ are illustratively equally spaced apart from one another by a space S1. Such spaces S1 between the mirror electrodes $30_1$-$30_7$ may be voids in some embodiments, i.e., vacuum gaps, and in other embodiments such spaces S1 may be filled with one or more electrically non-conductive, e.g., dielectric, materials. The mirror electrodes $30_1$-$30_7$ are axially aligned, i.e., collinear, such that a longitudinal axis 24 passes centrally through each aligned passageway and also centrally through the apertures A1, A2 and CA. In embodiments in which the spaces S1 include one or more electrically non-conductive materials, such materials will likewise define respective passageways therethrough which are axially aligned, i.e., collinear, with the passageways defined through the mirror electrodes $30_1$-$30_7$ and which have diameters of P2 or greater.

In each of the ion mirrors M1-M4, the region R1 is defined between the aperture A1 of the mirror electrode $30_1$ and the central aperture CA defined through the plate or grid 30A. In each of the ion mirrors M1-M3, the adjacent region R2 is defined between the central aperture CA defined through the plate or grid 30A and the aperture A2 of the mirror electrode $30_7$.

Within each ELIT or ELIT region E1-E3, a respective charge detector CD1-CD3, each in the form of an elongated, electrically conductive cylinder, is positioned and spaced apart between corresponding ones of the ion mirrors M1-M4 by a space S2. Illustratively, S2>S1, although in alternate embodiments S2 may be less than or equal to S2. In any case, each charge detection cylinder CD1-CD3 illustratively defines a passageway axially therethrough of diameter P4, and each charge detection cylinder CD1-CD3 is oriented relative to the ion mirrors M1-M4 such that the longitudinal axis 24 extends centrally through the passageway thereof. In the illustrated embodiment, P1<P4<P2, although in other embodiments the diameter of P4 may be less than or equal to P1, or greater than or equal to P2. Each charge detection cylinder CD1-CD3 is illustratively disposed within a field-free region of a respective one of the ground cylinders GC1-GC3, and each ground cylinder GC1-GC3 is positioned between and forms part of respective ones of the ion mirrors M1-M4 as described above. In operation, the ground cylinders GC1-G3 are illustratively controlled to ground potential such that the first and seventh electrodes $30_1$, $30_7$ are at ground potential at all times. In some alternate embodiments, either or both of first and seventh electrodes $30_1$, $30_7$ in one or more of the ion mirrors M1-M4 may be set to any desired DC reference potential, and in other alternate embodiments either or both of first and seventh electrodes $30_1$, $30_7$ in one or more of the ion mirrors M1-M4 may be electrically connected to a switchable DC or other time-varying voltage source.

As briefly described above, the voltage sources V1-V4 are illustratively controlled in a manner which causes ions to be introduced into the ELIT array 14 from the ion source 12, and which causes at least one ion to be selectively captured and confined to oscillate within each of three separate ELITs or ELIT regions E1-E3 such that each captured ion(s) repeatedly passes through a respective one of the charge detectors CD1-CD3 in a respective one of the three ELITs or ELIT regions E1-E3. Charge and oscillation period values are measured at each charge detector CD1-CD3 each time a respective oscillating ion(s) passes therethrough. The measurements are recorded and the recorded results are processed to determine mass-to-charge ratio and mass values of the ion(s) captured in each of the three ELITs or ELIT regions E1-E3.

Within each ELIT or ELIT region E1-E3 of the ELIT array 14, at least one ion is captured and made to oscillate between opposed regions of the respective ion mirrors M1-M4 by controlling the voltage sources V1-V4 to selectively establish ion transmission and ion reflection electric fields within the regions R1, R2 of the ion mirrors M1-M4. In this regard, each voltage source VX is illustratively configured in one embodiment to produce seven DC voltages DC1-DC7, and to supply each of the voltages DC1-DC7 to a respective one of the mirror electrodes $\mathbf{30}_1$-$\mathbf{30}_7$ of the respective ion mirror MX. In some embodiments in which one or more of the mirror electrodes $\mathbf{30}_1$-$\mathbf{30}_7$ is to be held at ground potential at all times, the one or more such mirror electrodes $\mathbf{30}_1$-$\mathbf{30}_7$ may alternatively be electrically connected to the ground reference of the voltage supply VX and the corresponding one or more voltage outputs DC1-DC7 may be omitted. Alternatively or additionally, in embodiments in which any two or more of the mirror electrodes $\mathbf{30}_1$-$\mathbf{30}_7$ are to be controlled to the same non-zero DC values, any such two or more mirror electrodes $\mathbf{30}_1$-$\mathbf{30}_7$ may be electrically connected to a single one of the voltage outputs DC1-DC7 and superfluous ones of the output voltages DC1-DC7 may be omitted.

As illustrated by example in FIGS. 2A and 2B, each ion mirror MX is controllable, by selective application of the voltages DC1-DC7, between an ion transmission mode (FIG. 2A) in which the voltages DC1-DC7 produced by the voltage source VX establish ion transmission electric fields in each of the regions R1, R2 of the ion mirror MX, and an ion reflection mode (FIG. 2B) in which the voltages DC1-DC7 produced by the voltage source VX establish ion trapping or reflection electric fields in each of the regions R1, R2 of the ion mirror MX. In the ion transmission mode, the voltages DC1-DC7 are selected to establish an ion transmission electric field TEF1 within the region R1 of the ion mirror MX and to establish another ion transmission electric field TEF2 within the region R2 of the ion mirror MX, as illustrated by example in FIG. 2A. The ion transmission electric fields TEF1 and TEF2 are illustratively established so as to focus ions toward the central, longitudinal axis 24 within the ion mirror MX so as to maintain a narrow ion trajectory about the axis 24 throughout the ELIT array 14 while also accelerating ions travelling in either direction through both regions R1, R2 of the ion mirror MX. In the ion reflection mode, the voltages DC1-DC7 are selected to establish an ion trapping or reflection electric field REF1 within the region R1 of the ion mirror MX and to establish another ion trapping or reflection electric field REF2 within the region R2 of the ion mirror MX, as illustrated by example in FIG. 2B. The ion trapping or reflection electric fields REF2 and REF2 are illustratively established so as to cause one or more ions traveling axially into the respective region R1, R2 toward the central aperture CA of MX to reverse direction and be transmitted by the reflection electric field REF1, REF2 in an opposite direction axially away from the central aperture CA. Each ion reflection electric field REF1, REF2 does so by first decelerating and stopping, i.e., trapping the one or more ions, traveling into the respective region R1, R2 of the ion mirror MX, and then accelerating such one or more ions in the opposite direction back through the respective region R1, R2 such that the one or more ions travel away from the respective region R1, R2 in an opposite direction from which the one or more ions entered the respective region R1, R2. Thus, an ion traveling from the charge detection cylinder $CD_{X-1}$ into the region R1 of the ion mirror MX along the central, longitudinal axis 24 is reflected by reflective electric field REF1 back toward and into the charge detection cylinder $CD_{X-1}$ along the central, longitudinal axis 24, and another ion traveling from the charge detection cylinder CDX into the region R2 of the ion mirror MX along the central, longitudinal axis 24 is reflected by the reflective electric field REF2 back toward and into the charge detection cylinder CDX along the central, longitudinal axis 24. Example sets of output voltages DC1-DC7 produced by the voltage sources V1-V4 respectively to control a corresponding one of the ion mirrors M1-M4 to the ion transmission and reflection modes described above are shown in TABLE I below. It will be understood that the following values of DC1-DC7 are provided only by way of example, and that other values of one or more of DC1-DC7 may alternatively be used.

TABLE I

| Ion Mirror Operating Mode | Output Voltages (volts DC) |
|---|---|
| Transmission (single ion mirror) | DC1 = DC2 = DC3 = DC5 = DC6 = DC7 = 0<br>DC4 = 880 |
| Transmission (all ion mirrors - all-pass) | V1: DC1 = DC2 = DC3 = DC5 = DC6 = DC7 = 0<br>DC4 = 830<br>V2-V4: DC1 = DC2 = DC3 = DC5 = DC6 = DC7 = 0<br>DC4 = 880 |
| Reflection (single ion mirror) | DC1 = DC7 = 0<br>DC2 = DC6 = 1350<br>DC3 = DC5 = 1250<br>DC4 = 1900 |

Figure 3:
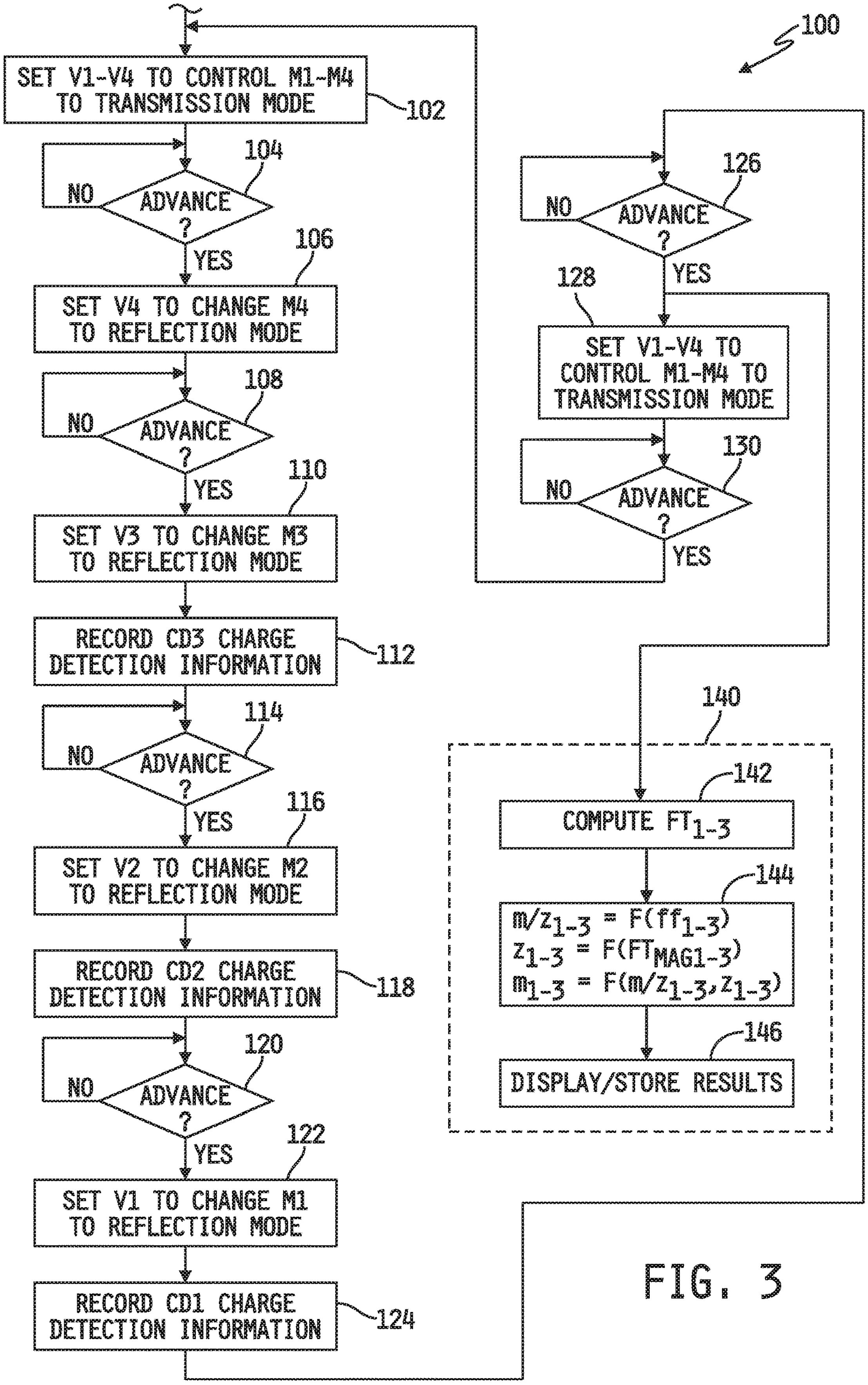
FIG. 3 is a simplified flowchart illustrating an embodiment of a process for controlling operation of the ELIT array of FIG. 1 to determine ion mass and charge information.

Referring now to FIG. 3, a simplified flowchart is shown of a process 100 for controlling the voltage sources V1-V4 to selectively and sequentially control the ion mirrors M1-M4 between their transmission and reflection modes described above to cause ions to be introduced into the ELIT array 14 from the ion source 12, and to then sequentially cause at least one ion to be selectively captured and confined to oscillate within each of three separate ELITs or ELIT regions E1-E3 such that each captured ion(s) repeatedly passes through a respective one of the charge detectors CD1-CD3 in a respective one of the three ELITs or ELIT regions E1-E3. The charge and oscillation period values are measured and recorded at each charge detector CD1-CD3 each time a respective oscillating ion(s) passes therethrough, and ion mass values are then determined based on the recorded data. In the illustrated embodiment, the process 100 is illustratively stored in the memory 18 in the form of instructions which, when executed by the processor 16, cause the processor 16 to perform the stated functions. In alternate embodiments in which one or more of the voltage sources V1-V4 is/are programmable independently of the processor 16, one or more aspects of the process 100 may be executed in whole or in part by the one or more such programmable voltage sources V1-V4. For purposes of this disclosure, however, the process 100 will be described as being executed solely by the processor 16. With the aid of FIGS. 4A-4E, the process 100 will be described as operating on one or more positively charged ions, although it will be understood that the process 100 may alternatively operate on one or more negatively charges particles.

Figures 4A, 4B, 4C, 4D, 4E:
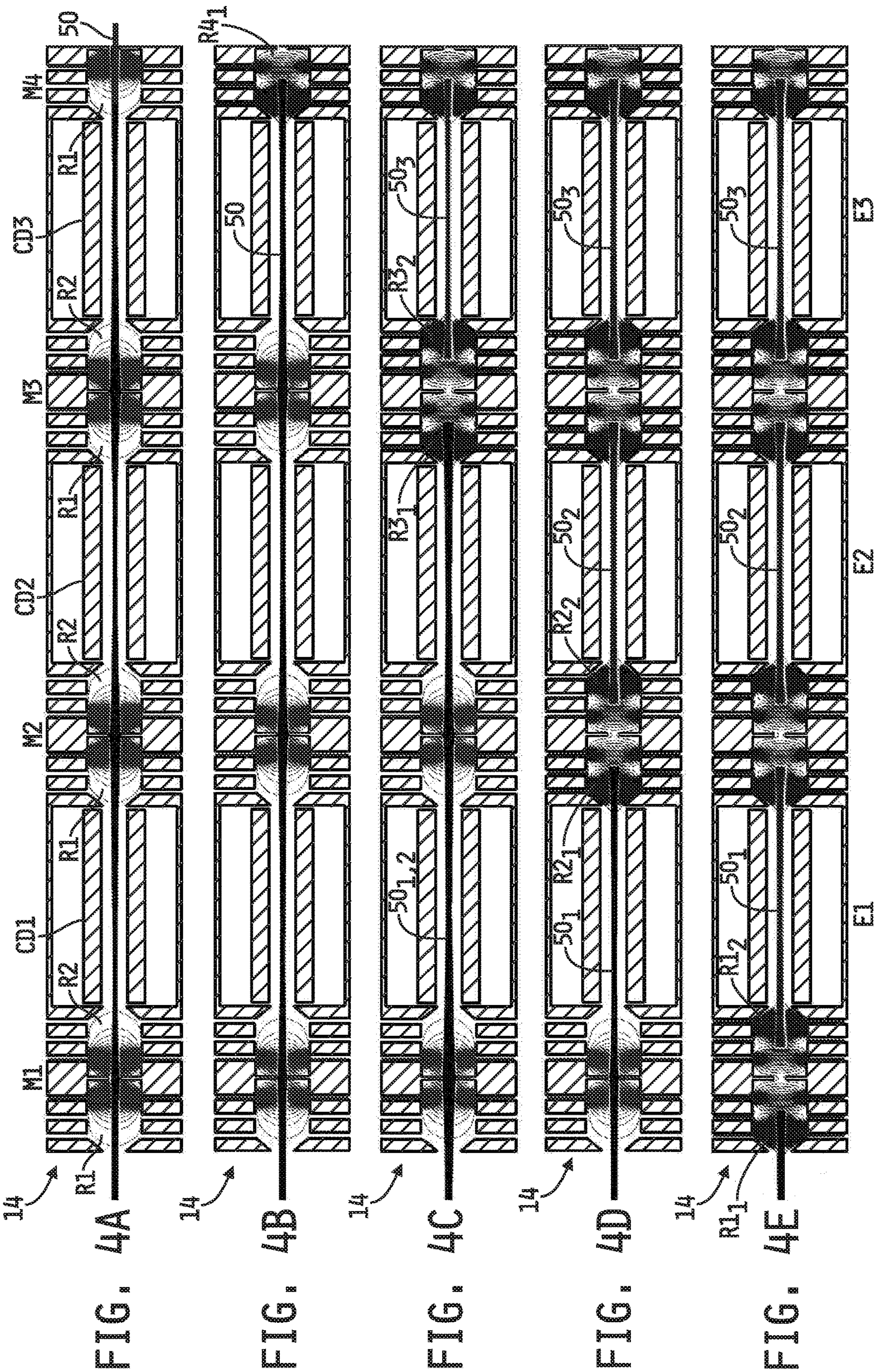
FIGS. 4A-4E are simplified diagrams of the ELIT array of FIG. 1 demonstrating sequential control and operation of the multiple ion mirrors according to the process illustrated in FIG. 3.

With reference to FIG. 4A, the process 100 begins at step 102 where the processor 16 is operable to control the voltage sources V1-V4 to set the voltages DC1-DC7 of each in a manner which causes all of the ion mirrors M1-M4 to operate in the ion transmission mode such that the transmission electric fields TEF1, TEF2 established in the respective regions R1, R2 of each operates to accelerate and pass ions therethrough. In one example embodiment, the voltage sources V1-V4 are illustratively controlled at step 102 of the process 100 to produce the voltages DC1-DC7 according to the all-pass transmission mode as illustrated in Table I above. In any case, with each of the voltage sources V1-V4 set at step 102 to control the ion mirrors M1-M4 to operate in the ion transmission mode, ions entering M1 from the ion source 12 pass through all of the ion mirrors M1-M4 and all of the charge detectors CD1-CD3 and exit M4 as illustrated by the example ion trajectory 50 depicted in FIG. 4A. Such control of the ion mirrors M1-M4 to their respective transmission modes thus draws one or more ions from the ion source 12 into and through the entire ELIT array 14 as shown in FIG. 4A. The ion trajectory 50 depicted in FIG. 4A may illustratively represent a single ion or a collection of ions.

Following step 102, the process 100 advances to step 104 where the processor 16 is operable to pause and determine when to advance to step 106. In one embodiment of step 102, the ELIT array 14 is illustratively controlled in a "random trapping mode" in which the ion mirrors M1-M4 are held in their transmission modes for a selected time period during which one or more ions generated by the ion source 12 will be expected to enter and travel through the ELIT array 14. As one non-limiting example, the selected time period which the processor 16 spends at step 104 before moving on to step 106 when operating in the random trapping mode is on the order of 1-3 millisecond (ms) depending upon the axial length of the ELIT array 14 and of the velocity of ions entering the ELIT array 14, although it will be understood that such selected time period may, in other embodiments, be greater than 3 ms or less than 1 ms. Until the selected time period has elapsed, the process 100 follows the NO branch of step 104 and loops back to the beginning of step 104. After passage of the selected time period, the process 100 follows the YES branch of step 104 and advances to step 106. In some alternate embodiments of step 104, such as in embodiments which include the microchannel plate detector 22, the processor 16 may be configured to advance to step 106 only after one or more ions has been detected by the detector 22, with or without a further additional delay period, so as to ensure that ions are being transmitted through the ELIT array 14 before advancing to step 106. In other alternate embodiments, the ELIT array 14 may illustratively be controlled by the processor 16 in a "trigger trapping mode" in which the ion mirrors M1-M4 are held in their ion transmission modes until at least one ion is detected at the charge detector CD3. Until such detection, the process 100 follows the NO branch of step 104 and loops back to the beginning of step 104. Detection by the processor 16 of at least one ion at the charge detector CD3 is indicative of the at least one ion passing through the charge detector CD3 toward the ion mirror M4 and serves as a trigger event which causes the processor 16 to follow the YES branch of step 104 and advance to step 106 of the process 100.

Following the YES branch of step 104 and with reference to FIG. 4B, the processor 16 is operable at step 106 to control the voltage source V4 to set the output voltages DC1-DC7 thereof in a manner which changes or switches the operation of the ion mirror M4 from the ion transmission mode of operation to the ion reflection mode of operation in which an ion reflection electric field R4$_1$ is established within the region R1 of M4. The ion reflection electric field R4$_1$ operates, as described above, to reflect the one or more ions entering the region R1 of M4 back toward the ion mirror M3 (and through the charge detector CD3) as described above with respect to FIG. 2B. The output voltages DC1-DC7 produced by the voltage sources V1-V3 respectively are unchanged at step 106 so that the ion mirrors M1-M3 each remain in the ion transmission mode. As a result, one or more ions traveling in the ELIT array 14 toward the ion mirror M4 are reflected back toward the ion mirror M3 and will be transmitted along the axis 24 toward the ion inlet of M1, as illustrated by the ion trajectory 50 illustrated in FIG. 4B.

Following step 106, the process 100 advances to step 108 where the processor 16 is operable to pause and determine when to advance to step 110. In embodiments of step 108 in which the ELIT array 14 is controlled by the processor 16 in random trapping mode, the ion mirrors M1-M3 are held at step 108 in their transmission modes for a selected time period during which one or more ions may enter the ELIT or ELIT region E3. As one non-limiting example, the selected time period which the processor 16 spends at step 108 before moving on to step 110 when operating in the random trapping mode is on the order of 0.1 millisecond (ms), although it will be understood that such selected time period may, in other embodiments, be greater than 0.1 ms or less than 0.1 ms. Until the selected time period has elapsed, the process 100 follows the NO branch of step 108 and loops back to the beginning of step 108. After passage of the selected time period, the process 100 follows the YES branch of step 108 and advances to step 110. In alternate embodiments of step 108 in which the ELIT array 14 is controlled by the processor 16 in trigger trapping mode, the ion mirrors M1-M3 are held in their ion transmission modes until at least one ion is detected at the charge detector CD3. Until such detection, the process 100 follows the NO branch of step 108 and loops back to the beginning of step 108. Detection by the processor 16 of at least one ion at the charge detector CD3 ensures that at least one ion is moving through the charge detector CD3 and serves as a trigger event which causes the processor 16 to follow the YES branch of step 108 and advance to step 110 of the process 100.

Following the YES branch of step 108 and with reference to FIG. 4C, the processor 16 is operable at step 110 to control the voltage source V3 to set the output voltages DC1-DC7 thereof in a manner which changes or switches the operation of the ion mirror M3 from the ion transmission mode of operation to the ion reflection mode of operation in which an ion reflection electric field R3$_1$ is established within the region R1 of M3 and an ion reflection electric field R3$_2$ is established within the region R2 of M3. As a result, at least one ion is trapped within the ELIT or ELIT region E3, and due to the reflection electric fields R3$_2$ and R4$_1$ established within region R2 of the ion mirror M3 and the region R1 of the ion mirror M4 respectively, the at least one trapped ion oscillates between M3 and M4, each time passing through the charge detection cylinder CD3 as illustrated by the ion trajectory 503 depicted in FIG. 4C. Each time the at least one ion passes through the charge detection cylinder CD3 it induces a charge on the cylinder CD3 which is detected by the charge preamplifier CP3 (see FIG. 1). At step 112, the processor 16 is operable, as the at least one ion oscillates back and forth between the ion mirrors M3, M4 and through the charge detection cylinder CD3, to record an amplitude and timing of each such CD3 charge detection event and to store it in the memory 18.

The ion reflection electric field $R3_1$ operates, as described above, to reflect the one or more ions entering the region R1 of M3 back toward the ion mirror M2 (and through the charge detector CD2) as described above with respect to FIG. 2B. The output voltages DC1-DC7 produced by the voltage sources V1-V2 respectively are unchanged at steps 110 and 112 so that the ion mirrors M1-M2 each remain in the ion transmission mode. As a result, one or more ions traveling in the ELIT array 14 toward the ion mirror M3 are reflected back toward the ion mirror M2 and will be transmitted along the axis 24 toward the ion inlet of M1, as illustrated by the ion trajectory $50_{1, 2}$ illustrated in FIG. 4C.

Following steps 110 and 112, the process 100 advances to step 114 where the processor 16 is operable to pause and determine when to advance to step 116. In embodiments of step 114 in which the ELIT array 14 is controlled by the processor 16 in random trapping mode, the ion mirrors M1-M2 are held at step 114 in their transmission modes for a selected time period during which one or more ions may enter the ELIT or ELIT region E2. As one non-limiting example, the selected time period which the processor 16 spends at step 114 before moving on to step 116 when operating in the random trapping mode is on the order of 0.1 millisecond (ms), although it will be understood that such selected time period may, in other embodiments, be greater than 0.1 ms or less than 0.1 ms. Until the selected time period has elapsed, the process 100 follows the NO branch of step 114 and loops back to the beginning of step 108. After passage of the selected time period, the process 100 follows the YES branch of step 114 and advances to step 116. In alternate embodiments of step 114 in which the ELIT array 14 is controlled by the processor 16 in trigger trapping mode, the ion mirrors M1-M2 are held in their ion transmission modes until at least one ion is detected at the charge detector CD2. Until such detection, the process 100 follows the NO branch of step 114 and loops back to the beginning of step 114. Detection by the processor 16 of at least one ion at the charge detector CD2 ensures that at least one ion is moving through the charge detector CD2 and serves as a trigger event which causes the processor 16 to follow the YES branch of step 114 and advance to step 116 of the process 100.

The ion reflection electric field $R2_1$ operates, as described above, to reflect the one or more ions entering the region R1 of M2 back toward the ion mirror M1 (and through the charge detector CD1) as described above with respect to FIG. 2B. The output voltages DC1-DC7 produced by the voltage source V1 are unchanged at steps 116 and 118 so that the ion mirror M1 remains in the ion transmission mode. As a result, one or more ions traveling in the ELIT array 14 toward the ion mirror M2 are reflected back toward the ion mirror M1 and will be transmitted along the axis 24 toward the ion inlet of M1, as illustrated by the ion trajectory $50_1$ illustrated in FIG. 4D.

Following the YES branch of step 114 and as the at least one ion in the ELIT or ELIT region E3 continues to oscillate back and forth through the charge detection cylinder CD3 between the ion mirrors M3 and M4, the process 100 advances to step 116. With reference to FIG. 4D, the processor 16 is operable at step 116 to control the voltage source V2 to set the output voltages DC1-DC7 thereof in a manner which changes or switches the operation of the ion mirror M2 from the ion transmission mode of operation to the ion reflection mode of operation in which an ion reflection electric field $R2_1$ is established within the region R1 of M2 and an ion reflection electric field $R2_2$ is established within the region R2 of M2. As a result, at least one ion is trapped within the ELIT or ELIT region E2, and due to the reflection electric fields $R2_2$ and $R3_1$ established within region R2 of the ion mirror M2 and the region R1 of the ion mirror M3 respectively, the at least one trapped ion oscillates between M2 and M3, each time passing through the charge detection cylinder CD2 as illustrated by the ion trajectory 502 depicted in FIG. 4D. Each time the at least one ion passes through the charge detection cylinder CD2 it induces a charge on the cylinder CD2 which is detected by the charge preamplifier CP2 (see FIG. 1). At step 118, the processor 16 is operable, as the at least one ion oscillates back and forth between the ion mirrors M2, M3 and through the charge detection cylinder CD2, to record an amplitude and timing of each such CD2 charge detection event and to store it in the memory 18. Thus, following step 116, at least one ion is oscillating back and forth through the charge detection cylinder CD3 of the ELIT or ELIT region E3 between the ion mirrors M3 and M4 and, simultaneously, at least another ion is oscillating back and forth through the charge detection cylinder CD2 of the ELIT or ELIT region E2 between the ion mirrors M2 and M3.

Following steps 116 and 118, the process 100 advances to step 120 where the processor 16 is operable to pause and determine when to advance to step 122. In embodiments of step 120 in which the ELIT array 14 is controlled by the processor 16 in random trapping mode, the ion mirror M1 is held at step 120 in its transmission mode of operation for a selected time period during which one or more ions may enter the ELIT or ELIT region E1. As one non-limiting example, the selected time period which the processor 16 spends at step 120 before moving on to step 122 when operating in the random trapping mode is on the order of 0.1 millisecond (ms), although it will be understood that such selected time period may, in other embodiments, be greater than 0.1 ms or less than 0.1 ms. Until the selected time period has elapsed, the process 100 follows the NO branch of step 120 and loops back to the beginning of step 120. After passage of the selected time period, the process 100 follows the YES branch of step 120 and advances to step 122. In alternate embodiments of step 120 in which the ELIT array 14 is controlled by the processor 16 in trigger trapping mode, the ion mirror M1 is held in its ion transmission mode of operation until at least one ion is detected at the charge detector CD1. Until such detection, the process 100 follows the NO branch of step 120 and loops back to the beginning of step 120. Detection by the processor 16 of at least one ion at the charge detector CD1 ensures that at least one ion is moving through the charge detector CD1 and serves as a trigger event which causes the processor 16 to follow the YES branch of step 120 and advance to step 122 of the process 100.

Following the YES branch of step 120, and as at least one ion in the ELIT or ELIT region E3 continues to oscillate back and forth through the charge detection cylinder CD3 between the ion mirrors M3 and M4 and also as at least another ion in the ELIT or ELIT region E2 simultaneously continues to oscillate back and forth through the charge detection cylinder CD2 between the ion mirrors M2 and M3 the process 100 advances to step 122. With reference to FIG. 4E, the processor 16 is operable at step 122 to control the voltage source V1 to set the output voltages DC1-DC7 thereof in a manner which changes or switches the operation of the ion mirror M1 from the ion transmission mode of operation to the ion reflection mode of operation in which an ion reflection electric field R11 is established within the region R1 of M1 and an ion reflection electric field R12 is established within the region R1 of M1. As a result, at least one ion is trapped within the ELIT or ELIT region E1, and due to the reflection electric fields R12 and $R2_1$ established within region R2 of the ion mirror M1 and the region R2 of the ion mirror M2 respectively, the at least one trapped ion oscillates between M1 and M2, each time passing through the charge detection cylinder CD1 as illustrated by the ion trajectory $50_1$ depicted in FIG. 4E. Each time the at least one ion passes through the charge detection cylinder CD1 it induces a charge on the cylinder CD1 which is detected by the charge preamplifier CP1 (see FIG. 1). At step 124, the processor 16 is operable, as the at least one ion oscillates back and forth between the ion mirrors M1, M2 and through the charge detection cylinder CD1, to record an amplitude and timing of each such CD1 charge detection event and to store it in the memory 18. Thus, following step 122, at least one ion is oscillating back and forth through the charge detection cylinder CD3 of the ELIT or ELIT region E3 between the ion mirrors M3 and M4 and, simultaneously, at least another ion is oscillating back and forth through the charge detection cylinder CD2 of the ELIT or ELIT region E2 between the ion mirrors M2 and M3, and also simultaneously at least yet another ion is oscillating back and forth through the charge detection cylinder CD1 of the ELIT or ELIT region E1 between the ion mirrors M1 and M2.

Following steps 122 and 124, the process 100 advances to step 126 where the processor 16 is operable to pause and determine when to advance to step 128. In one embodiment, the processor 16 is configured, i.e. programmed, to allow the ions to oscillate back and forth simultaneously through each of the ELITs or ELIT regions E1-E3 for a selected time period, i.e., a total ion cycle measurement time, during which ion detection events, i.e., by each of the charge detectors CD1-CD3, are recorded by the processor 16. As one non-limiting example, the selected time period which the processor 16 spends at step 126 before moving on to step 128 is on the order of 100-300 millisecond (ms), although it will be understood that such selected time period may, in other embodiments, be greater than 300 ms or less than 100 ms. Until the selected time period has elapsed, the process 100 follows the NO branch of step 126 and loops back to the beginning of step 126. After passage of the selected time period, the process 100 follows the YES branch of step 126 and advances to steps 128 and 140. In some alternate embodiments of the process 100, the voltage sources V1-V4 may illustratively be controlled by the processor 16 at step 126 to allow the ion(s) to oscillate back in forth through the charge detectors CD1-CD3 a selected number of times, i.e., a total number of measurement cycles, during which ion detection events, i.e., by each of the charge detectors CD1-CD3, are recorded by the processor 16. Until the processor counts the selected number ion detection events of one or more of the charge detectors CD1-CD3, the process 100 follows the NO branch of step 126 and loops back to the beginning of step 126. Detection by the processor 16 of the selected number of ion detection events serves as a trigger event which causes the processor 16 to follow the YES branch of step 126 and advance to steps 128 and 140 of the process 100.

Following the YES branch of step 126, the processor 16 is operable at step 128 to control the voltage sources V1-V4 to set the output voltages DC1-DC7 of each in a manner which changes or switches the operation of all of the ion mirrors M1-M4 from the ion reflection mode of operation to the ion transmission mode of operation in which the ion mirrors M1-M4 each operate to allow passage of ions therethrough. Illustratively, the voltage sources V1-V4 are illustratively controlled at step 128 of the process 100 to produce the voltages DC1-DC7 according to the all-pass transmission mode as illustrated in Table I above, which re-establishes the ion trajectory 50 illustrated in FIG. 4A in which (i) all ions within the ELIT array 14 are transmitted under the influence of the ion transmission electric fields TEF1, TEF2 established in each of the ion mirrors M1-M4 through and out of the ELIT array 14, and (ii) all ions entering M1 from the ion source 12 pass through all of the ion mirrors M1-M4 and all of the charge detectors CD1-CD3.

Following step 128, the processor 16 is operable at step 130 to pause for a selected time period to allow the ions contained within the ELIT array 14 to be transmitted out of the ELIT array 14. As one non-limiting example, the selected time period which the processor 12 spends at step 130 before looping back to step 102 to restart the process 100 is on the order of 1-3 milliseconds (ms), although it will be understood that such selected time period may, in other embodiments, be greater than 3 ms or less than 1 ms. Until the selected time period has elapsed, the process 100 follows the NO branch of step 130 and loops back to the beginning of step 130. After passage of the selected time period, the process 100 follows the YES branch of step 130 and loops back to step 102 to restart the process 100.

Also following the YES branch of step 126, the process 100 additionally advances to step 140 to analyze the data collected during steps 112, 118 and 124 of the process 100 just described. In the illustrated embodiment, the data analysis step 140 illustratively includes step 142 in which the processor 16 is operable to compute Fourier transforms of the recorded sets of stored charge detection signals provided by each of the charge preamplifiers CP1-CP3. The processor 16 is illustratively operable to execute step 142 using any conventional digital Fourier transform (DFT) technique such as for example, but not limited to, a conventional Fast Fourier Transform (FFT) algorithm. In any case, the processor 16 is operable at step 142 to compute three Fourier Transforms, $FT_1$, $FT_2$ and $FT_3$, wherein $FT_1$ is the Fourier Transform of the recorded set of charge detection signals provided by the first charge preamplifier CP1, thus corresponding to the charge detection events detected by the charge detection cylinder CD1 of the ELIT or ELIT region E1, $FT_2$ is the Fourier Transform of the recorded set of charge detection signals provided by the first charge preamplifier CP2, thus corresponding to the charge detection events detected by the charge detection cylinder CD2 of the ELIT or ELIT region E2 and $FT_3$ is the Fourier Transform of the recorded set of charge detection signals provided by the first charge preamplifier CP3, thus corresponding to the charge detection events detected by the charge detection cylinder CD3 of the ELIT or ELIT region E3.

Following step 142, the process 100 advances to step 144 where the processor 16 is operable to compute three sets of ion mass-to-charge ratio values ($m/Z_1$, $m/z_2$ and $m/z_3$), ion charge values ($z_1$, $z_2$ and $z_3$) and ion mass values ($m_1$, $m_2$ and $m_3$), each as a function of a respective one of the computed Fourier Transform values $FT_1$, $FT_2$, $FT_3$). Thereafter at step 146 the processor 16 is operable to store the computed results in the memory 18 and/or to control one or more of the peripheral devices 20 to display the results for observation and/or further analysis.

It is generally understood that the mass-to-charge ratio (m/z) of ion(s) oscillating back and forth between opposing ion mirrors in any of the ELITs or ELIT regions E1-E3 is inversely proportional to the square of the fundamental frequency ff of the oscillating ion(s) according to the equation:

$$m/z=C/ff^2,$$

where C is a constant that is a function of the ion energy and also a function of the dimensions of the respective ELIT or ELIT region, and the fundamental frequency ff is determined directly from the respective computed Fourier Transform. Thus, $ff_1$ is the fundamental frequency of $FT_1$, $ff_2$ is the fundamental frequency of $FT_2$ and $ff_3$ is the fundamental frequency of $FT_3$. Typically, C is determined using conventional ion trajectory simulations. In any case, the value of the ion charge, z, is proportional to the magnitude $FT_{MAG}$ of the FT, taking into account the number of ion oscillation cycles. Ion mass, m, is then calculated as a product of m/z and z. Thus, with respect to the recorded set of charge detection signals provided by the first charge preamplifier CP1, the processor 16 is operable at step 144 to compute $m/z_1=C/ff_1^2$, $z_1=F(FT_{MAG1})$ and $m_1=(m/z_1)(z_1)$. With respect to the recorded set of charge detection signals provided by the second charge preamplifier CP2, the processor 16 is similarly operable at step 144 to compute $m/z_2=C/ff_2^2$, $z_2=F(FT_{MAG2})$ and $m_2=(m/z_2)(z_2)$, and with respect to the recorded set of charge detection signals provided by the third charge preamplifier CP3, the processor 16 is likewise operable at step 144 to compute $m/z_3=C/ff_3^2$, $z_3=F(FT_{MAG3})$ and $m_3=(m/z_3)(z_3)$.

Figure 5A:
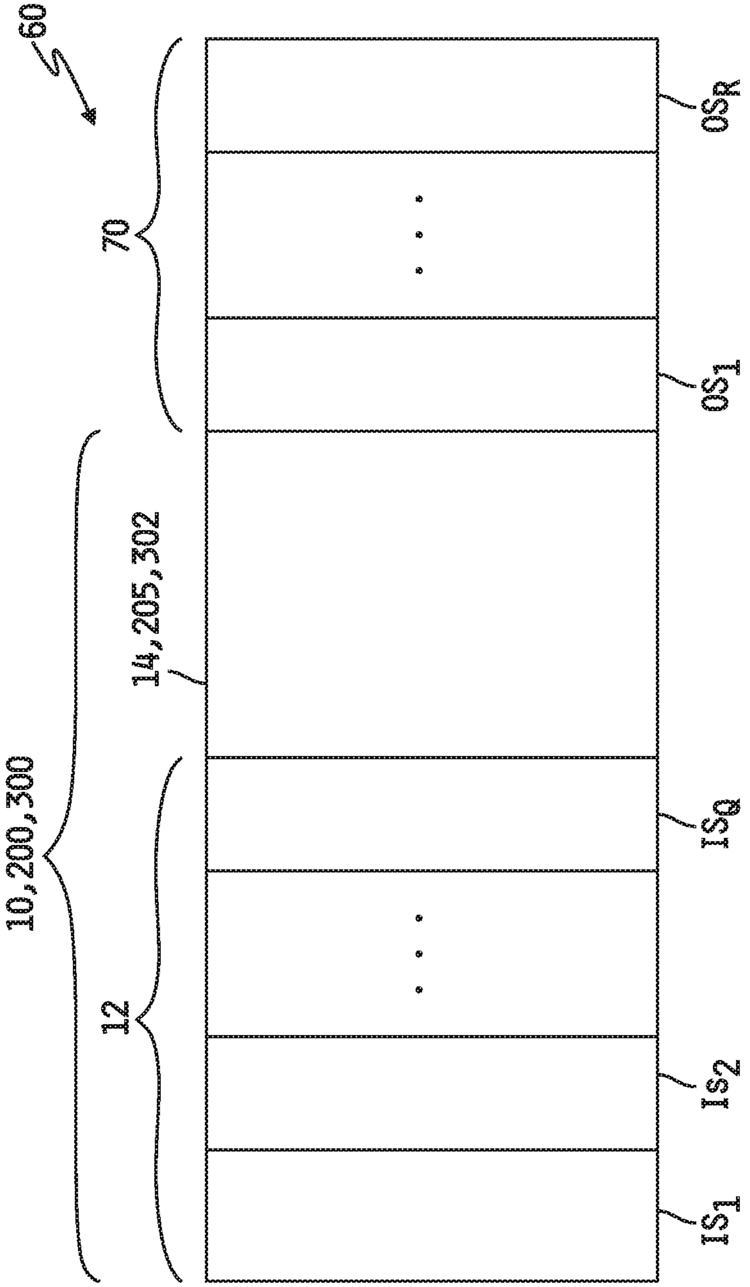
FIG. 5A is a simplified block diagram of an embodiment of an ion separation instrument including any of the ELIT arrays illustrated and described herein and showing example ion processing instruments which may form part of the ion source upstream of the ELIT array(s) and/or which may be disposed downstream of the ELIT array(s) to further process ion(s) exiting the ELIT array(s).

Referring now to FIG. 5A, a simplified block diagram is shown of an embodiment of an ion separation instrument 60 which may include any of the ELIT arrays 14, 205, 302 illustrated and described herein and which may include any of the ion mass detection systems 10, 200, 300 illustrated and described herein, and which may include any number of ion processing instruments which may form part of the ion source 12 upstream of the ELIT array(s) and/or which may include any number of ion processing instruments which may be disposed downstream of the ELIT array(s) to further process ion(s) exiting the ELIT array(s). In this regard, the ion source 12 is illustrated in FIG. 5A as including a number, Q, of ion source stages $IS_1$-$IS_Q$ which may be or form part of the ion source 12. Alternatively or additionally, an ion processing instrument 70 is illustrated in FIG. 5A as being coupled to the ion outlet of the ELIT array 14, 205, 302, wherein the ion processing instrument 70 may include any number of ion processing stages $OS_1$-$OS_R$, where R may be any positive integer.

Focusing on the ion source 12, it will be understood that the source 12 of ions entering the ELIT 10 may be or include, in the form of one or more of the ion source stages $IS_1$-$IS_Q$, any conventional source of ions as described above, and may further include one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing ion charge states, and the like. It will be understood that the ion source 12 may include one or any combination, in any order, of any such conventional ion sources, ion separation instruments and/or ion processing instruments, and that some embodiments may include multiple adjacent or spaced-apart ones of any such conventional ion sources, ion separation instruments and/or ion processing instruments.

Turning now to the ion processing instrument 70, it will be understood that the instrument 70 may be or include, in the form of one or more of the ion processing stages $OS_1$-$OS_R$, one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing ion charge states, and the like. It will be understood that the ion processing instrument 70 may include one or any combination, in any order, of any such conventional ion separation instruments and/or ion processing instruments, and that some embodiments may include multiple adjacent or spaced-apart ones of any such conventional ion separation instruments and/or ion processing instruments. In any implementation which includes one or more mass spectrometers, any one or more such mass spectrometers may be implemented in any of the forms described above with respect to FIG. 1.

As one specific implementation of the ion separation instrument 60 illustrated in FIG. 5A, which should not be considered to be limiting in any way, the ion source 12 illustratively includes 3 stages, and the ion processing instrument 70 is omitted. In this example implementation, the ion source stage $IS_1$ is a conventional source of ions, e.g., electrospray, MALDI or the like, the ion source stage $IS_2$ is a conventional mass filter, e.g., a quadrupole or hexapole ion guide operated as a high-pass or band-pass filter, and the ion source stage $IS_3$ is a mass spectrometer of any of the types described above. In this embodiment, the ion source stage $IS_2$ is controlled in a conventional manner to preselect ions having desired molecular characteristics for analysis by the downstream mass spectrometer, and to pass only such preselected ions to the mass spectrometer, wherein the ions analyzed by the ELIT array 14, 205, 302 will be the preselected ions separated by the mass spectrometer according to mass-to-charge ratio. The preselected ions exiting the ion filter may, for example, be ions having a specified ion mass or mass-to-charge ratio, ions having ion masses or ion mass-to-charge ratios above and/or below a specified ion mass or ion mass-to-charge ratio, ions having ion masses or ion mass-to-charge ratios within a specified range of ion mass or ion mass-to-charge ratio, or the like. In some alternate implementations of this example, the ion source stage $IS_2$ may be the mass spectrometer and the ion source stage $IS_3$ may be the ion filter, and the ion filter may be otherwise operable as just described to preselect ions exiting the mass spectrometer which have desired molecular characteristics for analysis by the downstream ELIT array 14, 205, 302. In other alternate implementations of this example, the ion source stage $IS_2$ may be the ion filter, and the ion source stage $IS_3$ may include a mass spectrometer followed by another ion filter, wherein the ion filters each operate as just described.

As another specific implementation of the ion separation instrument 60 illustrated in FIG. 5A, which should not be considered to be limiting in any way, the ion source 12 illustratively includes 2 stages, and the ion processing instrument 70 is omitted. In this example implementation, the ion source stage $IS_1$ is a conventional source of ions, e.g., electrospray, MALDI or the like, the ion source stage $IS_2$ is a conventional mass spectrometer of any of the types described above. This is the implementation described above with respect to FIG. 1 in which the ELIT array 14, 205, 302 is operable to analyze ions exiting the mass spectrometer.

As yet another specific implementation of the ion separation instrument 60 illustrated in FIG. 5A, which should not be considered to be limiting in any way, the ion source 12 illustratively includes 2 stages, and the ion processing instrument 70 is omitted. In this example implementation, the ion source stage $IS_1$ is a conventional source of ions, e.g., electrospray, MALDI or the like, and the ion processing stage $OS_2$ is a conventional single or multiple-stage ion mobility spectrometer. In this implementation, the ion mobility spectrometer is operable to separate ions, generated by the ion source stage $IS_1$, over time according to one or more functions of ion mobility, and the ELIT array 14, 205, 302 is operable to analyze ions exiting the ion mobility spectrometer. In an alternate implementation of this example, the ion source 12 may include only a single stage $IS_1$ in the form of a conventional source of ions, and the ion processing instrument 70 may include a conventional single or multiple-stage ion mobility spectrometer as a sole stage $OS_1$ (or as stage $OS_1$ of a multiple-stage instrument 70). In this alternate implementation, the ELIT array 14, 205, 302 is operable to analyze ions generated by the ion source stage $IS_1$, and the ion mobility spectrometer $OS_1$ is operable to separate ions exiting the ELIT array 14, 205, 302 over time according to one or more functions of ion mobility. As another alternate implementation of this example, single or multiple-stage ion mobility spectrometers may follow both the ion source stage $IS_1$ and the ELIT array 14, 205, 302. In this alternate implementation, the ion mobility spectrometer following the ion source stage $IS_1$ is operable to separate ions, generated by the ion source stage $IS_1$, over time according to one or more functions of ion mobility, the ELIT array 14, 205, 302 is operable to analyze ions exiting the ion source stage ion mobility spectrometer, and the ion mobility spectrometer of the ion processing stage $OS_1$ following the ELIT array 14, 205, 302 is operable to separate ions exiting the ELIT array 14, 205, 302 over time according to one or more functions of ion mobility. In any implementations of the embodiment described in this paragraph, additional variants may include a mass spectrometer operatively positioned upstream and/or downstream of the single or multiple-stage ion mobility spectrometer in the ion source 12 and/or in the ion processing instrument 210.

As still another specific implementation of the ion separation instrument 60 illustrated in FIG. 5A, which should not be considered to be limiting in any way, the ion source 12 illustratively includes 2 stages, and the ion processing instrument 70 is omitted. In this example implementation, the ion source stage $IS_1$ is a conventional liquid chromatograph, e.g., HPLC or the like configured to separate molecules in solution according to molecule retention time, and the ion source stage $IS_2$ is a conventional source of ions, e.g., electrospray or the like. In this implementation, the liquid chromatograph is operable to separate molecular components in solution, the ion source stage $IS_2$ is operable to generate ions from the solution flow exiting the liquid chromatograph, and the ELIT array 14, 205, 302 is operable to analyze ions generated by the ion source stage $IS_2$. In an alternate implementation of this example, the ion source stage $IS_1$ may instead be a conventional size-exclusion chromatograph (SEC) operable to separate molecules in solution by size. In another alternate implementation, the ion source stage $IS_1$ may include a conventional liquid chromatograph followed by a conventional SEC or vice versa. In this implementation, ions are generated by the ion source stage $IS_2$ from a twice separated solution; once according to molecule retention time followed by a second according to molecule size, or vice versa. In any implementations of the embodiment described in this paragraph, additional variants may include a mass spectrometer operatively positioned between the ion source stage $IS_2$ and the ELIT 14, 205, 302.

Figure 5B:
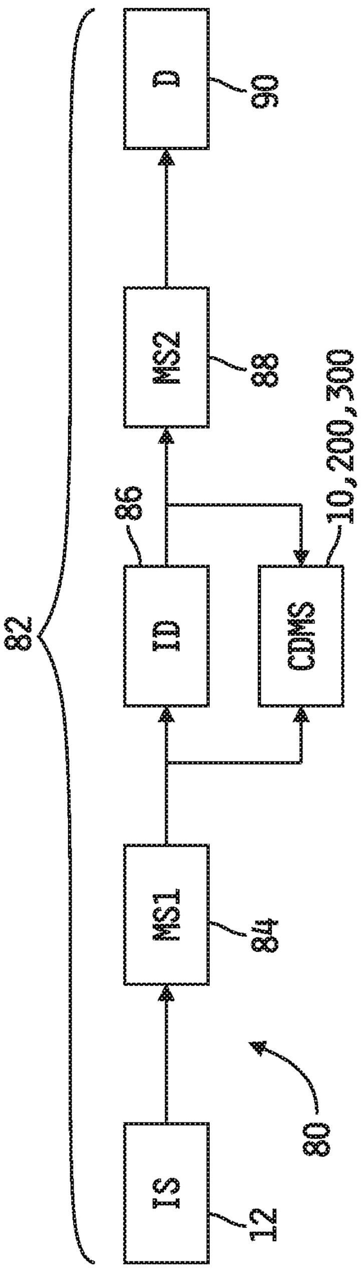
FIG. 5B is a simplified block diagram of another embodiment of an ion separation instrument including any of the ELIT arrays illustrated and described herein and showing example implementation which combines conventional ion processing instruments with any of the embodiments of the ion mass detection system illustrated and described herein.

Referring now to FIG. 5B, a simplified block diagram is shown of another embodiment of an ion separation instrument 80 which illustratively includes a multi-stage mass spectrometer instrument 82 and which also includes any of the ion mass detection systems 10, 200, 300, i.e., CDMS, illustrated and described herein implemented as a high ion mass analysis component. In the illustrated embodiment, the multi-stage mass spectrometer instrument 82 includes an ion source (IS) 12, as illustrated and described herein, followed by and coupled to a first conventional mass spectrometer (MS1) 84, followed by and coupled to a conventional ion dissociation stage (ID) 86 operable to dissociate ions exiting the mass spectrometer 84, e.g., by one or more of collision-induced dissociation (CID), surface-induced dissociation (SID), electron capture dissociation (ECD) and/or photo-induced dissociation (PID) or the like, followed by an coupled to a second conventional mass spectrometer (MS2) 88, followed by a conventional ion detector (D) 90, e.g., such as a microchannel plate detector or other conventional ion detector. The ion mass detection system 10, 200, 300, i.e., CDMS, is coupled in parallel with and to the ion dissociation stage 86 such that the ion mass detection system 10, 200, 300, i.e., CDMS, may selectively receive ions from the mass spectrometer 84 and/or from the ion dissociation stage 86.

MS/MS, e.g., using only the ion separation instrument 82, is a well-established approach where precursor ions of a particular molecular weight are selected by the first mass spectrometer 84 (MS1) based on their m/z value. The mass selected precursor ions are fragmented, e.g., by collision-induced dissociation, surface-induced dissociation, electron capture dissociation or photo-induced dissociation, in the ion dissociation stage 86. The fragment ions are then analyzed by the second mass spectrometer 86 (MS2). Only the m/z values of the precursor and fragment ions are measured in both MS1 and MS2. For high mass ions, the charge states are not resolved and so it is not possible to select precursor ions with a specific molecular weight based on the m/z value alone. However, by coupling the instrument 82 to the CDMS 10, 200, 300 illustrated and described herein, it is possible to select a narrow range of m/z values and then use the CDMS 10, 200, 300 to determine the masses of the m/z selected precursor ions. The mass spectrometers 84, 88 may be, for example, one or any combination of a magnetic sector mass spectrometer, time-of-flight mass spectrometer or quadrupole mass spectrometer, although in alternate embodiments other mass spectrometer types may be used. In any case, the m/z selected precursor ions with known masses exiting MS1 can be fragmented in the ion dissociation stage 86, and the resulting fragment ions can then be analyzed by MS2 (where only the m/z ratio is measured) and/or by the CDMS instrument 10, 200, 300 (where the m/z ratio and charge are measured simultaneously). Low mass fragments can thus be analyzed by conventional MS while high mass fragments (where the charge states are not resolved) are analyzed by CDMS.

Figure 6:
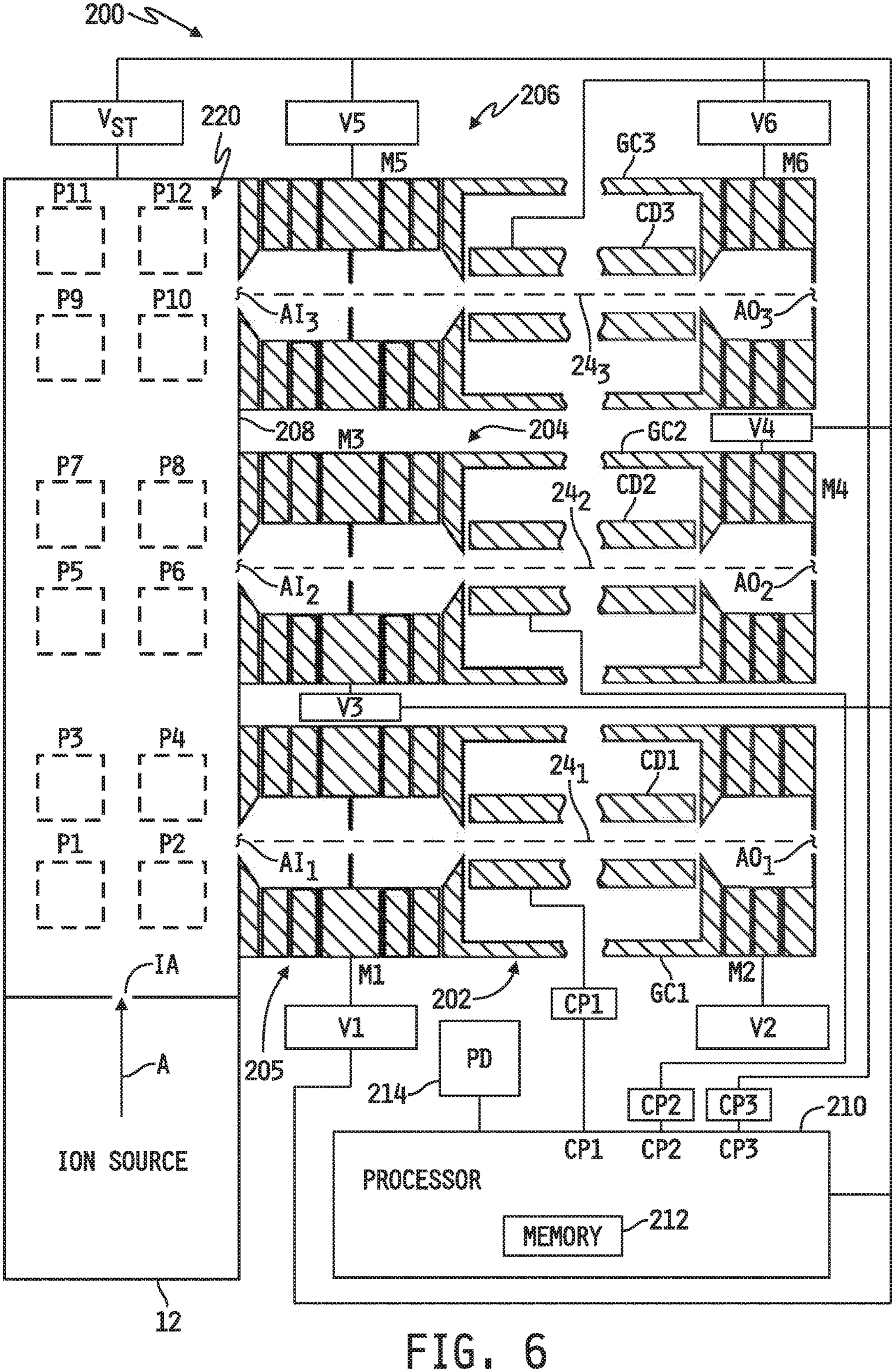
FIG. 6 is a simplified diagram of an ion mass detection system including another embodiment of an electrostatic linear ion trap (ELIT) array with control and measurement components coupled thereto.

Referring now to FIG. 6, an ion mass detection system 200 is shown including another embodiment of an electrostatic linear ion trap (ELIT) array 205 with control and measurement components coupled thereto. In the illustrated embodiment, the ELIT array 205 includes three separate ELITs 202, 204, 206 each configured identically to the ELIT or ELIT region E3 of the ELIT array 14 illustrated in FIG. 1. For example, the ELIT 202 includes a charge detection cylinder CD1 surrounded by a ground chamber GC1, wherein one end of the ground chamber GC1 defines one of the mirror electrodes of one ion mirror M1 and an opposite end of the ground chamber GC1 defines one of the mirror electrodes of another ion mirror M2, and wherein the ion mirrors M1, M2 are disposed at opposite ends of the charge detection cylinder 202. The ion mirror M1 is illustratively identical in structure and function to each of the ion mirrors M1-M3 illustrated in FIGS. 1-2B, and the ion mirror M2 is illustratively identical in structure and function to the ion mirror M4 illustrated in FIGS. 1-2B. A voltage source V1, illustratively identical in structure and function to the voltage source V1 illustrated in FIGS. 1-2B, is operatively coupled to the ion mirror M1, and another voltage source V2, illustratively identical in structure and function to the voltage source V4 illustrated in FIGS. 1-2B, is operatively coupled to the ion mirror M2. The ion mirror M1 defines an ion inlet aperture Ali, illustratively identical in structure and function to the aperture A1 of the ion Mirror MX illustrated in FIG. 2A, and the ion mirror M2 defines an outlet aperture $AO_1$, illustratively identical in structure and operation to the aperture CA of the ion mirror M4 described above with respect to FIGS. 1 and 2B. A longitudinal axis $24_1$ extends centrally through the ELIT 202 and illustratively bisects the apertures $AI_1$ and $AO_1$. A charge preamplifier CP1 is electrically coupled to the charge detection cylinder CD1, and is illustratively identical in structure and function to the charge preamplifier CP1 illustrated in FIG. 1 and described above.

The ELIT 204 is illustratively identical to the ELIT 202 just described with ion mirrors M3, M4 corresponding to the ion mirrors M1, M2 of the ELIT 202, with the voltage sources V3, V4 corresponding to the voltage sources V1, V2 of the ELIT 202 and with inlet/outlet apertures $AI_2/AO_2$ defining a longitudinal axis $24_2$ extending through the ELIT 204 and illustratively bisecting the apertures $AI_2$, $AO_2$. A charge amplifier CP2 is electrically coupled to the charge detection cylinder CD2 of the ELIT 204, and is illustratively identical in structure and function to the charge preamplifier CP2 illustrated in FIG. 1 and described above.

The ELIT 206 is likewise illustratively identical to the ELIT 202 just described with ion mirrors M5, M6 corresponding to the ion mirrors M1, M2 of the ELIT 202, with the voltage sources V5, V6 corresponding to the voltage sources V1, V2 of the ELIT 202 and with inlet/outlet apertures $AI_3/AO_3$ defining a longitudinal axis $24_3$ extending through the ELIT 206 and illustratively bisecting the apertures $AI_3$, $AO_3$. A charge amplifier CP3 is electrically coupled to the charge detection cylinder CD3 of the ELIT 206, and is illustratively identical in structure and function to the charge preamplifier CP3 illustrated in FIG. 1 and described above.

The voltage sources V1-V6, as well as the charge preamplifier CP1-CP3, are operatively coupled to a processor 210 including a memory 212 as described with respect to FIG. 1, wherein the memory 212 illustratively has instructions stored therein which, when executed by the processor 210, cause the processor 210 to control operation of the voltage sources V1-V6 to control the ion mirrors M1-M6 between ion transmission and ion reflection operating modes as described above. Alternatively, one or more of the voltage sources V1-V6 may be programmable to operate as described. In any case, the instructions stored in the memory 212 further illustratively include instructions which, when executed by the processor 210, cause the processor to receive, process and record (store) the charge signals detected by the charge preamplifiers CP1-CP3, and to process the recorded charge signal information to compute the masses of ions captured within each of the ELITs 202, 204, 206 as described above. Illustratively, the processor 210 is coupled to one or more peripheral devices 214 which may be identical to the one or more peripheral devices 20 described above with respect to FIG. 1.

In the embodiment illustrated in FIG. 6, an embodiment of an ion steering array 208 is shown operatively coupled between an ion source 12 and the ion inlet apertures $AI_1$-$AI_3$ of each ELIT 202, 204, 206 in the ELIT array 205. The ion source 12 is illustratively as described with respect to FIGS. 1 and/or 5, and is configured to generate and supply ions to the ion steering array 208 via an ion aperture IA. An ion steering voltage source $V_{ST}$ is operatively coupled to and between the processor 210 and the ion steering array 208. As will be described in detail below, the processor 210 is illustratively configured, i.e., programmed, to control the ion steering voltage source $V_{ST}$ to cause the ion steering array 208 to selectively steer and guide ions exiting the ion aperture IA of the ion source 12 into the ELITs 202, 204 and 206 via the respective inlet apertures $AI_1$-$AI_3$ thereof. The processor 210 is further configured, i.e., programmed, to control the voltage sources V1-V6 to cause the ion mirrors M1-M6 of the ELITs 202, 204, 206 to selectively switch between the ion transmission and ion reflection modes to thereby trap at least one ion in each of the ELITs 202, 204, 206, and to then cause such ions to oscillate back and forth between the respective ion mirrors M1/M2, M3/M4 and M5/M6 and through the respective charge detection cylinders CD1-CD3 of the ELITs 202, 204, 206 in order to measure and record ion charge detection events detected by the respective charge preamplifiers CP1-CP3 as described above.

The ion steering array 208 illustratively includes 3 sets of four electrically conductive pads P1-P4, P5-P8 and P9-P12 arranged on each of two spaced-apart planar substrates such that each of the electrically conductive pads P1-P12 on one of the planar substrates is aligned with and faces a respective one of the electrically conductive pads on the other substrate. In the embodiment illustrated in FIG. 6, only one of the substrates 220 is shown.

Figure 7A:
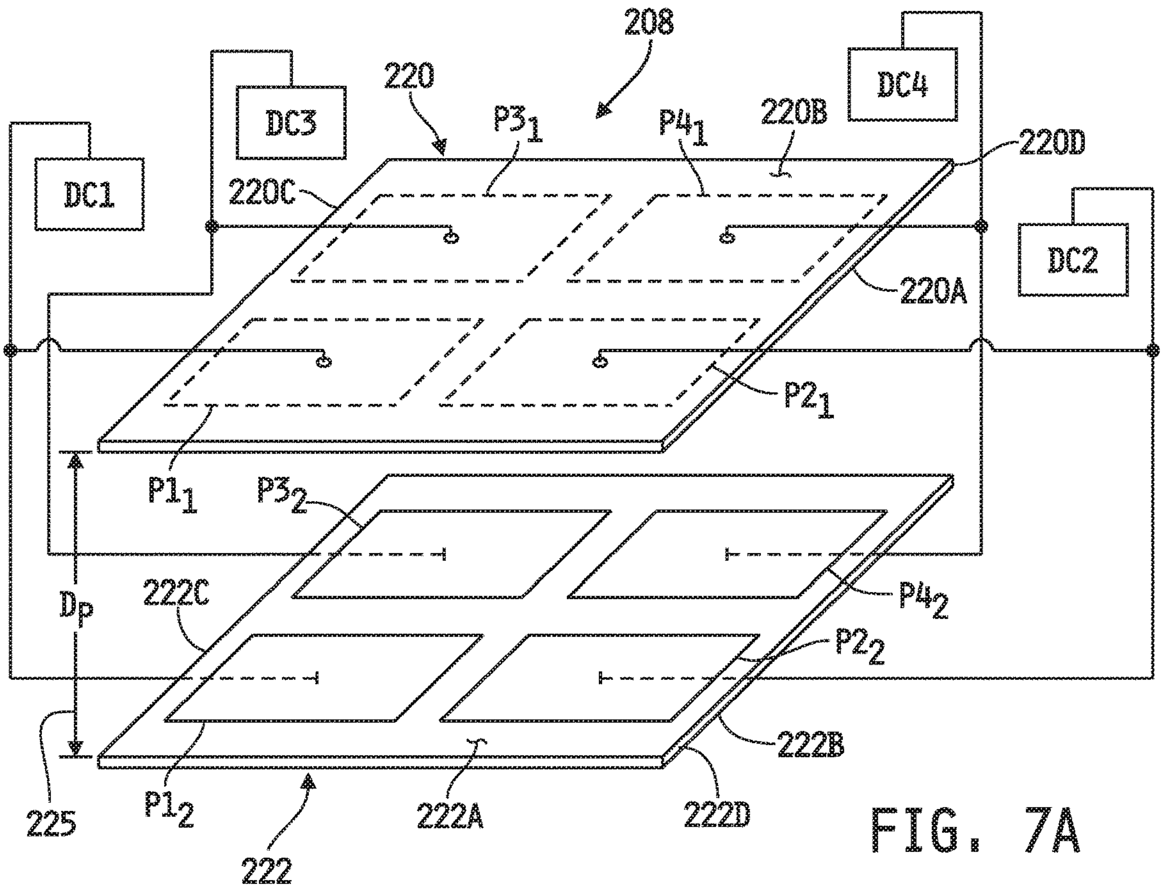
FIG. 7A is a simplified perspective view of an example embodiment of a single ion steering channel that may be implemented in the ion steering channel array illustrated in FIG. 6.
Figure 7B:
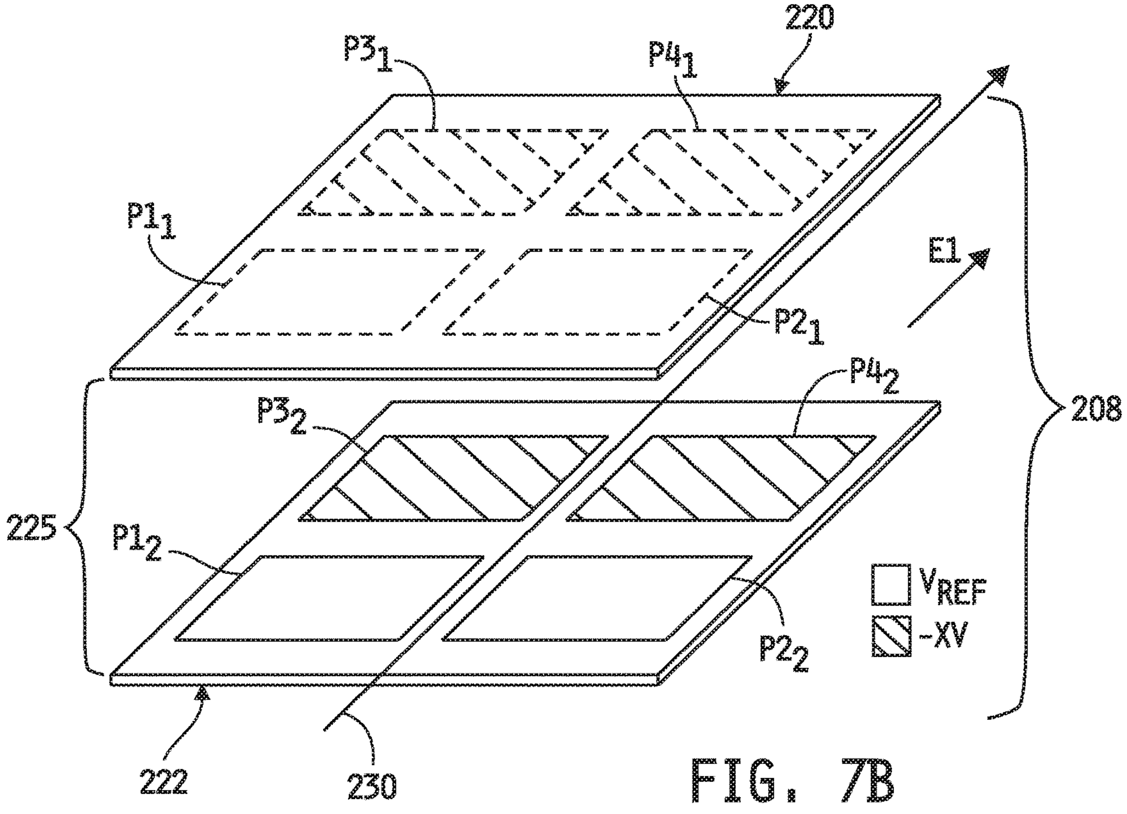
FIG. 7B is a simplified perspective diagram illustrating an example operating mode of the ion steering channel illustrated in FIG. 7A.
Figure 7C:
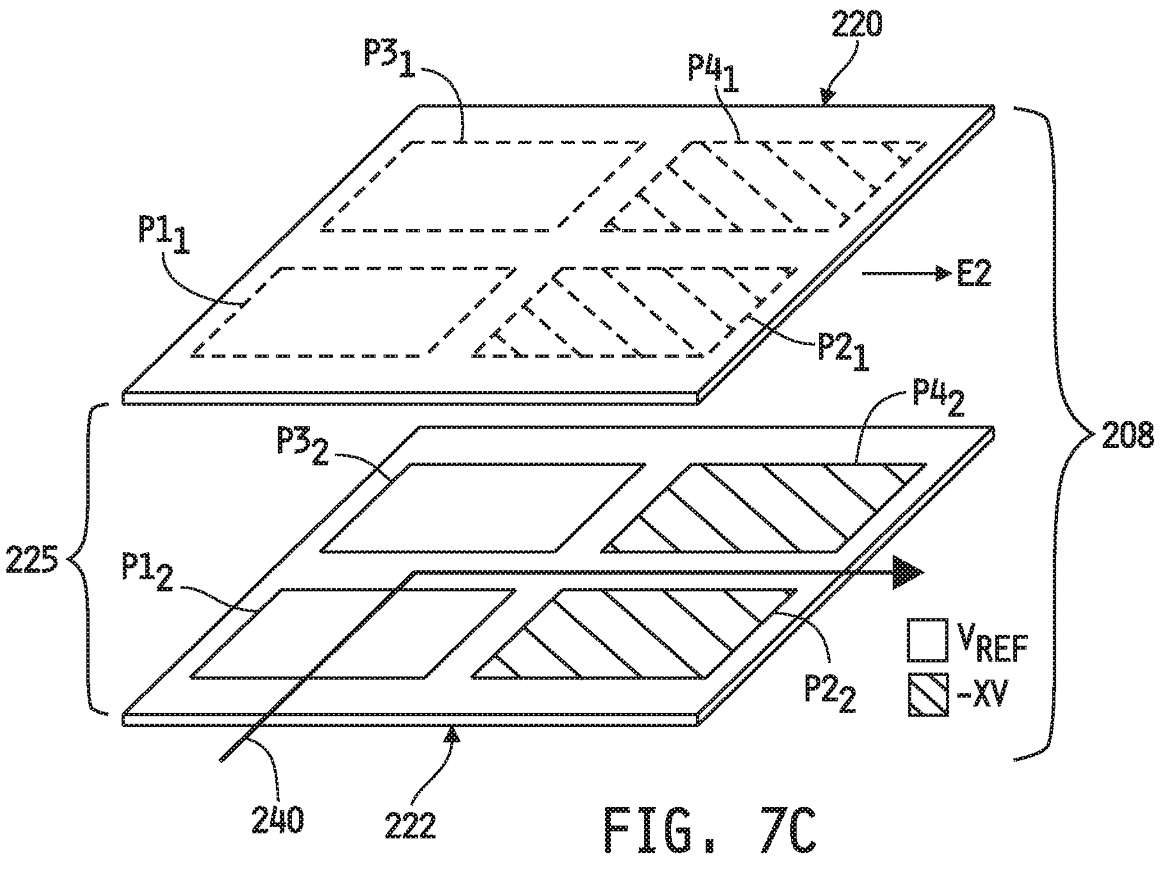
FIG. 7C is a simplified perspective diagram illustrating another example operating mode of the ion steering channel illustrated in FIG. 7A.

Referring now to FIGS. 7A-7C, a portion of the ion steering array 208 is shown which illustrates control and operation thereof to selectively steer ions to desired locations. As shown by example in FIGS. 7B and 7C, the voltage sources DC1-DC4 of the illustrated portion of the ion steering 208 are controlled to cause ions exiting the ion aperture IA of the ion source 12 along the direction indicated by the arrow A to change direction by approximately 90 degrees so as to be directed along a path which is aligned, i.e., collinear, with the ion inlet aperture $AI_1$ of the ELIT 202. Although not illustrated in the drawings, any number of conventional planar ion carpets and/or other conventional ion focusing structures may be used to focus the ion trajectories exiting the ion aperture IA of the ion source and/or to and align the ion trajectories selectively altered by the ion steering array 208 with the ion inlet apertures $AI_1$-$AI_3$ of the respective ELITs 202, 204, 206.

Referring specifically to FIG. 7A, a pattern of 4 substantially identical and spaced apart electrically conductive pads $P1_1$-$P4_1$ is formed on an inner major surface 220A of one substrate 220 having an opposite outer major surface 220B, and an identical pattern of 4 substantially identical and spaced apart electrically conductive pads $P1_2$-$P4_2$ is formed on an inner major surface 222A of another substrate 222 having an opposite outer surface 222B. The inner surfaces 220A, 222A of the substrates 220, 222 are spaced apart in a generally parallel relationship, and the electrically conductive pads $P1_1$-$P4_1$ are juxtaposed over respective ones of the electrically conductive pads $P1_2$-$P4_2$. The spaced-apart, inner major surfaces 220A and 222A of the substrates 220, 222 illustratively define a channel or space 225 therebetween of width a distance DP. In one embodiment, the width, DP, of the channel 225 is approximately 5 cm, although in other embodiments the distance DP may be greater or lesser than 5 cm. In any case, the substrates 220, 222 together make up the illustrated portion of the ion steering array 208.

The opposed pad pairs $P3_1$, $P3_2$ and $P4_1$, $P4_2$ are upstream of the opposed pad pairs $P1_1$, $P1_2$ and $P2_1$, $P2_2$, and the opposed pad pairs $P1_1$, $P1_2$ and $P2_1$, $P2_2$ are conversely downstream of the opposed pad pairs $P4_1$, $P4_2$ and $P3_1$, $P3_2$. In this regard, the "unaltered direction of ion travel" through the channel 225, as this term is used herein, is "upstream," and generally parallel with the direction A of ions exiting the ion source 12. Transverse edges 220C, 222C of the substrates 220, 222 are aligned, as are opposite transverse edges 220D, 222D, and the "altered direction of ion travel" through the channel 225, as this term is used herein, is from the aligned edges 220C, 222C toward the aligned edges 220D, 222D, and generally perpendicular to both such aligned edges 220C, 222C and 220D, 222D.

In the embodiment illustrated in FIG. 6, the ion steering voltage source $V_{ST}$ is illustratively configured to produce at least 12 switchable DC voltages each operatively connected to respective opposed pairs of the electrically conductive pads P1-P12. Four of the 12 DC voltages DC1-D4 are illustrated in FIG. 7A. The first DC voltage DC1 is electrically connected to each of the juxtaposed electrically conductive pads $P1_1$, $P1_2$, the second DC voltage DC2 is electrically connected to each of the juxtaposed electrically conductive pads $P2_1$, $P2_2$, the third DC voltage DC3 is electrically connected to each of the juxtaposed electrically conductive pads $P3_1$, $P3_2$ and the fourth DC voltage DC4 is electrically connected to each of the juxtaposed electrically conductive pads $P4_1$, $P4_2$. In the illustrated embodiment, each of the DC voltages DC1-DC12 is independently controlled, e.g., via the processor 210 and/or via programming of the voltage source $V_{ST}$, although in alternate embodiments two or more of the DC voltages DC1-DC12 may be controlled together as a group. In any case, it will be understood that although the voltages DC1-DC12 are illustrated and disclosed as being DC voltages, this disclosure contemplates other embodiments in which the voltage source $V_{ST}$ is alternatively or additionally configured to produce any number of AC voltages such as, for example, one or more RF voltages, and to supply any one or more such AC voltages to corresponding ones or pairs of the electrically conductive pads and/or to one or more ion carpets or other ion focusing structures in embodiments which include them.

Referring now to FIGS. 7B and 7C, operation of the ion steering channel array 208 illustrated in FIG. 6 will be described using the four opposed pairs of electrically conductive pads $P1_1/P1_2$, $P2_1/P2_2$, $P3_1/P3_2$ and $P4_1/P4_2$ of FIGS. 7A and 7B as an illustrative example. It will be understood that the four electrically conductive pads P5-P8 and the four electrically conductive pads P9-P12 illustrated on the substrate 220 in FIG. 6 likewise each comprise opposed, aligned and juxtaposed electrically conductive pad pairs disposed on the inner surfaces 220A, 222A of the respective substrates 220, 222, and that each such set of four opposed pairs of electrically conductive pads are controllable by respective switchable DC (and/or AC) voltages DC5-DC12 produced by the voltage source $V_{ST}$. In any case, the DC voltages DC1-DC4 are omitted in FIGS. 7B and 7C for clarity of illustration, and instead the DC voltages DC1-DC4 produced by the voltage source $V_{ST}$ and applied to the connected pairs of electrically conductive pads $P1_1/P1_2$, $P2_1/P2_2$, $P3_1/P3_2$ and $P4_1/P4_2$ of are represented graphically. Referring specifically to FIG. 7B, the illustrated portion of the ion steering array 208 is shown in a state in which a reference potential, $V_{REF}$, is applied to each of the electrically conductive pad pairs $P1_1/P1_2$, $P2_1/P2_2$, and a potential —XV, less than $V_{REF}$, is applied to each of the electrically conductive pad pairs $P3_1/P3_2$ and $P4_1/P4_2$. Illustratively, $V_{REF}$ may be any positive or negative voltage, or may be zero volts, e.g., ground potential, and —XV may be any voltage, positive, negative or zero voltage that is less than $V_{REF}$ so as to establish an electric field E1 which is parallel with the sides 220C/222C and 220D/222D of the substrates 220, 222 and which extends in the unaltered direction of ion travel, i.e., from the downstream electrically conductive pad pairs $P1_1/P1_2$, $P2_1/P2_2$ toward the upstream electrically conductive pad pairs $P3_1/P3_2$ and $P4_1/P4_2$, as depicted in FIG. 7B. With the electric field, E1, established as illustrated in FIG. 7B, ions A exiting the ion source 12 via the ion aperture IA enter the channel 225 between the downstream electrically conductive pad pairs $P1_1/P1_2$, $P2_1/P2_2$ and are steered or guided (or directed) by the electric field, E1, along the unaltered direction of ion travel 230 which is in the same direction as the electric field E1 and which is aligned, i.e., collinear, with the ion aperture IA of the ion source 12. Such ions A are illustratively guided through the channel 225 along the unaltered direction of travel as illustrated in FIG. 7B.

Referring now specifically to FIG. 7C, when it is desired to change directions of the ions A from the unaltered direction of ion travel illustrated in FIG. 7B to the altered direction of ion travel, the DC voltages DC1, DC3 produced by the voltage source $V_{ST}$ are switched such that the reference potential, $V_{REF}$, is applied to each of the electrically conductive pad pairs $P2_1/P2_2$, $P3_1/P3_2$, and a potential —XV, less than $V_{REF}$, is applied to each of the electrically conductive pad pairs $P1_1/P1_2$, $P4_1/P4_2$, so as to establish an electric field E2 which is perpendicular to the sides 220C/222C and 220D/222D of the substrates 220, 222 and which extends in the unaltered direction of ion travel, i.e., from the sides 220C/222C of the substrates 220, 222 toward the sides 220D/222D of the substrates 220, 222, as depicted in FIG. 7C. With the electric field, E2, established as illustrated in FIG. 7C, ions A exiting the ion source 12 via the ion aperture IA and entering the channel 225 are steered or guided (or directed) by the electric field, E2, along the altered direction of ion travel 240, which is in the same direction as the electric field E2 and which is aligned, i.e., collinear, with the ion aperture IA of the ion source 12. Such ions A are illustratively guided through the channel 225 along the unaltered direction of travel between the electrically conductive pad pairs $P1_1/P1_2$, $P4_1/P4_2$, as illustrated in FIG. 7C. In some embodiments, one or more conventional ion carpets and/or other conventional ion focusing structures may be used to confine the ions along the ion trajectory 240 illustrated in FIG. 7C.

Referring again to FIG. 6, the instructions stored in the memory 212 illustratively include instructions which, when executed by the processor 210, cause the processor 210 to control the ion steering voltage source $V_{ST}$ to selectively produce and switch the voltages DC1-DC12 in a manner which guides ions along the ion steering array 208 and sequentially directs at least one ion into each ion inlet aperture $AI_1$-$AI_3$ of each respective ELIT 202, 204, 206, and to also control the voltage sources V1-V6 to selectively produce and switch the DC voltages produced thereby in a manner which controls the respective ion mirrors M1-M6 between their ion transmission and ion reflection modes to trap at least one ion guided into each ELIT 202, 204, 206 by the ion steering array 208 and to then cause each trapped ion(s) to oscillate back and forth between the respective ion mirrors M1-M6 of each ELIT 202, 204, 206 as the processor 210 records the respective ion charge detection information in the memory 214 as described above with respect to FIGS. 1-4B. With the aid of FIGS. 8A-8F, one example of such a process will be described as operating on one or more positively charged ions, although it will be understood that the process 100 may alternatively operate on one or more negatively charges particles. In the following description, references to any specific one or ones of the electrically conductive pads P1-P12 will be understood as referring to opposed, juxtaposed, spaced-apart pairs of electrically conductive pads disposed on the inner surfaces 220A, 222A of the substrates 220, 222 respectively as illustrated by example with respect to FIG. 7A, and references to voltages applied to any specific one or ones of the electrically conductive pads P1-P12 will be understood as being applied to both such opposed, juxtaposed, spaced-apart pairs of electrically conductive pads as illustrated by example with respect to FIGS. 7B and 7C. It will be further understood that the DC voltage $V_{REF}$ illustrated in FIGS. 8A-8F may be any positive or negative voltage, or may be zero volts, e.g., ground potential, and that the DC voltage —XV also illustrated in FIGS. 8A-8F may be any voltage, positive, negative or zero voltage that is less than $V_{REF}$ so as to establish a corresponding electric field within the channel 225 which extends in a direction from electrically conductive pads controlled to $V_{REF}$ toward electrically conductive pads controlled to —XV as illustrated by example in FIGS. 7B and 7C.

Figure 8A:
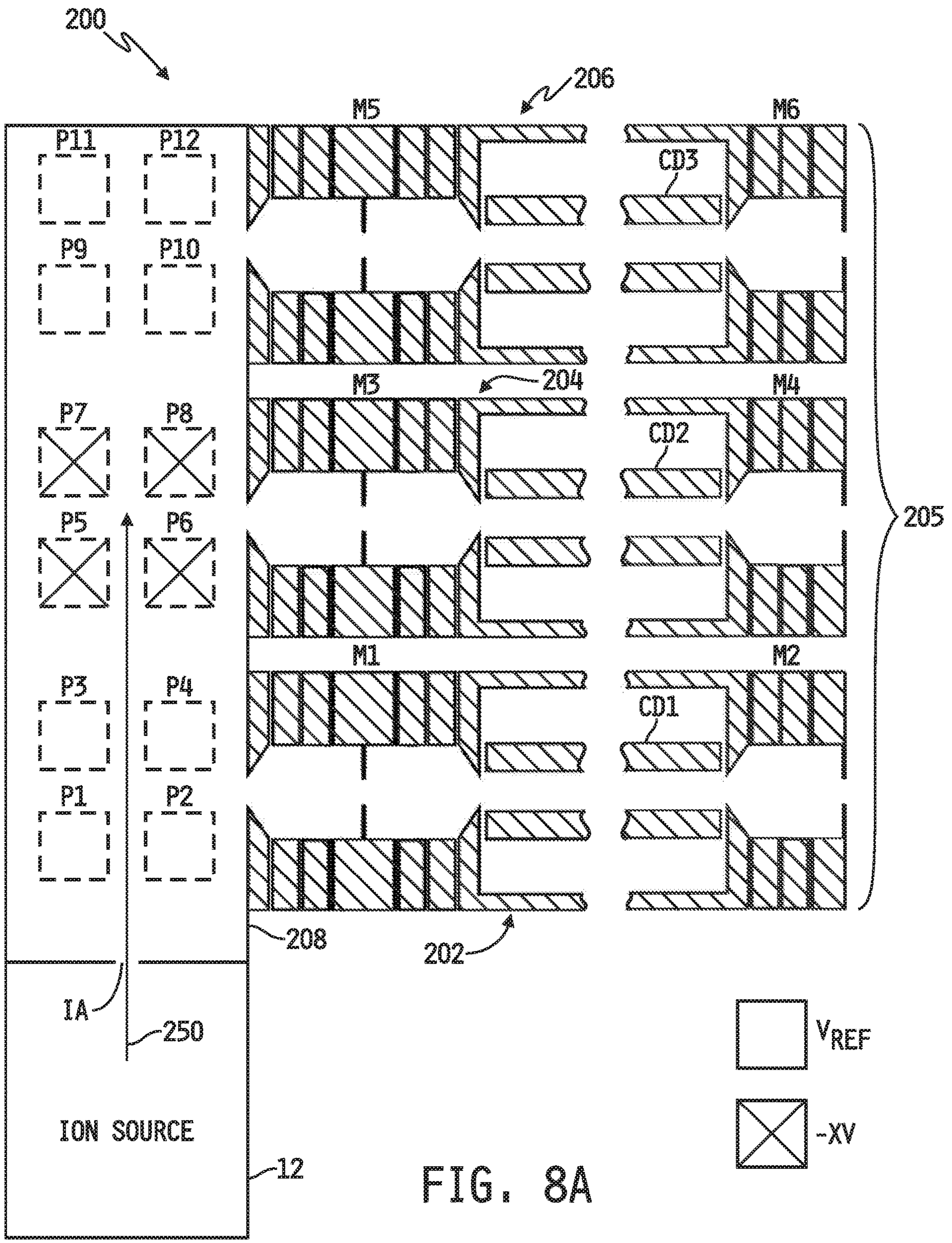
FIGS. 8A-8F are simplified diagrams of the ELIT array of FIG. 6 demonstrating example control and operation of the ion steering channel array and of the ELIT array.

With reference to FIG. 8A, the processor 210 is operable to control the voltage source $V_{ST}$ to apply —XV to each of the pads P5-P7, and the apply $V_{REF}$ to each of the pads P1-P4. In some implementation, $V_{ST}$ applies $V_{REF}$ to each of the pads P9-P12 as depicted in FIG. 8A, although in other implementations $V_{ST}$ may be controlled to apply —XV to each of the pads P9-P12. In any case, the electric field resulting within the channel 225 of the ion steering array 208 from such voltage applications draws ions exiting the ion aperture IA of the ion source 12 through the channel 225 in the unaltered direction of ion travel along the illustrated ion trajectory 250.

Figure 8B:
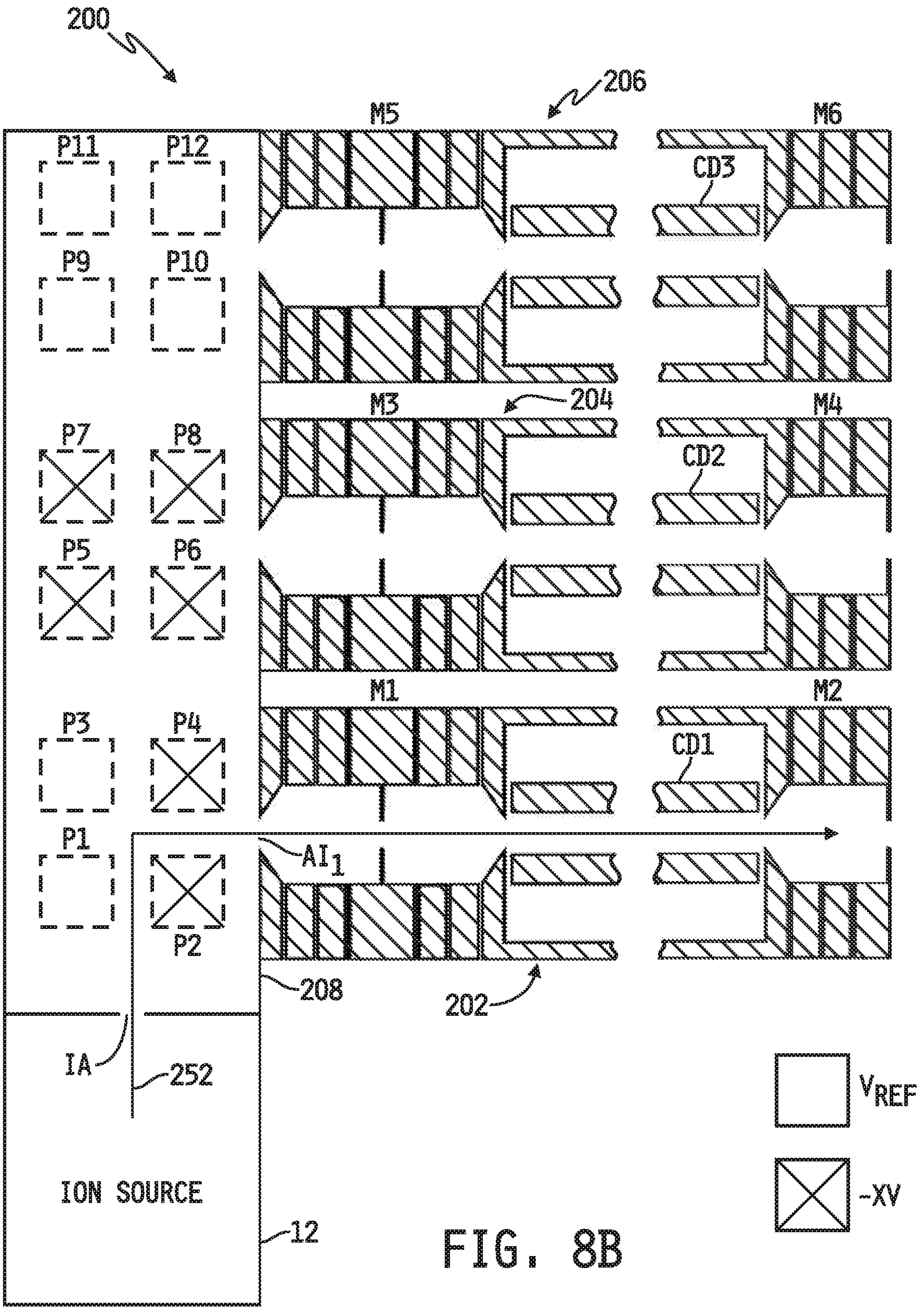

With reference to FIG. 8B, the processor 210 is subsequently operable to control the voltage source $V_{ST}$ to switch the voltages applied to pads P2 and P4 to —XV, and to otherwise maintain the previously applied voltages at P1, P3 and P5-P12. The electric field established in the channel 225 of the ion steering array 208 resulting from such switched voltage applications steers ions previously traveling from the ion source 12 in the unaltered direction of ion travel along the ion trajectory 250 illustrated in FIG. 8A along the altered direction of ion travel along the ion trajectory 252 toward the ion inlet aperture $AI_1$ of M1 of the ELIT 202. At the same time, prior to or after this switch, the processor 210 is operable to control the voltage sources V1 and V2 to produce voltages which cause both ion mirrors M1 and M2 to operate in their ion transmission modes, e.g., as described with respect to FIGS. 1-2B. As a result, ions traveling through the channel 225 of the ion steering array 208 along the ion trajectory 252 are directed into the inlet aperture $AI_1$ of the ELIT 202 through M1, and are transmitted by the ion transmission fields established in each of the ion mirrors M1 and M2 through M1, through the charge detection cylinder CD1 and through M2, as also illustrated by the ion trajectory 252 depicted in FIG. 8B. In some embodiments, one or more conventional ion carpets and/or other conventional ion focusing structures may be operatively positioned between the ion steering array 208 and the ion mirror M1 of the ELIT 202 to direct ions traveling along the ion trajectory 252 into the ion inlet aperture $AI_1$ of the ELIT 202. In any case, the processor 210 is operable at some point thereafter to control V2 to produce voltages which cause the ion mirror M2 to switch from the ion transmission mode of operation to the ion reflection mode of operation, e.g., as also described with respect to FIGS. 1-2B, so as to reflect ions back toward M1. The timing of this switch of M2 illustratively depends on whether the operation of the ELIT 202 is being controlled by the processor 210 in random trapping mode or in trigger trapping mode as described with respect to FIG. 3.

Figure 8C:
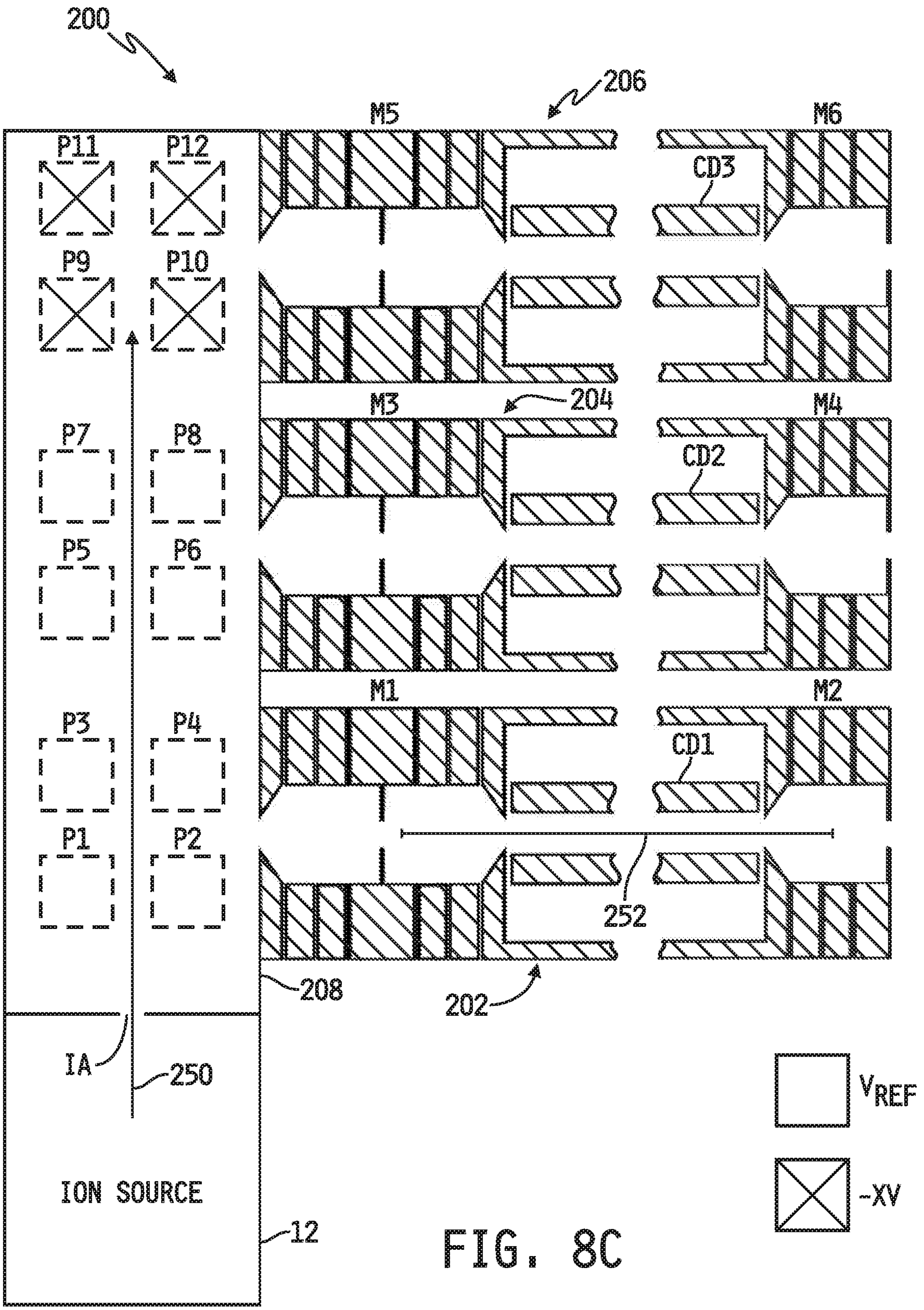

With reference to FIG. 8C, the processor 210 is subsequently operable to control the voltage source V1 to produce voltages which cause the ion mirror M1 to switch from ion transmission mode to ion reflection mode of operation. The timing of this switch of M1 illustratively depends on whether the operation of the ELIT 202 is being controlled by the processor 210 in random trapping mode or in trigger trapping mode as described with respect to FIG. 3, but in any case the switch of M1 to its ion reflection mode traps at least one ion within the ELIT 202 as illustrated by the ion trajectory 252 depicted in FIG. 8C. With at least one such ion trapped within the ELIT 202 and with both M1 and M2 controlled by the voltage sources V1 and V2 respectively to operate in their ion reflection modes, the ion(s) trapped within the ELIT 202 oscillates back and forth between the ion mirrors M1 and M2, each time passing through the charge detection cylinder CD1 and inducing a corresponding charge thereon which is detected by the charge preamplifier CP1 and recorded by the processor 210 in the memory 212 as described above with respect to FIG. 3.

At the same time or following control of the ELIT 202 as just described, and with the ion(s) oscillating within the ELIT 202 back and forth between the ion mirrors M1, M2, the processor 210 is operable to control $V_{ST}$ to switch the voltages applied to pads P2 and P4 back to $V_{REF}$, to switch the voltages applied to pads P5-P8 from —XV to $V_{REF}$ and to switch the voltages applied to pads P9-P12 from $V_{REF}$ to —XV, as also illustrated in FIG. 8C. The electric field resulting in the channel 225 of the ion steering array 208 from such voltage applications again draws ions exiting the ion aperture IA of the ion source 12 through the channel 225 in the unaltered direction of ion travel along the illustrated ion trajectory 250.

Figure 8D:
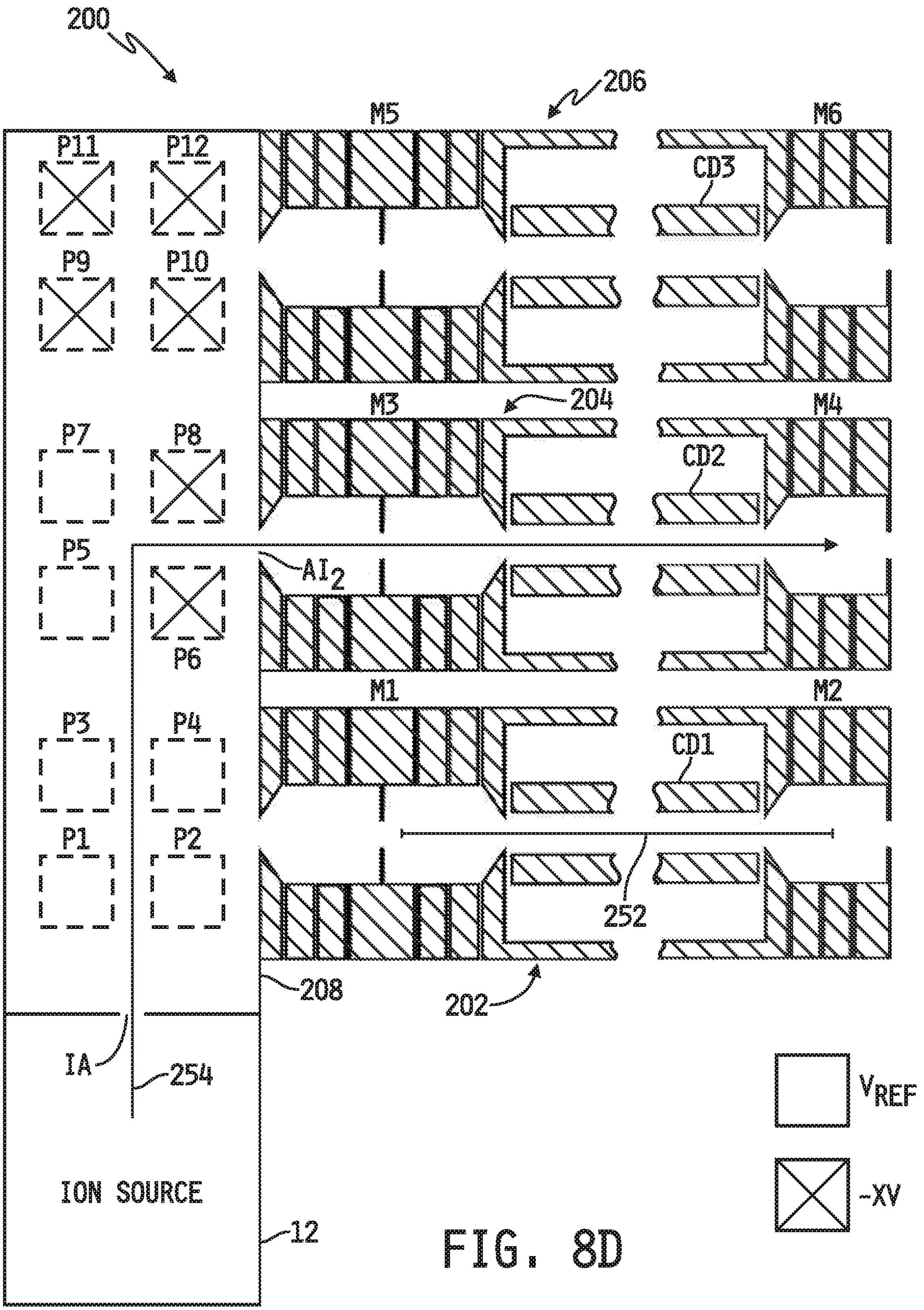

With reference now to FIG. 8D, the processor 210 is subsequently operable to control the voltage source $V_{ST}$ to switch the voltages applied to pads P6 and P8 to —XV, and to otherwise maintain the previously applied voltages at P1-P4, P5, P7 and P9-P12. The electric field established within the channel 225 of the ion steering array 208 resulting from such switched voltage applications steers ions previously traveling from the ion source 12 in the unaltered direction of ion travel along the ion trajectory 250 illustrated in FIG. 8C along the altered direction of ion travel along the ion trajectory 254 toward the ion inlet aperture $AI_2$ of M2 of the ELIT 204. At the same time, prior to or after this switch, the processor 210 is operable to control the voltage sources V3 and V4 to produce voltages which cause both ion mirrors M3 and M4 to operate in their ion transmission modes. As a result, ions traveling through the channel 225 of the ion steering array 208 along the ion trajectory 254 are directed into the inlet aperture $AI_2$ of the ELIT 204 through M3, and are transmitted by the ion transmission fields established in each of the ion mirrors M3 and M4 through M3, through the charge detection cylinder CD2 and through M4, as also illustrated by the ion trajectory 254 depicted in FIG. 8D. In some embodiments, one or more conventional ion carpets and/or other conventional ion focusing structures may be operatively positioned between the ion steering array 208 and the ion mirror M3 of the ELIT 204 to direct ions traveling along the ion trajectory 254 into the ion inlet aperture $AI_2$ of the ELIT 204. In any case, the processor 210 is operable at some point thereafter to control V4 to produce voltages which cause the ion mirror M4 to switch from the ion transmission mode of operation to the ion reflection mode of operation so as to reflect ions back toward M3. The timing of this switch of M4 illustratively depends on whether the operation of the ELIT 204 is being controlled by the processor 210 in random trapping mode or in trigger trapping mode as described with respect to FIG. 3.

Following the operating state illustrated in FIG. 8D, the processor 210 is operable, similarly as described with respect to FIG. 8C, to control the voltage source V3 to produce voltages which cause the ion mirror M3 to switch from ion transmission mode to ion reflection mode of operation. The timing of this switch of M3 illustratively depends on whether the operation of the ELIT 204 is being controlled by the processor 210 in random trapping mode or in trigger trapping mode as described with respect to FIG. 3, but in any case the switch of M3 to its ion reflection mode traps at least one ion within the ELIT 204 as illustrated by the ion trajectory 254 depicted in FIG. 8E. With at least one such ion trapped within the ELIT 204 and with both M3 and M4 controlled by the voltage sources V3 and V4 respectively to operate in their ion reflection modes, the ion(s) trapped within the ELIT 204 oscillates back and forth between the ion mirrors M3 and M4, each time passing through the charge detection cylinder CD2 and inducing a corresponding charge thereon which is detected by the charge preamplifier CP2 and recorded by the processor 210 in the memory 212 as described above with respect to FIG. 3. In the operating state illustrated in FIG. 8E, ions are simultaneously oscillating back and forth within each of the ELITs 202 and 204, and ion charge/timing measurements taken from each of the charge preamplifiers CP1 and CP2 are therefore simultaneously collected and stored by the processor 210.

Figure 8E:
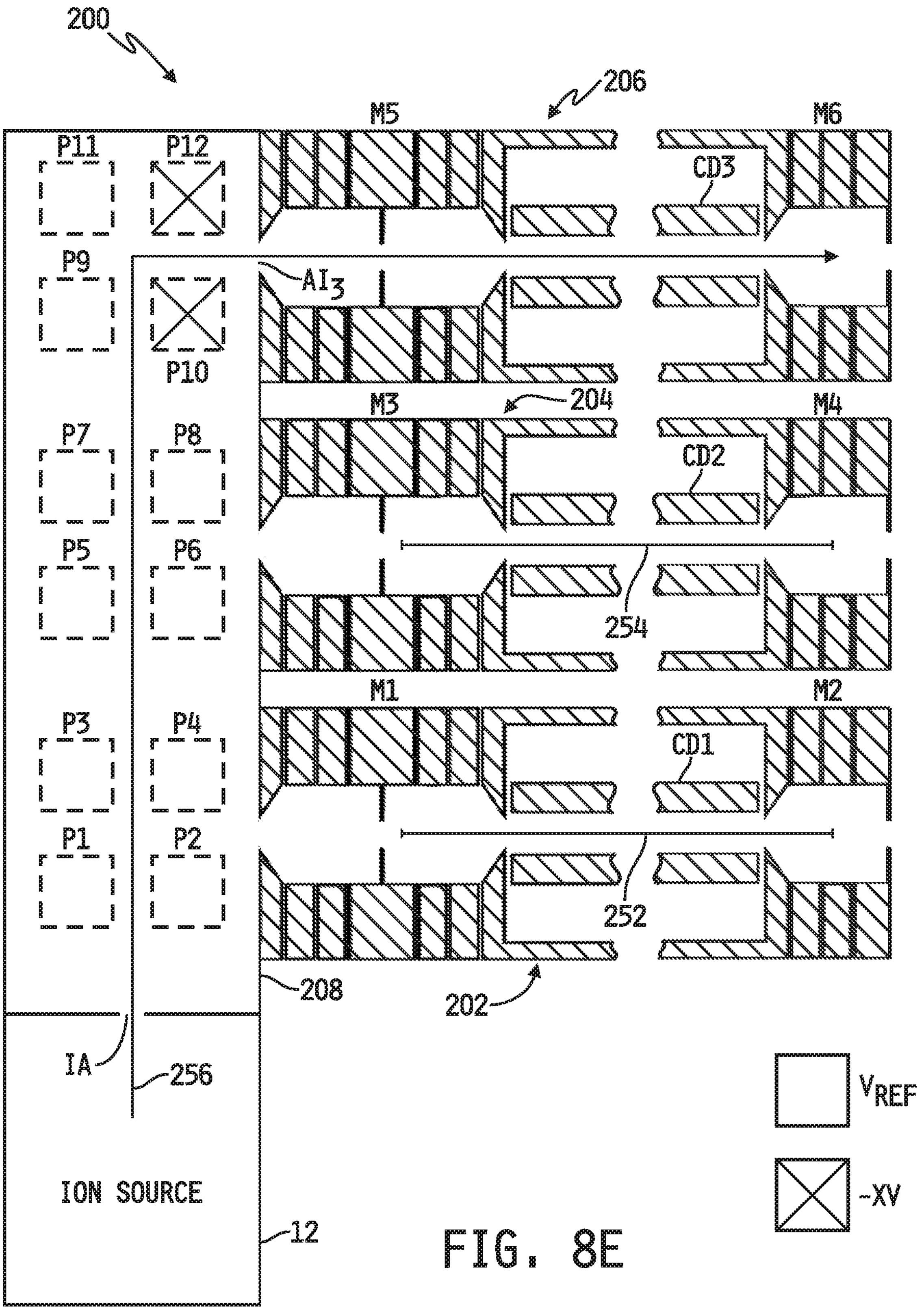

At the same time or following control of the ELIT 204 as just described with respect to FIG. 8E, and with the ion(s) oscillating simultaneously within each of the ELITs 202 and 204, the processor 210 is operable to control $V_{ST}$ to switch the voltages applied to pads P6 and P8 back to $V_{REF}$, so that the pads P1-P12 are controlled to the voltages illustrated in FIG. 8C. The electric field resulting in the channel 225 of the ion steering array 208 from such voltage applications again draws ions exiting the ion aperture IA of the ion source 12 through the channel 225 in the unaltered direction of ion travel along the illustrated ion trajectory 250 as illustrated in FIG. 8C. Thereafter, the processor 210 is operable to control the voltage source $V_{ST}$ to switch the voltages applied to pads P9 and $P1_1$ to $V_{REF}$, and to otherwise maintain the previously applied voltages at P1-P8, P5 and $P1_1$-$P1_2$. The electric field established within the channel 225 of the ion steering array 208 resulting from such switched voltage applications steers ions previously traveling from the ion source 12 in the unaltered direction of ion travel along the ion trajectory 250 illustrated in FIG. 8C along the altered direction of ion travel along the ion trajectory 256 toward the ion inlet aperture Ala of the ion mirror M5 of the ELIT 206. At the same time, prior to or after this switch, the processor 210 is operable to control the voltage sources V5 and V6 to produce voltages which cause both ion mirrors M5 and M6 to operate in their ion transmission modes. As a result, ions traveling through the channel 225 of the ion steering array 208 along the ion trajectory 253 are directed into the inlet aperture Ala of the ELIT 206 through M5, and are transmitted by the ion transmission fields established in each of the ion mirrors M5 and M6 through M5, through the charge detection cylinder CD3 and through M6, as illustrated by the ion trajectory 256 depicted in FIG. 8E. In some embodiments, one or more conventional ion carpets and/or other conventional ion focusing structures may be operatively positioned between the ion steering array 208 and the ion mirror M5 of the ELIT 206 to direct ions traveling along the ion trajectory 256 into the ion inlet aperture Ala of the ELIT 206.

In any case, the processor 210 is operable at some point thereafter to control V6 to produce voltages which cause the ion mirror M6 to switch from the ion transmission mode of operation to the ion reflection mode of operation so as to reflect ions back toward M5. The timing of this switch of M6 illustratively depends on whether the operation of the ELIT 206 is being controlled by the processor 210 in random trapping mode or in trigger trapping mode as described with respect to FIG. 3. Thereafter, the processor 210 is operable, similarly as described with respect to FIG. 8C, to control the voltage source V5 to produce voltages which cause the ion mirror M5 to switch from ion transmission mode to ion reflection mode of operation. The timing of this switch of M5 illustratively depends on whether the operation of the ELIT 206 is being controlled by the processor 210 in random trapping mode or in trigger trapping mode as described with respect to FIG. 3, but in any case the switch of M5 to its ion reflection mode traps at least one ion within the ELIT 206 as illustrated by the ion trajectory 256 depicted in FIG. 8F. With at least one such ion trapped within the ELIT 206 and with both M5 and M6 controlled by the voltage sources V5 and V6 respectively to operate in their ion reflection modes, the ion(s) trapped within the ELIT 206 oscillates back and forth between the ion mirrors M5 and M6, each time passing through the charge detection cylinder CD3 and inducing a corresponding charge thereon which is detected by the charge preamplifier CP3 and recorded by the processor 210 in the memory 212 as described above with respect to FIG.

3. In the operating state illustrated in FIG. 8F, ions are simultaneously oscillating back and forth within each of the ELITs 202, 204 and 206, and ion charge/timing measurements taken from each of the charge preamplifiers CP1, CP2 and CP3 are therefore simultaneously collected and stored by the processor 210.

Figure 8F:
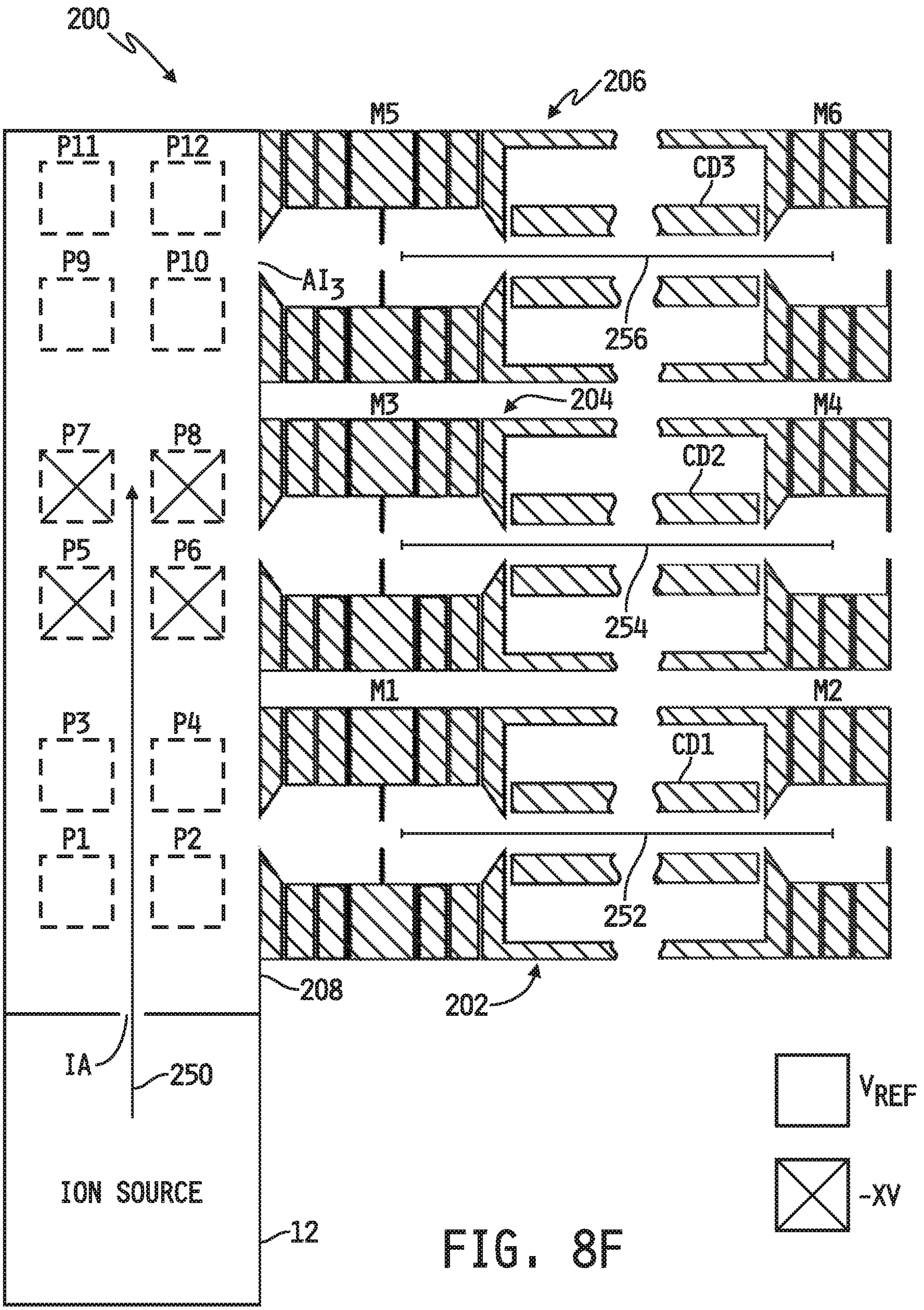

As also illustrated in FIG. 8F, at the same time or following control of the ELIT 206 as just described, and with the ion(s) oscillating simultaneously within each of the ELITs 202, 204 and 206, the processor 210 is operable to control $V_{ST}$ to switch the voltages applied to pads P5-P8 to —XV and to switch the voltages applied to P10 and $P1_2$ to $V_{REF}$ (or to switch the voltages applied to P9 and $P1_1$ to —XV), so that the pads P1-P12 are controlled to the voltages illustrated in (or as described with respect to) FIG. 8A. The electric field resulting in the channel 225 of the ion steering array 208 from such voltage applications again draws ions exiting the ion aperture IA of the ion source 12 through the channel 225 in the unaltered direction of ion travel along the illustrated ion trajectory 250 as illustrated in FIG. 8A.

After the ions have oscillated back and forth within each of the ELITs 202, 204 and 206 for a total ion cycle measurement time or a total number of measurement cycles, e.g., as described above with respect to step 126 of the process 100 illustrated in FIG. 3, the processor 210 is operable to control the voltage sources V1-V6 to switch each of the ion mirrors M1-M6 to their ion transmission operating modes, thereby causing the ions trapped therein to exit the ELITs 202, 204, 206 via the ion outlet apertures $AO_1$-$AO_3$ respectively. Operation of the ion mass detection system 200 then illustratively returns to that described above with respect to FIG. 8B. At the same time, or at another convenient time, the collections of recorded ion charge/timing measurements are processed by the processor 210, e.g., as described with respect step 140 of the process 100 illustrated in FIG. 3, to determine the masses of ions processed by each respective one of the ELITs 202, 204, 206.

Depending upon a number of factors including, but not limited to, the dimensions of the ELITS 202, 204, 206, the frequency or frequencies of oscillation of ions through each ELIT 202, 204, 206 and the total number of measurement cycles/total ion cycle measurement time in each ELIT 202, 204, 206, ions may simultaneously oscillate back and forth within at least two of the ELITs 202, 204 and 206, and ion charge/timing measurements taken from respective ones of the charge preamplifiers CP1, CP2 and CP3 may therefore be simultaneously collected and stored by the processor 210. In the embodiment illustrated in FIG. 8F, for example, ions simultaneously oscillate back and forth within at least two of the ELITs 202, 204 and 206, and ion charge/timing measurements taken from each of the charge preamplifiers CP1, CP2 and CP3 are thus simultaneously collected and stored by the processor 210. In other embodiments, the total number of measurement cycles or total ion cycle measurement time of ELIT 202 may expire before at least one ion is trapped within the ELIT 206 as described above. In such cases the processor 210 may control the voltage sources V1 and V2 to switch the ion mirrors M1 and M2 to their transmission operating modes, thereby causing the ion(s) oscillating therein to exit through the ion mirror M2 before at least one ion is made to oscillate within the ELIT 206. In such embodiments, ions may not simultaneously oscillate back and forth within all of the ELITs 202, 204 and 206, but may rather simultaneously oscillation back and for within at least two of the ELITs 202, 204 and 206 at any one time.

Figure 9:
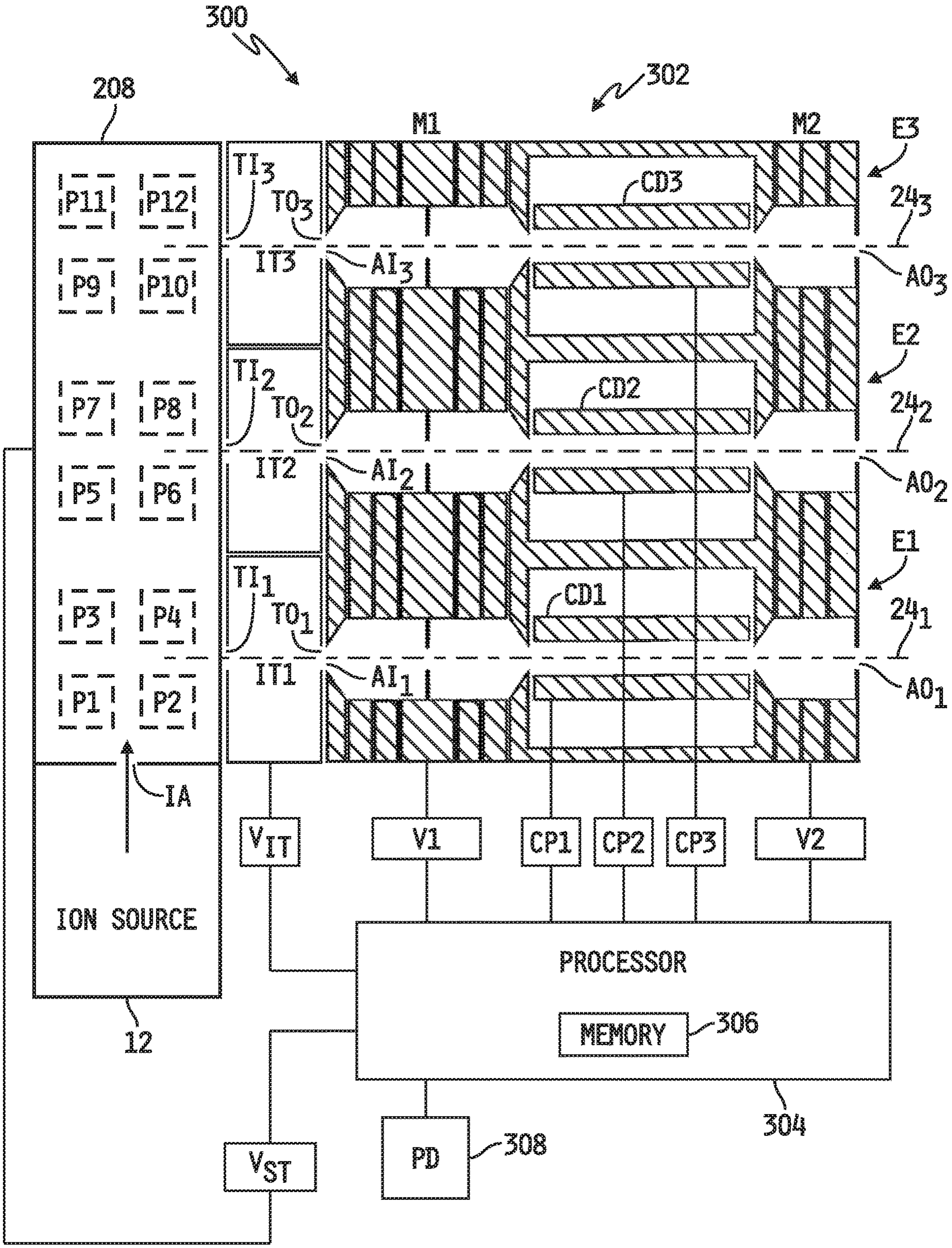
FIG. 9 is a simplified diagram of an ion mass detection system including yet another embodiment of an electrostatic linear ion trap (ELIT) array with control and measurement components coupled thereto.

Referring now to FIG. 9, an ion mass detection system 300 is shown including yet another embodiment of an electrostatic linear ion trap (ELIT) array 302 with control and measurement components coupled thereto. In the illustrated embodiment, the ELIT array 302 includes three separate ELITs E1-E3 each configured identically to the ELITs 202, 204, 206 illustrated in FIG. 6. In the embodiment illustrated in FIG. 9, a voltage source V1, illustratively identical in structure and function to the voltage source V1 illustrated in FIGS. 1-2B, is operatively coupled to the ion mirror M1 of each ELIT E1-E3 and another voltage source V2, illustratively identical in structure and function to the voltage source V4 illustrated in FIGS. 1-2B, is operatively coupled to the ion mirror M2 of each ELIT E1-E3. In alternate embodiments, the ion mirrors M1 of two or more of the ELITs E1-E3 may be merged into a single ion mirror and/or the ion mirrors M2 of two or more of the ELITs E1-E3 may be merged into a single ion mirror. In any case, the voltage sources V1, V2 are electrically coupled to a processor 304, and the three charge preamplifiers CP1-CP3 are electrically coupled between the processor 304 and a respective charge detection cylinder CD1-CD3 of a respective one of the ELITs E1-E3. A memory 306 illustratively includes instructions which, when executed by the processor 304, cause the processor 304 to control the voltage sources V1 and V2 to control operation of the ELITs E1-E3 as described below. Illustratively, the processor 304 is operatively coupled to one or more peripheral devices 308 which may be identical to the one or more peripheral devices 20 described above with respect to FIG. 1.

The ion mass detection system 300 is identical in some respects to the ion mass detection system 200 in that the ion mass detection system 300 includes an ion source 12 operatively coupled to an ion steering array 208, the structures and operation of which are as described above. The instructions store in the memory 306 further illustratively include instructions which, when executed by the processor 304, cause the processor 304 to control the ion steering array voltage source $V_{ST}$ as described below.

In the embodiment illustrated in FIG. 9, the ion mass detection system 300 further illustratively includes three conventional ion traps IT1-IT3 each having a respective ion inlet $TI_1$-$TI_3$ and an opposite ion outlet $TO_1$-$TO_3$. The ion trap IT1 is illustratively positioned between the set of electrically conductive pads P1-P4 and the ion mirror M1 of the ELIT E1 such that the longitudinal axis $24_1$ extending centrally through the ELIT E1 bisects the ion inlet $TI_1$ and the ion outlet $TO_1$ of IT1 and also passes centrally between the pad pairs P1/P2 and P3/P4 as illustrated in FIG. 9. The ion trap IT2 is similarly positioned between the set of electrically conductive pads P5-P8 and the ion mirror M1 of the ELIT E2 such that the longitudinal axis $24_2$ extending centrally through the ELIT E2 bisects the ion inlet $TI_2$ and the ion outlet $TO_2$ of IT2 and also passes centrally between the pad pairs P5/P6 and P7/P8, and the ion trap IT3 is likewise positioned between the set of electrically conductive pads P9-P12 and the ion mirror M1 of the ELIT E3 such that the longitudinal axis $24_3$ extending centrally through the ELIT E3 bisects the ion inlet $TI_3$ and the ion outlet $TO_3$ of IT3 and also passes centrally between the pad pairs P9/P10 and P11/P12. The ion traps IT1-IT3 may each be any conventional ion trap, examples of which may include, but are not limited to, a conventional quadrupole ion trap, a conventional hexapole ion trap, or the like.

An ion trap voltage source $V_{IT}$ is operatively coupled between the processor 304 and each of the ion traps IT1-IT3. The voltage source $V_{IT}$ is illustratively configured to produce suitable DC and AC, e.g., RF, voltages for separately and individually controlling operation of each of the ion traps IT1-IT3 in a conventional manner.

The processor 304 is illustratively configured, e.g. programmed, to control the ion steering array voltage source $V_{ST}$ to sequentially steer one or more ions exiting the ion aperture IA of the ion source 12, as described with respect to FIGS. 8A-8F, into the ion inlets $TI_1$-$TI_3$ of the each of the respective ion traps IT1-IT3. In some embodiments, one or more conventional ion carpets and/or other ion focusing structures may be positioned between the ion steering array 208 and one or more of the ion traps IT1-IT3 to direct ions from the ion steering array 208 into the ion inlets $TI_1$-$TI_3$ of the respective ion traps IT1-IT3. The processor 304 is further configured, e.g., programmed, to control the ion trap voltage source $V_{IT}$ to produce corresponding control voltages for controlling the ion inlets $TI_1$-$TI_3$ of the ion traps IT1-IT3 to accept ions therein, and for controlling the ion traps IT1-IT3 in a conventional to trap or confine such ions therein.

As the ion traps IT1-IT3 are being filled with ions, the processor 304 is configured, i.e., programmed, to control V1 and V2 to produce suitable DC voltages which control the ion mirrors M1 and M2 of the ELIT E1-E2 to operate in their ion transmission operating modes so that any ions contained therein exit via the ion outlet apertures $AO_1$-$AO_3$ respectively. When, via control of the ion steering array 208 and the ion traps IT1-IT3 as just described, at least one ion is trapped within each of the ion traps IT1-IT3, the processor 304 is configured, i.e., programmed, to control V2 to produce suitable DC voltages which control the ion mirrors M2 of the ELITs E1-E3 to operate in their ion reflection operating modes. Thereafter, the processor 304 is configured to control the ion trap voltage source $V_{IT}$ to produce suitable voltages which cause the ion outlets $TO_1$-$TO_3$ of the respective ion traps IT1-IT3 to simultaneously open to direct at least one ion trapped therein into a respective one of the ELITs E1-E3 via a respective ion inlet aperture $AI_1$-$AI_3$ of a respective ion mirror M1. When the processor 304 determines that at least one ion has entered each ELIT E1-E3, e.g., after passage of some time period following simultaneous opening of the ion traps IT1-IT3 or following charge detection by each of the charge preamplifiers CP1-CP3, the processor 304 is operable to control the voltage source V1 to produce suitable DC voltages which control the ion mirrors M1 of the ELTs E1-E3 to operate in their ion reflection operating modes, thereby trapping at least one ion within each of the ELITs E1-E3.

With the ion mirrors M1 and M2 of each ELIT E1-E3 operating in the ion reflection operating mode, the at least one ion in each ELIT E1-E3 simultaneously oscillates back and forth between M1 and M2, each time passing through a respective one of the charge detection cylinders CD1-CD3. Corresponding charges induced on the charge detection cylinders CD1-CD3 are detected by the respective charge preamplifiers CP1-CP3, and the charge detection signals produced by the charge preamplifiers CP1-CP3 are stored by the processor 304 in the memory 306 and subsequently processed by the processor 304, e.g., as described with respect step 140 of the process 100 illustrated in FIG. 3, to determine the masses of ions processed by each respective one of the ELITs E1-E3.

Although the embodiments of the ion mass detection systems 200 and 300 are illustrated in FIGS. 6-8F and 9 respectively as each including three ELITs, it will be understood that either or both such systems 200, 300 may alternatively include fewer, e.g., 2, or more, e.g., 4 or more, ELITs. Control and operation of the various components in any such alternate embodiments will generally follow the concepts described above, and those skilled in the art will recognize that any modifications to the system 200 and/or to the system 300 required to realize any such alternate embodiment(s) will involve only mechanical steps. Additionally, although the embodiments of the ion mass detection systems 200 and 300 are illustrated in FIGS. 6-8F and 9 respectively as each including an example ion steering array 208, it will be understood that one or more other ion guiding structures may be alternatively or additionally used to steer or guide ions as described above, and that any such alternate ion guiding structure(s) is/are intended to fall within the scope of this disclosure. As one non-limiting example, an array of DC quadrupole beam deflectors may be used with either or both of the systems 200, 300 to steer or guide ions as described. In such embodiments, one or more focusing lenses and/or ion carpets may also be used to focus ions into the various ion traps as described above.

Figure 10:
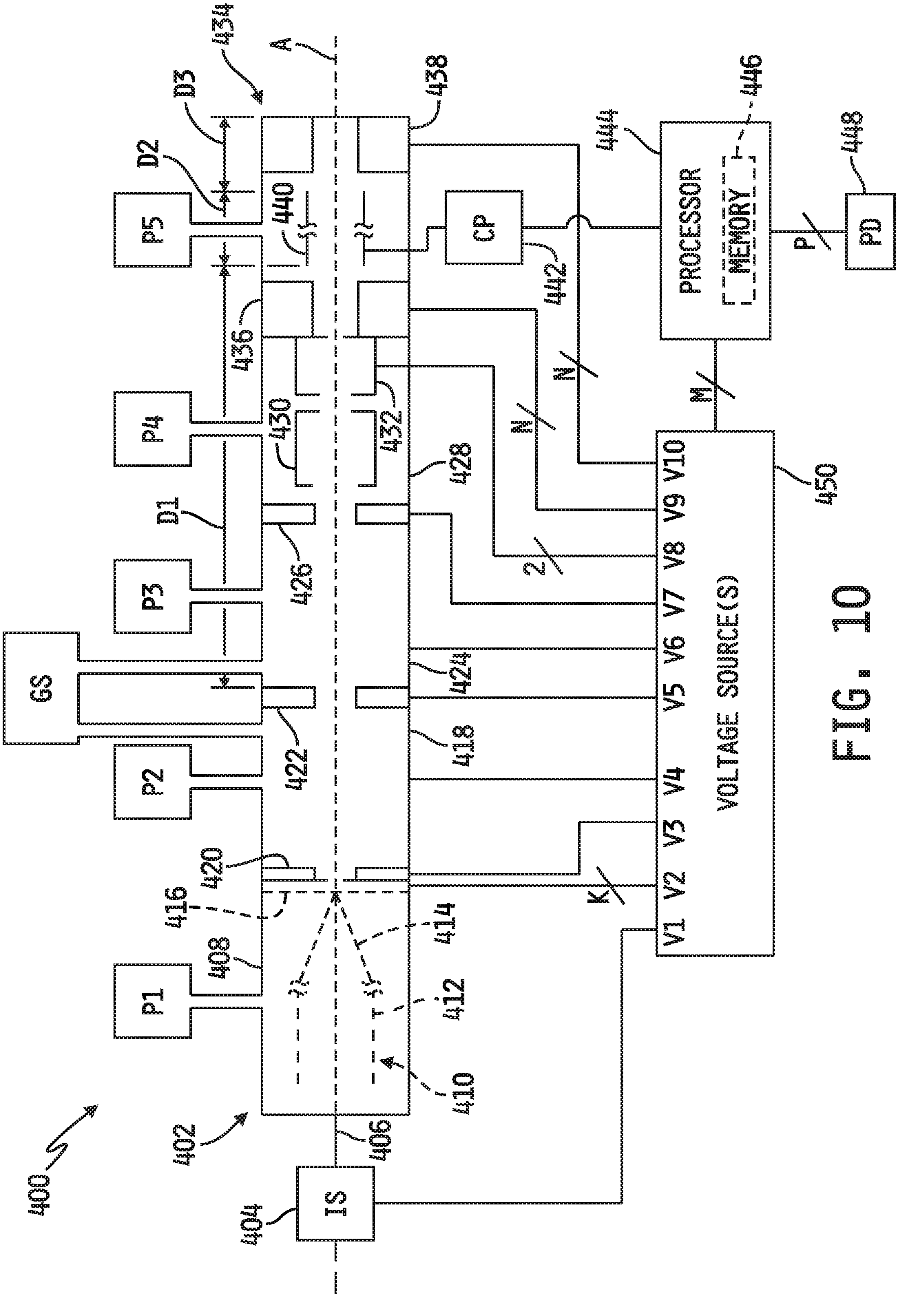
FIG. 10 is a simplified diagram of an embodiment of a charge detection mass spectrometer instrument configured for pulsed mode operation thereof.

Referring now to FIG. 10, an embodiment is shown of a charge detection mass spectrometer instrument 400 which represents a variant of the instrument 300 illustrated in FIG. 9. In the instrument 400 illustrated in FIG. 10, ions generated in an ion source region 402 are captured by, and stored, in an ion trap 418, and the ion trap 418 is then controlled in a pulsed mode to selectively supply ions stored therein to an ion mass and charge detector 434. The instrument 400 is thus configurable and operable to capture and store generated ions in the ion trap 418, and to then control the ion trap 418 in a pulsed manner to controllably supply a packet of time-compressed ions to an ion mass and charge detector 434, e.g., in the form of a single-stage electrostatic linear ion trap (ELIT) 434. In some embodiments, the ion outlet of the ion trap 418 may be spaced apart from the ion inlet of the detector 434 by a distance which allows ions traveling therebetween to separate in time according to their mass-to-charge values. By varying the delay time in such embodiments between release of the ions from the ion trap 418 and capture of the ions in the detector 434, ions with different windows or ranges of mass-to-charge ratio can thus be trapped. In some embodiments, an ion filter 424 is positioned between the ion trap 418 and the detector 434, and in such embodiments the ion filter 424 is controllable to filter ion exiting the ion trap 418 according to mass-to-charge ratio to alternatively or additionally select or restrict the mass-to-charge ratio or range of mass-to-charge ratios of ions supplied by the ion trap 418 to the detector 434.

As briefly described above, the instrument 400 illustrated in FIG. 10 includes an ion source region 402 configured to generate ions and supply the generated ions to an ion inlet of the ion trap 418. In the illustrated embodiment, the ion source region 402 includes an ion source 404 coupled to a source region 408 via a capillary 406. In some embodiments, the capillary 406 may be temperature controlled, e.g., heated and/or cooled. In any case, the source region 408 is operatively coupled to a pump P1, and the pump P1 is operable to control the region 408 to a vacuum such that the region 408 defines a first differentially pumped region. The ion source 404 is illustratively positioned outside of the source region 404, e.g., at atmospheric pressure or other pressure, and is configured to supply ions from a sample to the source region 408 via the capillary 406. In some such embodiments, the ion source 404 is a conventional electrospray source of ions (ESI). In such embodiments, the ESI source 404 is operatively coupled to an output V1 of a voltage source 450, and the voltage source 450 is configured to produce a suitable DC or time-varying signal at V1 for controlling operation of the ESI source 404. In any case, the sample from which the ion source 404 generates ions is illustratively biological material, although in other embodiments the sample may be or include non-biological material.

In some embodiments in which the ion source 404 is positioned outside of the differentially pumped source region 408 and is operable to generate and supply ions to the source region 408 as described above, the source region 408 may illustratively include an ion processing interface 410 configured to efficiently transmit ions with a broad mass distribution to the ion inlet of the ion trap 418. In some such embodiments, the interface 410 may illustratively include a drift tube 412 having an open end positioned adjacent to or spaced apart from the ion outlet end of the capillary 406, and having an opposite end coupled to one end of a funnel region 414 which tapers from the end of the drift tube 412 to a reduced cross-section ion outlet. An ion carpet 416 may be operatively coupled to the ion outlet of the funnel region 414, and may define an ion passageway therethrough coupled to the ion inlet of the ion trap 418. At least one output V2 of the voltage source 450 is electrically coupled to the interface 410 and supplies a number, K, of DC and/or time-varying voltage signals to the interface 401 to control operation thereof, where K may be any positive integer. A central, longitudinal axis A of the instrument 400 illustratively passes centrally through the various ion inlets and outlets just described and further described below. In embodiments which include it, the interface 410 illustratively defines a virtual jet disrupter therein configured to disrupt the gas jet generated by gas flow through the capillary 406 and into the differentially pumped region 408, to thermalize the ions and to focus the ions into the ion trap 418. Further details relating to the structure and operation of an embodiment of the interface 410 are illustrated and described in co-pending International Patent Application Nos. PCT/US2019/013274, filed Jan. 11, 2019, and PCT/US2019/035379, filed Jun. 4, 2019, both entitled HYBRID ION FUNNEL-ION CARPET (FUNPET) ATMOSPHERIC PRESSURE INTERFACE FOR CHARGE DETECTION MASS SPECTROMETRY, the disclosures of which are expressly incorporated herein by reference in their entireties.

In some alternate embodiments, the source region 408 may not include the interface 410. In other alternate embodiments, the ion source 404 may be provided in the form of one or more other conventional ion sources, one or more of which may be positioned outside of the source region 408 and/or one or more of which may be positioned inside of the source region 408. In some such embodiments, the source region 408 may include the interface 410, and in other such embodiments the interface 410 may be omitted.

The ion inlet of the ion trap 418 is illustratively defined by a central aperture formed through an electrically conductive plate, grid or the like 420 that is electrically connected to an output V3 of the voltage source 450. An ion outlet of the ion trap 418 is spaced apart along the central axis A from the ion inlet, and is likewise illustratively defined by a central aperture formed through an electrically conductive plate, grid or the like 422 that is electrically connected to another output V5 of the voltage source 450. Another pump P2 is operatively coupled to the ion trap 418 and is illustratively operable to pump the ion trap 418 to a lower pressure, e.g., higher vacuum, than that of the source region 408, such that the ion trap 418 defines a second differentially pumped region. In some embodiments, P2 is configured and operable to control the ion trap 418 to a pressure of 10-100 mbar, although in other embodiments P2 may control the ion trap 418 to pressures outside of this range. In some embodiments, a gas source GS may be operatively coupled to the ion trap 418, and in such embodiments may be operable to supply a buffer or other gas to the interior of the ion trap 418. In some such embodiments, the gas is selected such that ion collisions therewith cause a reduction in ion energy. In one embodiment, the ion trap 418 is configured a conventional hexapole ion trap, although in alternate embodiments the ion trap may 418 may have other conventional configurations, e.g., quadrupole, octupole, etc. In any case, the ion trap 418 will typically include a number of elongated, electrically conductive rods surrounding the axis A to which an output V4 of the voltage source 450 is operatively coupled. Illustratively, the output V4 is coupled to the rods in a manner which causes each opposed set or pair of the rods to be out of phase with the other opposed pairs, and the output voltage V4 is illustratively a time-varying, e.g., radio frequency, voltage. In some embodiments, V4 may further include one or more DC voltages.

Operation of the ion trap 418 is conventional in that the voltages V3 and V5 are controllable DC voltages which are controlled to allow ions to enter the trap 418 via the ion inlet, to cause ions to be trapped therein, and to release the ions from the ion outlet. For example, the voltage V3 is illustratively controlled to a DC potential which sets the ion energy. The gas source GS, in embodiments which include it, supplies a background gas with which ions entering the ion trap 418 collide to thermalize excess kinetic energy picked up by the ions from the gas flow from the source region 408 into the ion trap 418. The time-varying voltage V4 operates to confine the ions in the radial direction, and the voltage V5 is controlled to trap ions within the ion trap 418 and to eject ions from the ion trap 418. For example, to transmit ions through the ion trap 418, V5 is typically controlled to a potential that is less than that of V4, whereas to collect and store, i.e., trap, ions, the potential B5 is illustratively raised to a potential at which ions are no longer transmitted through the ion outlet of the ion trap 418.

In some embodiments, as briefly described above, the instrument 400 may include a mass-to-charge ratio filter 424 having an ion inlet illustratively coupled to, or integral with, the ion outlet of the ion trap 418. An ion outlet is spaced apart along the central axis A from the ion inlet of the filter 424, and is illustratively defined by a central aperture formed through an electrically conductive plate, grid or the like 426 that is electrically connected to yet another output V7 of the voltage source 450. Another pump P3 is operatively coupled to the filter 424 and is illustratively operable to pump the filter 424 to a lower pressure, e.g., higher vacuum, than that of the ion trap 418, such that the filter 424 defines a third differentially pumped region. In some embodiments, the gas source GS may be operatively coupled to the filter 424.

The mass-to-charge ratio filter 424 is illustratively provided in the form of a conventional quadrupole mass-to-charge filter, although in alternate embodiments the filter 424 may be provided in the form of a hexapole, octupole or other conventional configuration. In any case, the mass-to-charge ratio filter 424 will typically include a number of elongated, electrically conductive rods surrounding the axis A to which an output V6 of the voltage source 450 is operatively coupled. Illustratively, the output V6 is coupled to the rods in a manner which causes each opposed set or pair of the rods to be out of phase with the other opposed pairs, and the output voltage V6 is illustratively a time-varying, e.g., radio frequency, voltage. In some embodiments, V6 may further include one or more DC voltages.

In some embodiments, the voltage V7 is set to be sufficiently lower than that of the voltage V5 to cause ions to be transmitted through the filter 424. In other embodiments, the voltage V7 may be switched similarly to that of V5 so as to operate the filter 424 as a second ion trap. In the any case, in embodiments in which the voltage V6 is time-varying only, e.g., RF only, the mass-to-charge ratio filter 424 illustratively operates as a high-pass filter, allowing passage through the filter 424 only of ions above a selected mass-to-charge ratio value. The selected mass-to-charge ratio value is illustratively a function of the magnitude of the time-varying voltage V6. In such embodiments, the mass-to-charge ratio filter 424 thus operates as a high mass-to-charge ratio filter to preselect, i.e., pass, only ions having mass-to-charge ratios above a selectable mass-to-charge ratio threshold. In some alternate embodiments, the voltage V6 includes time-varying and DC components, the mass-to-charge ratio filter 424 illustratively operates as a band-pass filter, allowing passage through the filter 424 only of ions within a selected range of mass-to-charge ratios. The selected range of mass-to-charge ratios is illustratively a function of the magnitudes of the time-varying and DC components. In such embodiments, the mass-to-charge ratio filter 424 thus operates as a mass-to-charge ratio band filter to preselect, i.e., pass, only ions having mass-to-charge ratios within a selectable range of ion mass-to-charge ratios.

In some alternate embodiments, the mass-to-charge ratio filter 424 may be positioned upstream of the ion trap 418. In such embodiments, the filter 424 may be controlled in any of the modes just described to pass into the ion trap 418 only ions having mass-to-charge ratios within a specified range of mass-to-charge ratios. In some such embodiments, mass-to-charge ratio filters 424 may be positioned upstream and downstream of the ion trap 418. In such embodiments, the mass-to-charge ratio filter 424 upstream of the ion trap 418 may illustratively be controlled to pass only ions having mass-to-charge ratios within a selected range of mass-to-charge ratios, and the mass-to-charge ratio filter 424 downstream of the ion trap 418 may be controlled to pass only ions having mass-to-charge ratios within a subset of the selected range of mass-to-charge ratios. Alternatively, the two mass-to-charge ratio filters 424 may be controlled to pass only ions having mass-to-charge ratios within the same range of mass-to-charge ratios. In this latter embodiment, the upstream mass-to-charge ratio filter 424 may be controlled to pass into the ion trap 418 only ions having mass-to-charge ratios within a selected range of mass-to-charge ratios, and the mass-to-charge ratio filter 424 downstream of the ion trap 418 may be used to allow ions exiting the ion trap 418 to separate in time as they pass therethrough on their way to the detector 434.

In some alternate embodiments, a conventional drift tube may be substituted for, i.e., in place of, the mass-to-charge ratio filter 424. In some such embodiments, the axial passageway defined through the drift tube may have a constant cross-sectional area. In some such embodiments, the drift tube may be configured and controlled with one or more voltages produced by the voltage source 450 to radially focus ions traveling axially therethrough. In other embodiments, at least a portion of the drift tube adjacent to an ion outlet end thereof may be funnel-shaped, i.e., with decreasing cross-sectional area of the axial passageway in the direction of the ion outlet. In some such embodiments, at least the funnel section is configured and controlled with one or more voltages produced by the voltage source 450 to radially focus ions traveling axially therethrough, and in other embodiments the entire drift tube may be configured and controlled with one or more voltages produced by the voltage source 450 to radially focus ions traveling axially therethrough. In some such embodiments, the plate or grid 426 may be replaced with a conventional ion carpet defining a central aperture therethrough, wherein the ion carpet is configured and controlled with one or more voltages produced by the voltage source 450 to further focus ions into and through the aperture to the next stage of the instrument 400.

The instrument 400 further includes a fourth differentially pumped region 428 having an ion inlet coupled to, or integral with, the ion outlet of the mass-to-charge ratio filter 424. A fourth pump P4 is operatively coupled to the region 428, and is configured to pump the region 428 to a pressure that is less than that of the filter 424. In the illustrated embodiment, the fourth differentially pumped region 428 includes an ion lens and deflectors 430, followed by a conventional energy analyzer 432 electrically connected to a voltage output V8 of the voltage source 450. In one embodiment, the energy analyzer 432 is a dual hemispherical deflection energy analyzer (HDA) configured to transmit a narrow band of ion energies centered around a nominal ion energy of 130 eV/z. In alternate embodiments, the energy analyzer 432 may be implemented in other conventional forms and/or be configured to transmit ion energies centered around other ion energy values.

The instrument 400 further includes the ion mass and charge detector 434 which, in the illustrated embodiment, is provided in the form of a single-stage electrostatic linear ion trap (ELIT). The ELIT configuration is generally a single stage of the ELIT 14 illustrated in FIGS. 1-2B and described in detail above. For example, the ELIT 434 includes spaced apart end caps 436, 438, each of which illustratively represent facing halves of the ion mirrors MX illustrated in FIGS. 2A and 2B, with a detection cylinder 440 positioned therebetween. The ELIT 434 is operatively coupled to a pump P5 which is configured and controlled to establish a pressure, e.g., a vacuum, within the fifth differentially pumped region defined by the ELIT chamber. In one embodiment, the pump P5 is controlled to establish a pressure within the ELIT 434 of approximately $10^{-9}$ mbar, although in other embodiments the pump P5 may be controlled to establish higher or lower pressures within the ELIT chamber.

An input of a conventional charge sensitive preamplifier 442 is electrically connected to the charge detection cylinder 440, and an output of the preamplifier 442 is electrically coupled to an input of a conventional processor 444. The processor 444 illustratively includes or is coupled to a memory 446 in which is stored instructions executable by the processor 444 to control operation of the instrument 444 as will be described below. In some embodiments, the processor 444 is operatively coupled to one or more peripheral devices PD 448 via a number, P, of signal paths, wherein P may be any positive integer. In some embodiments, the processor 444 may also be electrically connected to the voltage source 450 via a number, M, of signal paths, wherein M may be any positive integer. In such embodiments, the processor 444 may be programmed to control operation of the voltage source 450. In alternate embodiments, the voltage source 450 may itself be programmable and/or may be manually controlled. In any case, the charge sensitive preamplifier 442, processor 444, memory 446 and peripheral device(s) 448 are illustratively all as described above with respect to FIG. 1.

A voltage output V9 of the voltage source 450 is electrically connected to the ion mirror 436, and another voltage output V10 of the voltage source 450 is electrically connected to the ion mirror 438. It will be understood that the voltages V9 and V10 each illustratively include a number of different switchable voltages for controlling operation of respective ones of the ion mirrors 436, 438 as illustrated by example in FIGS. 2A and 2B and described in detail above, and operation of the ELIT 434 under control of such voltages V9 and V10 is also as described above with respect to each of the stages depicted in FIGS. 1-4E.

Figure 11:
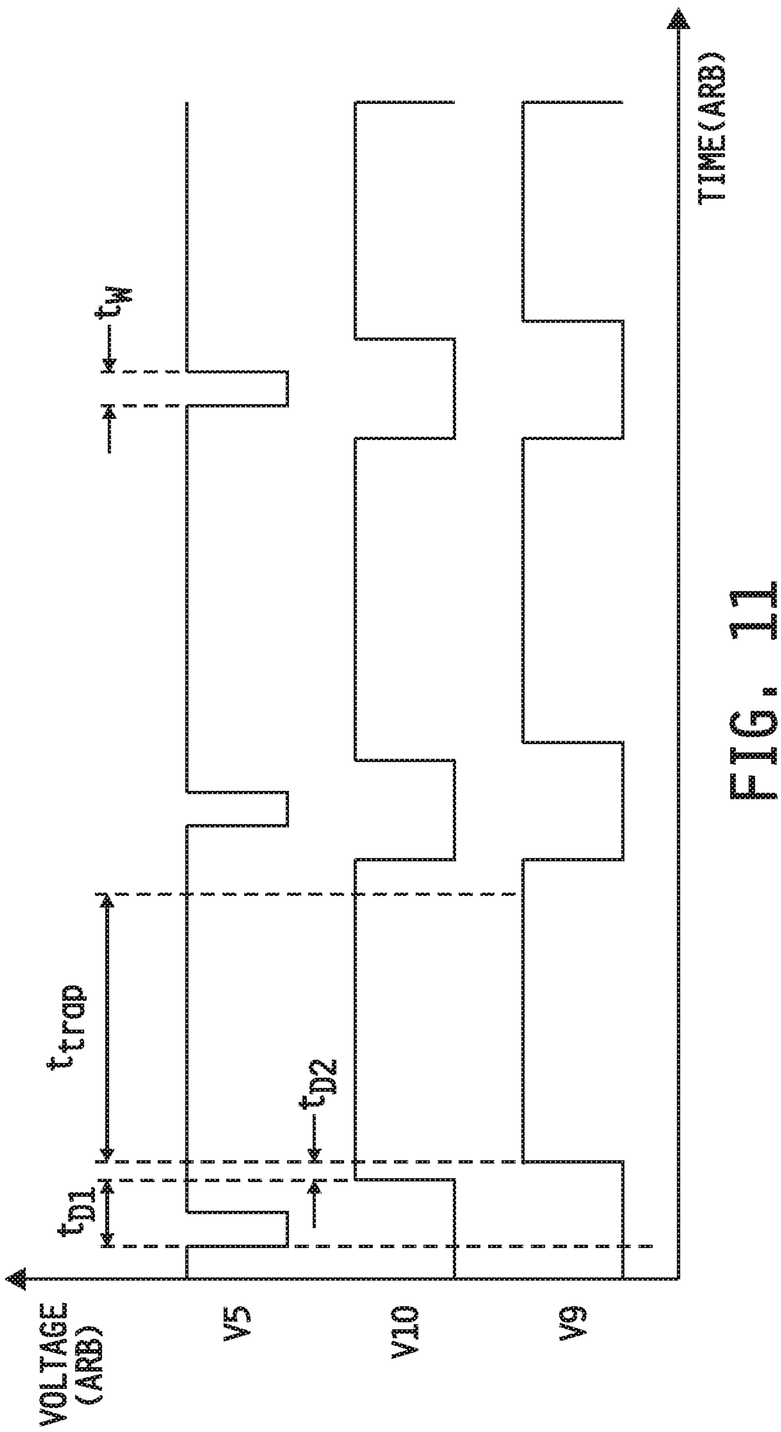
FIG. 11 is a timing diagram illustrating an example pulsed mode operation of the instrument of FIG. 10.

Referring now to FIGS. 10 and 11, pulsed operation of the CDMS instrument 400 includes selective control of at least the voltages V5, V9 and V10. It will be understood that the high states of the voltages V5, V9 and V10 corresponding to an ion storage or trapping state in the case of V5, i.e., voltages of V5 at which ions are trapped and stored within the ion trap 418 or, in the case of the ion mirrors 436, 438, an ion trapping or reflection state, i.e., the voltages of V9 and V10 which cause the ion mirrors 436, 438 to operate in their reflection modes to receive ions therein from the charge detection cylinder 440, reverse the direction of travel of the ions and accelerate the ions back through the charge detection cylinder 440 and toward the other ion mirror, such that ions are trapped within the ELIT 434 and oscillate back and forth between the ion mirrors 436, 438 each time passing through the detection cylinder 440, as described above. The low states of the voltages V5, V9 and V10 correspond to transmission states, i.e., voltages at which ions are released and ejected from the ion trap 418 and which cause the ion mirrors 436, 438 to operate in their transmission modes to transmit ions therethrough, as described above.

The ion source 404 is responsive to the voltage V1 produced by the voltage source 450 to generate ions. In some embodiments, the processor 444 is operable to execute instructions stored in the memory 446 to control the voltage V1 to cause the ion source 404 to generate ions. In alternate embodiments, the voltage source 450 may itself be so programmed, or the voltage source 450 may be manually controlled to produce V1. In any case, the generated ions pass through the source region 408 and into the ion trap 418. In embodiments in which the source region 408 includes the interface 410, the voltage source 450 is operable to produce the one or more voltages V2 for controlling the interface 410 to pass ions therethrough as briefly described above. In any case, the voltage V3 produced by the voltage source 450 controls the ion inlet of the ion trap 418 to set the energies of ions entering from the source region 408 to a target energy, e.g., approximately 130 eV/z. Initially, as indicated in FIG. 11, the voltage(s) V5 is/are set to the trapping state to capture, trap and accumulate the generated ions in the ion trap 418, and the voltages V9 and V10 are set to the transmission states to clear the ELIT 434 by allowing any ions traveling toward the ELIT 434 to pass therethrough.

The pulsed operation of the instrument 400 starts with the voltage(s) V5 switching to the transmission state for a pulse width duration of $t_W$, after which the voltage(s) V5 is/are again switched back to the trapping state. The pulse width duration $t_W$ is selectable, i.e., adjustable, and during this time ions stored in the ion trap 418 are released or ejected therefrom and into the region 424 and travel toward the ELIT 434 in response to an electric field established by the voltages V5 and V7. In embodiments in which the region 424 includes a mass-to-charge ratio filter, only ions having mass-to-charge ratio values selected for passage by the voltage(s) V6 pass through the region 424 and into the region 428. Ions having energies in a narrow band of energies about the transmission energy of the energy analyzer 432 pass through the region 428 and into the ion mirror 436 of the ELIT 434, and ions having energies outside of this narrow band are deflected away from the ion inlet of the ELIT 434.

Upon expiration of a delay time tai following transition of the voltage(s) V5 to the ion transmission state to release ions from the ion trap 418, the voltages V10 on the rear ion mirror or end cap 438 are switched from the transmission state to the trapping or reflection state. Ions thereafter entering the rear ion mirror or end cap 438 from the charge detection cylinder 440 are thus reversed in direction by the ion reflection electric field established therein and are accelerated by the ion reflection electric field back through the charge detection cylinder 440 toward the front ion mirror or end cap 436, as described in detail above with respect to FIGS. 2A and 2B. Upon expiration of another delay time $t_{D2}$ following transition of the voltage(s) V5 to the ion transmission state to release ions from the ion trap 418, the voltages V9 on the front ion mirror or end cap 436 are switched from the transmission state to the trapping or reflection state. Ions in the charge detection cylinder 440 or in the rear ion mirror or end cap 438 at the time of such switching of the voltages V9 to the trapping or reflection state will thus be trapped within the ELIT 434, and with the ion mirrors 436, 438 both at their reflection modes the trapped ion(s) will oscillate back and forth between the ion mirrors 436, 438 each time passing through the charge detection cylinder 440 and inducing a corresponding charge thereon as described above. The ion(s) will remain trapped within the ELIT 434 for a trapping time period $t_{trap}$ as depicted in FIG. 11, and at the end of the trapping period $t_{trap}$ the voltages V9 and V10 are returned to their transmission states to empty the ELIT 434 before starting the sequence again. Resulting charge detection signals produced by the charge preamplifier 442 in response to detection of charges induced on the charge detection cylinder by ions passing therethrough will be processed by the processor 444 as described above to determine mass and charge of the trapped ion(s). In some embodiments, the voltages are controlled as just described so as to trap a single ion in the ELIT 434, and in other embodiments the voltages may be controlled to trap more than one ion in the ELIT 434.

The pulsed mode operation of the CDMS instrument 400 provides for improved detection efficiency by accumulating and storing ions in the ion trap 418, and then controllably releasing the ions from the trap 418 such that their arrival at the ELIT 434 is synchronized with the opening and closing (i.e., transmission mode and reflection mode respectively) of the ion mirrors 436, 438.

There is a substantial distance D1 (e.g., 0.86 m) between the ion outlet of the ion trap 418 and the front end of the charge detection cylinder 440, as illustrated in FIG. 10. In one embodiment, D1 is approximately 0.86 meters, although in alternate embodiments D1 may be greater or less than 0.86 meters. In any case, the time it takes for an ion to travel D1 depends on its kinetic energy and its mass-to-charge ratio (m/z). Since the energy analyzer 432 only transmits ions within a narrow kinetic energy distribution, this transit or travel time depends mainly on ion m/z. If the pulse width duration $t_W$ is short, a range of m/z values will be trapped for a given total delay time $t_D$, where $t_D$ is the time between the transition of the voltage(s) V5 to the ion transmission state, i.e., the falling edge of V5 at $t_W$, corresponding to the opening of the ion outlet of the ion trap 418 and release or ejection of ions therefrom, and the transition of the voltages V9 to the ion trapping or reflection state, i.e., the rising edge of V9 following the subsequent rising edge of V5 at $t_W$, corresponding to the closing, i.e., reflection mode, of the ion mirror 436 of the ELIT 434 and corresponding trapping of the ion(s) in the ELIT 434, i.e., $t_D = t_D1 + t_{D2}$. The largest mass-to-charge ratio $m/z_{MAX}$ (i.e., the slowest) ion that can be trapped, under these circumstances, is one that has just entered the detection cylinder when the front end cap switches to reflection mode:

$$m/z_{MAX}=2eE[t_D^2/d_1^2] \quad (1).$$

In Equation 1, e is the elementary charge, E is the ion energy, and $d_1$ is as described above and shown in FIG. 10. The smallest mass-to-charge ratio $m/z_{MIN}$ (i.e., the fastest) ion that can be trapped is one that has traveled through the charge detection cylinder 440, has been reflected by the rear ion mirror or end cap 438, has travelled back through the charge detection cylinder 440 and is just about to exit the front ion mirror or end cap 436 when the voltages V9 are switched to the reflection state:

$$m/z_{MIN}=2eE[t_D^2/(d_1+2d_2+d_3)^2] \quad (2).$$

In Equation 2, $d_2$ is the length of the charge detection cylinder 440 and $d_3$ is the distance between the ion inlet/outlet of the respective ion mirrors 436, 438 and the corresponding end of the charge detection cylinder 440. The $2d_2$ in equation (2) results because the ion travels both back and forth through the charge detection cylinder 440 and $d_3$ results from the time spent in the end cap. In some embodiments of the ELIT 434, $d_2=d_3$ so that the time spent by an ion traveling through the charge detection cylinder 440 is equal to the time spent travelling through each end cap 436, 438). In such embodiments, equation (2) reduces to the following:

$$m/z_{MIN}=2eE[t_D^2/(d_1+3d_2)^2] \quad (3).$$

The ratio of the maximum to minimum m/z that can be trapped is thus given by:

$$m/z_{MAX}/m/z_{MIN}=(d_1+3d_2)^2/d_1^2 \quad (4).$$

Thus the range of m/z values that can be trapped is independent of the ion energy and the delay time $t_D$. Longer delay times cause the m/z window to shift to larger m/z values but the relative width of the m/z window remains the same. The ratio of the maximum to minimum m/z values for the CDMS instrument 400 in which $d_2=d_3$, as described above, is 1.38, so the width of the m/z window that can be trapped with a single delay time $t_D$ is $m/z_{MIN}$ to $1.38\times m/z_{MIN}$. For example, if the delay time $t_D$ is set so that 25 kDa is the minimum m/z value that can be trapped, ions with m/z values up to 34.5 kDa can be trapped at the same time.

EXAMPLES

Truncated hepatitis B virus (HBV) capsid protein (Cp149) was assembled in 300 mM sodium chloride for 24 hours, dialyzed into 100 mM ammonium acetate (Sigma Aldrich, 99.999% trace metal basis) and stored for at least a week before use (to give assembly errors time to self-correct). The initial concentration of the capsid protein was 1 mg/mL. Assembly yields predominantly the icosahedral T=4 capsid (around 32 nm in diameter) composed of 120 capsid protein dimers along with a smaller amount (around 5% in this case) of the icosahedral T=3 capsid with 90 protein dimers. The pseudo critical concentration for HBV assembly in 300 mM NaCl is 3.7 μM and so the final capsid concentration is around 0.22 μM. Samples of the stock solution were purified by size exclusion chromatography (SEC) with a 6 kDa cutoff. Aliquots of the purified solution were then diluted with 100 mM ammonium acetate to the required concentration which ranged from 0.05 μg/mL to 100 μg/mL.

Pyruvate kinase (PK) was prepared at 10 mg/ml in ammonium acetate. Aliquots of the stock solution were purified by SEC with a 6 kDa cutoff. The purified solution was then diluted to 2 mg/mL with 100 mM ammonium acetate.

Figure 12A:
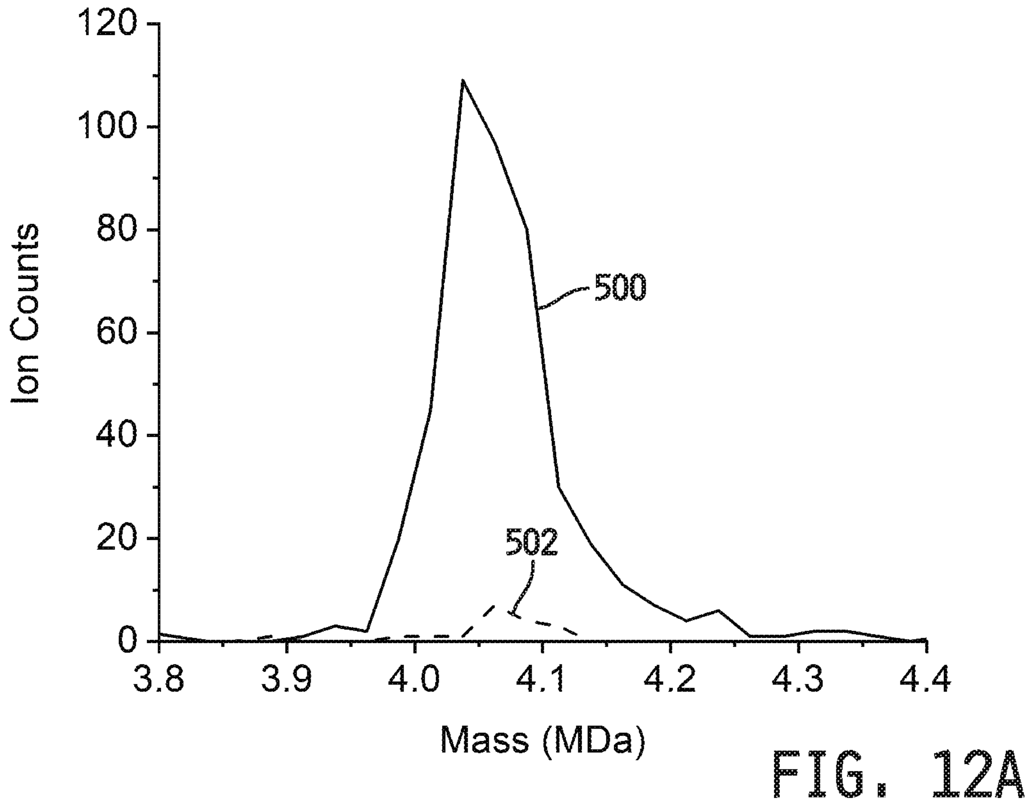
FIG. 12A shows plots of CDMS mass distributions measured by the instrument of FIG. 10 for HBV T=4 capsids with sample concentrations of 10 μg/mL and 0.5 μg/mL.

FIG. 12A shows portions of two representative mass distributions of the HBV sample measured using the CDMS instrument 400 illustrated in FIG. 10 and described above. Results are shown for two concentrations: 10 μg/mL (a 100-fold dilution of the HBV stock solution) identified in FIG. 12A as 500, and 0.5 μg/mL (a 2,000-fold dilution) identified in FIG. 12A as 502. The CDMS distributions shown in FIG. 12A were recorded for 16.6 minutes (10,000 trapping events) and are plotted with 25 kDa bins. At the 10 μg/mL concentration (identified as 500), there is a prominent peak at a mass of around 4.05 MDa, close to the expected mass for the T=4 capsid of HBV Cp149. At the 0.5 μg/mL concentration (identified as 502), the peak has almost disappeared. Note that the rate of spurious signals in CDMS is very small because the ions are measured for a relatively long time (100 ms). The HBV T=4 capsid ions carry around 140 elementary charges and the probability that a random noise signal could masquerade as an ion signal of this magnitude over a time period of 100 ms is quite small. Thus the background noise in the region of interest is likewise quite small.

It should be noted that the number of analytes contained in an electrospray droplet could influence the detection efficiency. An estimate of the average number of capsids present in a droplet can illustratively be obtained from the concentration and droplet size. The average size of the primary electrospray droplets can, in turn, be estimated from the electrospray conditions. For an estimated droplet size of 70 nm, the average number of capsids per droplet is around 0.025 (i.e., 1 in 40 droplets contain a capsid) at the concentration of the HBV stock solution (1 mg/mL).

Figure 12B:
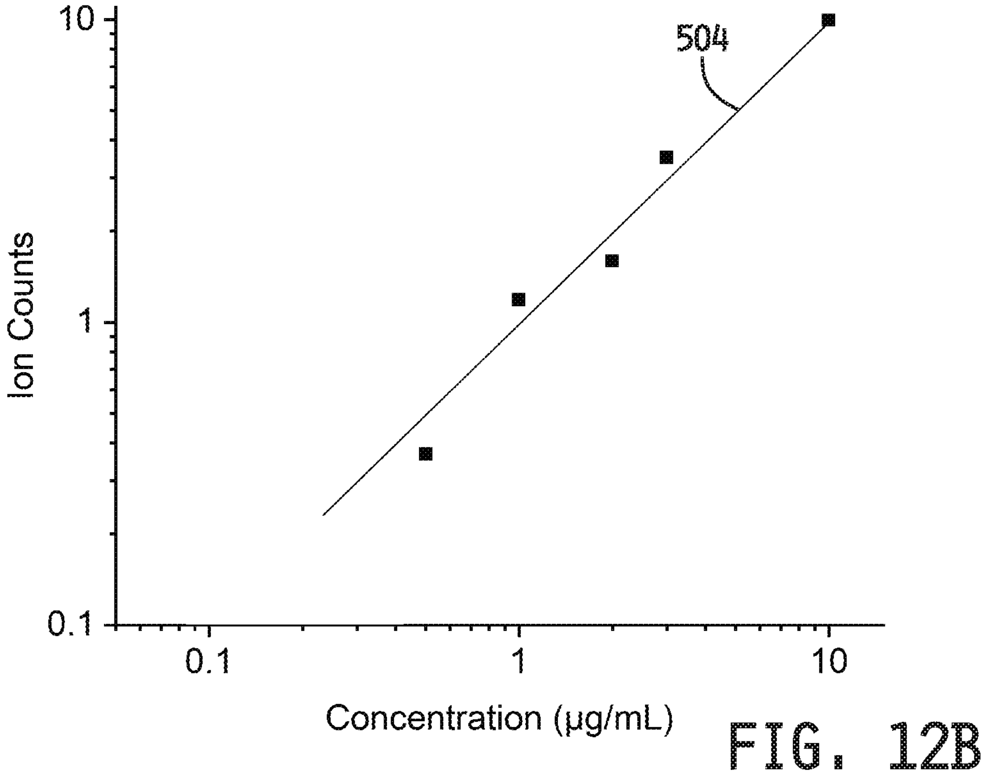
FIG. 12B is a log-log plot of the number of ions detected in the 3.8 MDa to 4.4 MDa mass window shown in FIG. 12A during 10,000 trapping events for a range of concentrations from 0.5 μg/mL to 10 μg/mL.

FIG. 12B shows a log-log plot 504 of the integrated counts in the 3.8 MDa to 4.4 MDa range against HBV concentrations from 0.5 μg/mL to 10 μg/mL. The points are the measured values and the line is illustratively a least squares fit. A slope of 1.0 is expected for a log-log plot of response versus concentration and slopes close to 1.0 are observed. In the plot 504 of FIG. 12B, for example, the slope is 1.031. Based on these results, the limit of detection for HBV T=4 capsids can be taken to be around 0.5 μg/mL. This corresponds to $1.1\times10^{-10}$ moles/L or $6.6\times10^{10}$ particles/mL. During the 16.6 minute collection period approximately 1.3 μL of solution was electrosprayed. Taking this into account, the limit of detection is therefore around 0.14 femtomoles or $8.6\times10^7$ particles. During the 16.6 minute data acquisition time 19 ions were detected. Thus, the detection efficiency for HBV T=4 capsids is around $2.2\times10^{-7}$.

Figure 13A:
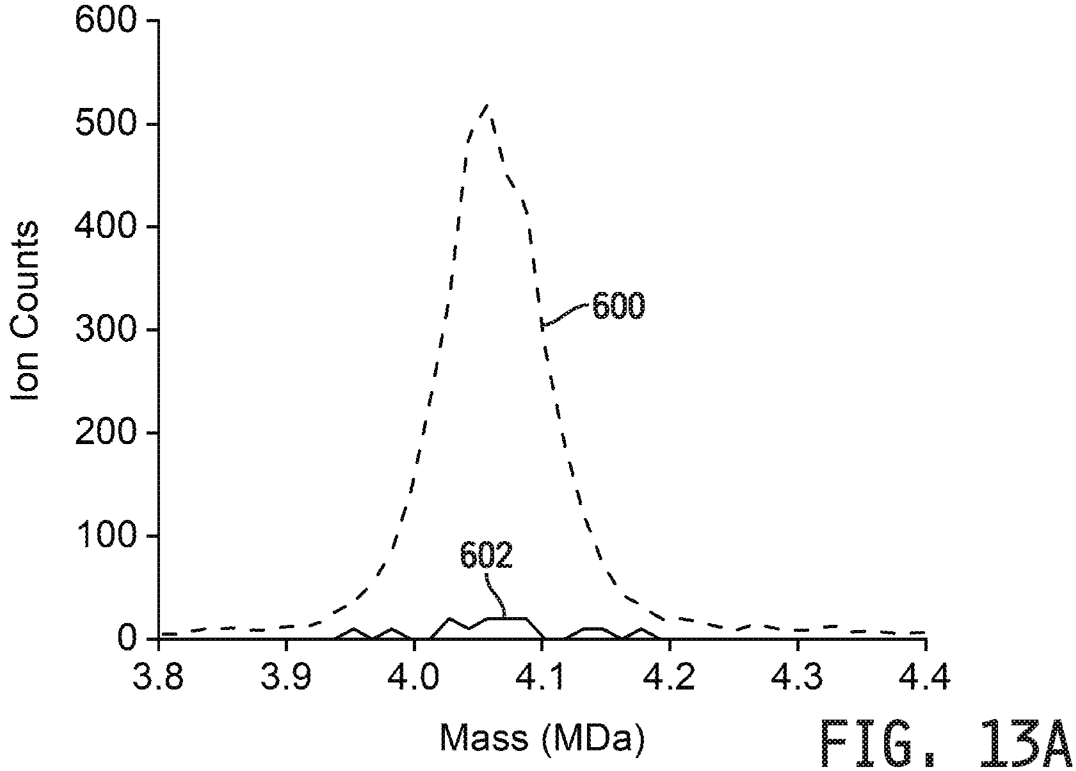
FIG. 13A shows plots of CDMS mass distributions measured by the instrument of FIG. 10 for HBV T=4 capsids with a protein concentration of 1 μg/mL, including distributions measured under normal (i.e., non-pulsed) operation of the instrument and measured under pulsed mode operation of the instrument as described herein.

FIG. 13A shows a comparison of mass distributions measured by the CDMS instrument 400 for the HBV capsids for a concentration of 1 μg/mL for both normal mode (i.e., non-pulsed) (identified as 602 in FIG. 13A) and pulsed mode as described herein (identified as 600 in FIG. 13A). Clearly, the intensity in the distribution 600 measured with the pulsed mode is much larger than the intensity in the distribution 602 measured in the normal (non-pulsed) mode; the normal mode distribution contains 15 ions and the pulsed contains 3,695 so the intensity gain in this example is 246.

Figure 13B:
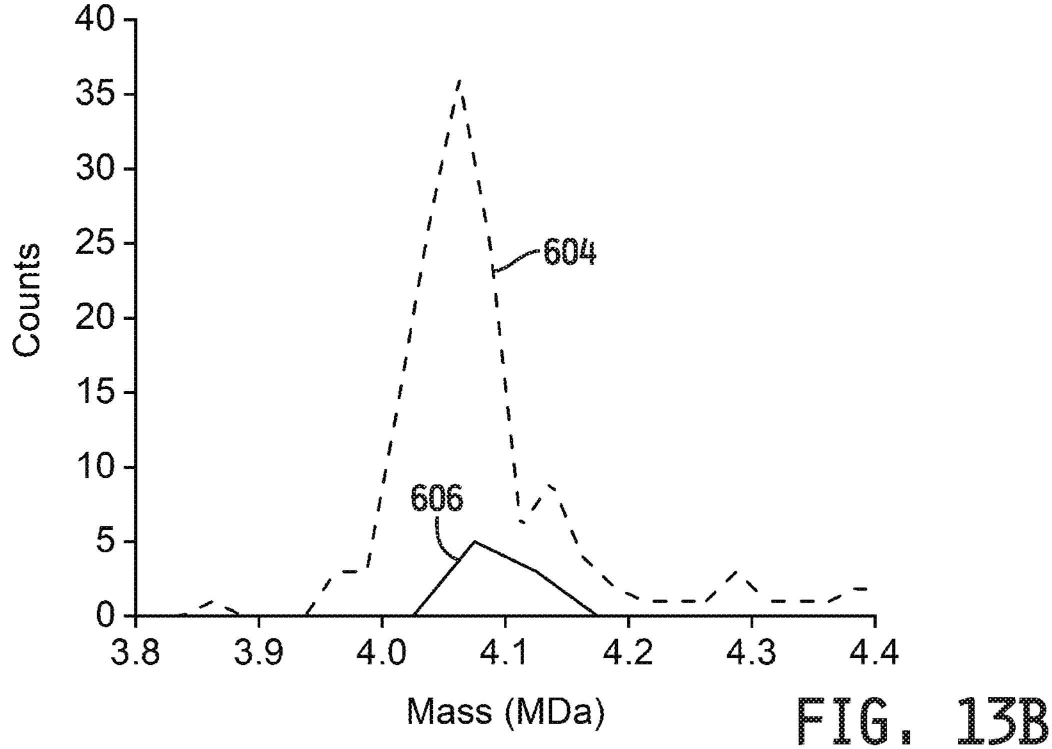
FIG. 13B shows plots similar to FIG. 13A but in which the HBV T=4 capsids have protein concentrations of 0.05 μg/mL and 0.5 μg/mL.

FIG. 13B shows another comparison of mass distributions between normal (non-pulsed) mode 606 and pulsed mode 604. In this case the normal mode distribution 606 was measured with a concentration of 0.5 μg/mL and the pulsed mode distribution 604 was measured with a concentration of 0.05 μg/mL. The normal mode distribution 606 contains 8 ions and the pulsed mode distribution 604 contains 145, so the intensity gain is 181 (taking into account the concentration difference).

The intensity gain depends on the trapping efficiency, the pulse width tw and the delay times tai and $t_{D2}$ (all depicted in FIG. 11). The signal from ions trapped in the ion trap 418 was found to persist for more than 20 seconds after the electrospray source 404 is turned off, indicating that ions are being efficiently trapped in the ion trap 418. If the pulse width $t_W$ is too short there is not enough time for ions to leave the ion trap 418. On the other hand, if the pulse width $t_W$ is too long the benefit of accumulating ions in the ion trap 418 is lost and the signal approaches the value for non-pulsed mode. The intensity gain from the pulsed mode of operation was found to average around 200, with the pulse width $t_W$ and the delay times tai and $t_{D2}$ optimized. For an m/z of 2800 Da, it should be noted that only around 1 ion in 620 can be trapped in the non-pulsed operating mode of the CDMS instrument 400. By operating in pulsed mode as described above, a large fraction of signal lost in non-pulsed mode can be recovered. With the pulsed mode of operation illustrated and described herein, the limit of detection for HBV T=4 capsids is around 200 times lower: $5.5\times10^{-13}$ moles/L or $3.3\times10^{8}$ particles/mL. This corresponds to around 0.7 attomoles or $4.3\times10^{5}$ particles for a 1.3 μL sample. The detection efficiency for HBV T=4 capsids with the pulsed mode of operation is around $4.4\times10^{-5}$ (i.e., 200 times the detection efficiency with non-pulsed mode).

With the high sensitivity afforded by pulsed mode CDMS it is relatively easy to simultaneously inject many ions into the ELIT. However, while it is feasible to analyze multiple ion trapping events and determine m/z values and charges for a few simultaneously trapped ions, ion-ion interactions within the ELIT 434 can cause trajectory and energy fluctuations which degrade the m/z resolving power. Because the trapping of multiple ions with similar m/z values can lead to errors in the data analysis, the measurements depicted in the attached figures were restricted to samples where, on average, one ion is trapped per trapping event. The distribution of trapped ions is a Poisson distribution and when the average trapping efficiency is around 1.0, roughly a third of the trapping events are empty, another third contain a single ion, and the remaining third contain two or more ions. For a sample concentration of 10 μg/mL the number of trapped ions in pulsed mode is much larger than one per event on average and the sample must be diluted for the measurements depicted in the attached figures to be performed.

Figure 14:
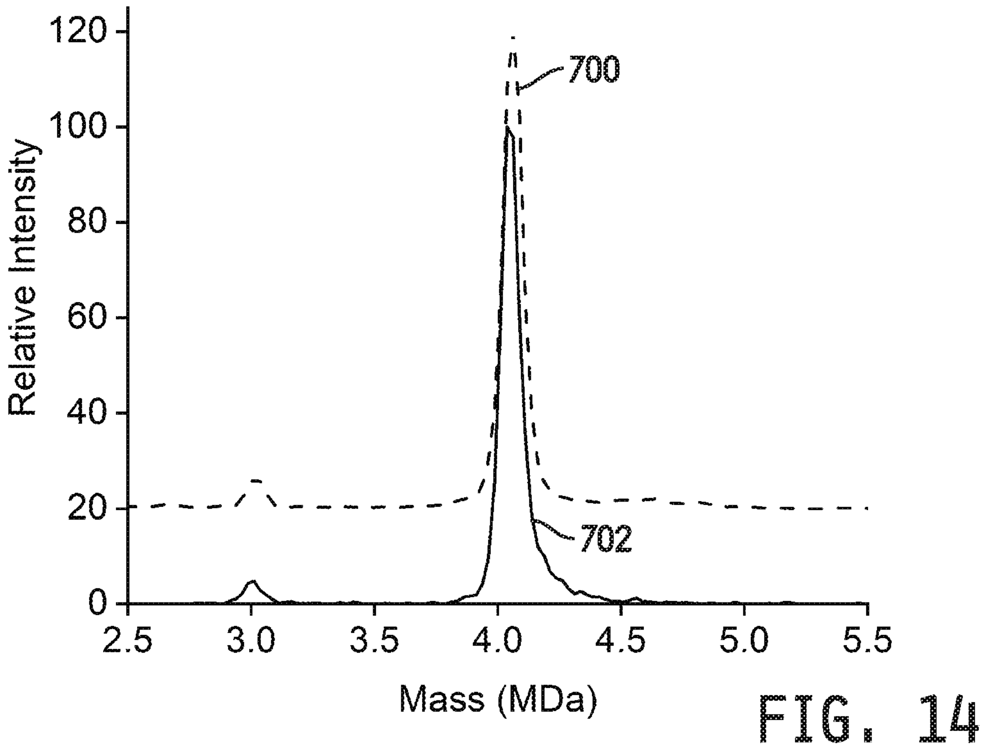
FIG. 14 shows plots of CDMS mass distributions measured by the instrument of FIG. 10 for HBV capsids with peaks due to the T=3 capsid at around 3.0 MDa and the T=4 capsid at 4.05 MDa, including distributions measured under normal (i.e., non-pulsed) operation of the instrument (with a protein concentration of 100 ug/ml) and measured under pulsed mode operation of the instrument (with a protein concentration of 1 ug/ml).

As noted above, assembly of the HBV capsid protein leads to a small amount of the smaller T=3 capsid in addition to the T=4. The average m/z for the T=4 ions is 28,700 Da and the average m/z for the T=3 ions is 25,500 Da. The ratio of these m/z values is 1.13 which falls within the range that can be trapped simultaneously. In this regard, FIG. 14 shows CDMS mass distributions 700, 702 for HBV measured using the CDMS instrument 400, showing the T=3 peak at around 3.0 MDa and the T=4 peak at 4.05 MDa. The distribution 702 was measured with the CDMS instrument 400 under normal operating conditions (i.e., non-pulsed), and the distribution 700 was measured with the CDMS instrument 400 operating in pulsed mode as described above. The HBV protein concentration was 100 μg/mL for non-pulsed (distribution 702) and 1 μg/mL for pulsed (distribution 700). The fraction of T=3 capsids (from the integrated counts) is 0.0435 in the normal mode distribution 702 and 0.0470 in the pulsed mode distribution 700. However, the detection efficiency in the normal mode distribution 702 is proportional to $(m/z)^{1/2}$ because larger m/z (i.e., slower) ions spend longer in the trappable region of the ELIT 434. In the pulsed mode operation of the CDMS instrument 400, all ions in the trappable region of the ELIT 434 are trapped and the detection efficiency for those ions does not depend on the m/z ratio. After correction of the normal mode ratio for the detection efficiencies, the ratio increases to 0.0461 (compared to 0.0470 for pulsed mode). Thus the intensity ratio is not significantly affected by the pulsed mode of operation.

Figure 15:
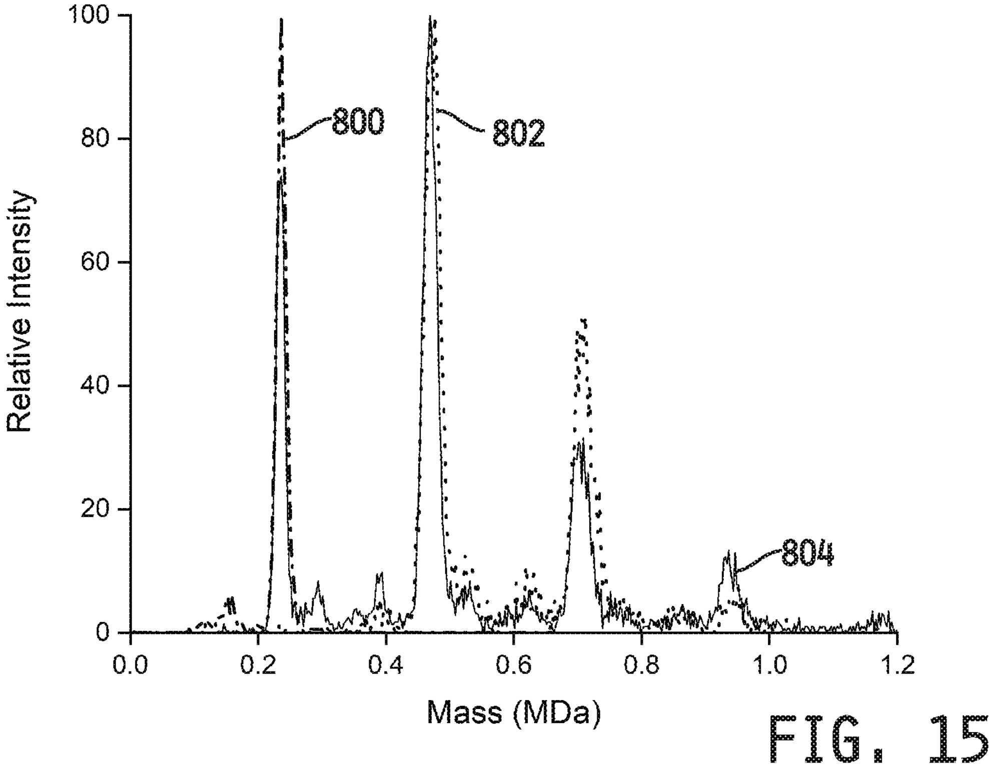
FIG. 15 shows plots of CDMS mass distributions measured by the instrument of FIG. 10 for a pyruvate kinase (PK) solution with peaks due to the PK tetramer (230 kDa), octamer (460 kDa), dodecamer (690 kDa) and hexadecamer (920 kDa), including a distribution measured under normal (i.e., non-pulsed) operation of the instrument, and including distributions measured under pulsed mode operation of the instrument, as described herein, with a delay time adjusted to transmit the tetramer and again adjusted to transmit the octamer and dodecamer.

If the m/z distribution is broader than the $m/z_{MIN}$ to $1.38\times m/z_{MIN}$ window described above, the total delay time $t_D$ can be adjusted to trap different portions of the distribution. FIG. 15, for example, shows CDMS mass distributions for a pyruvate kinase (PK) sample measured using the CDMS instrument 400. The mass distribution 804 was measured under normal (i.e., non-pulsed) conditions where peaks due to the PK tetramer (230 kDa), octamer (460 kDa), dodecamer (690 kDa) and hexadecamer (920 kDa) are evident. It is not possible to transmit all of the oligomers simultaneously in pulsed mode. However, by adjusting the delay time $t_D$ it is possible to transmit different m/z bands. The mass distribution 800 was measured in pulse mode with the delay time $t_D$ optimized to transmit m/z values that include the tetramer (m/z values ranging from around 6,600 Da to 9,150 Da were transmitted), and the mass distribution 802 was measured in pulse mode with the delay time $t_D$ optimized to transmit the octamer and dodecamer. In both cases, the ratios of the minimum and maximum mass-to-charge ratios transmitted are close to the value predicted above (1.38). The ability to select portions of the m/z distribution is valuable in a number of applications. Because individual ions are processed in CDMS, for example, it is beneficial to not spend time processing ions that do not contain useful information. Thus discrimination against portions of the m/z distribution that do not contain useful information, as just described, is valuable. Many samples contain a substantial number of low mass ions that could be discriminated against using this approach.

In the illustrated embodiment of the instrument 400 just described, the ion mass and charge detector 434 is provided in the form of a single-stage electrostatic linear ion trap (ELIT), although it will be understood that in other embodiments the ion mass and charge detector 434 may alternatively be provided in the form of a multi-stage ELIT, e.g., the ELIT 14 as described herein with respect to FIGS. 1-4E, or multiple single-stage ELITs, e.g., as described herein with respect to FIGS. 6-8F or, in some embodiments, one or more orbitraps, e.g., as disclosed in co-pending International Patent Application No. PCT/US2019/013278 described below. In the first two cases, operation of the instrument 400 may be modified consistently with the description of the systems 10, 200 set forth above to sequentially supply ions to each of the multiple ELITs or ELIT stages. In the case of the multi-stage ELIT of the type illustrated in FIGS. 1-4E and described above, it will be noted that each ELIT region (e.g., E1, E2 and E3) will be spaced a progressively greater distance away from the ion trap 418, such that the minimum and maximum mass-to-charge ratio values will be somewhat different for each. It will be further noted that the range of mass-to-charge ratios that can be trapped within each of the ELIT regions, as given by equation (4) above, will progressively decrease in value with increasing distances of the ELIT regions from the ion trap 418.

It will be understood that the dimensions of the various components of any of the ELITs and/or arrays 14, 205, 302, 434 illustrated in the attached figures and described above may illustratively be selected to establish a desired duty cycle of ion oscillation therein and/or within each ELIT or ELIT region E1-E3, corresponding to a ratio of time spent by the ion(s) in the respective charge detection cylinder(s) CD1-CD3 and a total time spent by the ion(s) traversing the combination of the corresponding ion mirrors and the respective charge detection cylinder(s) CD1-CD3 during one complete oscillation cycle. For example, a duty cycle of approximately 50% may be desirable in one or more of the ELITs or ELIT regions for the purpose of reducing noise in fundamental frequency magnitude determinations resulting from harmonic frequency components of the measure signals. Details relating to such dimensional considerations for achieving a desired duty cycle, e.g., such as 50%, are illustrated and described in co-pending International Patent Application No. PCT/US2019/013251, filed Jan. 11, 2019 and entitled ELECTROSTATIC LINEAR ION TRAP DESIGN FOR CHARGE DETECTION MASS SPECTROSCOPY, the disclosure of which is expressly incorporated herein by reference in its entirety.

It will be further understood that one or more charge calibration or resetting apparatuses may be used with the charge detection cylinder(s) of any one or more of the ELITs and/or arrays 14, 205, 302, 434 and/or in any one or more of the region(s) E1-E3 of the ELIT or ELIT array. An example of one such charge calibration or resetting apparatus is illustrated and described in co-pending International Patent Application Nos. PCT/US2019/013284, filed Jan. 11, 2019, and PCT/US2019/035381, filed Jun. 4, 2019, both entitled APPARATUS AND METHOD FOR CALIBRATING OR RESETTING A CHARGE DETECTOR, the disclosures of which are expressly incorporated herein by reference in their entireties.

It will be further understood that one or more charge detection optimization techniques may be used with any one or more of the ELITs and/or arrays 14, 205, 302, 434 and/or with one or more region(s) E1-E3 of such ELITs and/or ELIT array, e.g., for trigger trapping or other charge detection events. Examples of some such charge detection optimization apparatuses and techniques are illustrated and described in co-pending International Patent Application No. PCT/US2019/013280, filed Jan. 11, 2019 and entitled APPARATUS AND METHOD FOR CAPTURING IONS IN AN ELECTROSTATIC LINEAR ION TRAP, the disclosure of which is expressly incorporated herein by reference in its entirety.

It will be further still understood that one or more ion source optimization apparatuses and/or techniques may be used with one or more embodiments of the ion source 12 illustrated and described herein, some examples of which are illustrated and described in co-pending International Patent Application Nos. PCT/US2019/013274, filed Jan. 11, 2019, and PCT/US2019/035379, filed Jun. 4, 2019, both entitled HYBRID ION FUNNEL-ION CARPET (FUNPET) ATMOSPHERIC PRESSURE INTERFACE FOR CHARGE DETECTION MASS SPECTROMETRY, the disclosures of which are expressly incorporated herein by reference in their entireties.

It will be still further understood that any of ion mass detection systems 10, 60, 80, 200, 300, 400 illustrated and described herein may be implemented in accordance with real-time analysis and/or real-time control techniques, some examples of which are illustrated and described in co-pending International Patent Application No. PCT/US2019/013277, filed Jan. 11, 2019 and entitled CHARGE DETECTION MASS SPECTROMETRY WITH REAL TIME ANALYSIS AND SIGNAL OPTIMIZATION, the disclosure of which is expressly incorporated herein by reference in its entirety.

It will be further understood that any of the ion mass detection systems 10, 60, 80, 200, 300, 400 illustrated and described herein may be configured to supply multiple ions to any one or more of the ELITs and/or arrays 14, 205, 302, 434 illustrated and described herein such that one or more of such ELITs and/or ELIT arrays is operable to measure mass and charge of multiple ions at a time, some examples of which are illustrated and described in co-pending International Patent Application No. PCT/US2019/013285, filed Jan. 11, 2019 and entitled APPARATUS AND METHOD FOR SIMULTANEOUSLY ANALYZING MULTIPLE IONS WITH AN ELECTROSTATIC LINEAR ION TRAP, the disclosure of which is expressly incorporated herein by reference in its entirety.

It will be still further understood that in one or more of the ion mass detection systems 10, 60, 80, 200, 300, 400 illustrated and described herein, at least one ELIT may alternatively be provided in the form of an orbitrap, some examples of which are illustrated and described in co-pending International Patent Application No. PCT/US2019/013278, filed Jan. 11, 2019 and entitled ORBITRAP FOR SINGLE PARTICLE MASS SPECTROMETRY, the disclosure of which is expressly incorporated herein by reference in its entirety.

It will be further understood that the CDMS instrument 400 may additionally be included as an embodiment of the ion mass detection system illustrated in FIG. 5A and described above (i.e., as an alternative to the ion mass detection systems 10, 200, 300). It will likewise be understood that the CDMS instrument 400 may additionally be included as an embodiment of the ion mass detection system illustrated in FIG. 5B and described above, (i.e., as an alternative to the ion mass detection systems 10, 200, 300).

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A charge detection mass spectrometer, comprising:

an ion source configured to generate ions from a sample, at least one voltage source configured to produce a plurality of output voltages, an ion trap coupled to a first set of the plurality of output voltages and configured to be responsive a trapping state thereof to receive and store the generated ions therein and to a transmission state thereof to selectively release stored ions therefrom, an electrostatic linear ion trap (ELIT) spaced apart from the ion trap, the ELIT including front and rear ion mirrors and a charge detection cylinder positioned therebetween, the front and rear ion mirrors each coupled to second and third sets respectively of the plurality of output voltages and configured to be responsive to transmission states thereof to transmit ions therethrough and to reflection states thereof to reflect ions entering therein from the charge detection cylinder back into the charge detection cylinder, and processing circuitry for controlling the first set of voltages to the transmission state thereof to cause the ion trap to release at least some of the stored ions therefrom to travel toward and into the ELIT via the front ion mirror, and to thereafter control the third set of voltages, followed by the second set of voltages, to the reflection states thereof to trap at least one of the ions traveling therein and cause the trapped at least one ion to oscillate back and forth between the front and rear ion mirrors each time passing through and inducing a corresponding charge on the charge detection cylinder, wherein the processing circuitry is configured to control the first set of voltages from the trapping state to the transmission state thereof for a pulse width duration, and to be responsive to expiration of the pulse width duration to control the first set of voltages from the transmission state to the trapping state thereof, wherein the processing circuitry is configured to control the third set of voltages from the transmission state to the reflection state thereof upon expiration of a first delay time from control of the first set of voltages from the trapping state to the transmission state thereof, and to control the second set of voltages from the transmission state to the reflection state thereof upon expiration of a second delay time from control of the third set of the plurality of voltages from the transmission state to the reflection state, wherein minimum and maximum values of mass-to-charge ratio of the at least one ion trapped in the ELIT is proportional to a sum of the first and second delay times, and the sum of the first and second delay times is controlled by the processing circuit to select corresponding minimum and maximum mass-to-charge ratio values of ions to trap in the ELIT.

2. The charge detection mass spectrometer of claim 1, further comprising a charge sensitive amplifier having an input coupled to the charge detection cylinder and an output, the amplifier responsive to detection of charges induced on the charge detection cylinder by the ion passing therethrough to produce charge detection signals at the output thereof, wherein the processing circuitry is configured to process a plurality of the charge detection signals to determine therefrom a mass and a charge of the trapped at least one ion.

3. The charge detection mass spectrometer of claim 1, further comprising a mass-to-charge ratio filter positioned between the ion trap and the ELIT, the mass-to-charge ratio filter configured to pass therethrough only ions having mass-to-charge ratios above a mass-to-charge ratio threshold, below a mass-to-charge ratio threshold or within a selected range of mass-to-charge ratios.

4. A method of operating a charge detection mass spectrometer including an electrostatic linear ion trap (ELIT) having a charge detection cylinder positioned between front and rear ion mirrors and an ion trap spaced apart from the front ion mirror, the method comprising:

generating ions from a sample, storing the generated ions in the ion trap, controlling the ion trap to release at least some of the stored ions therefrom and travel toward and into the ELIT via the front ion mirror, after controlling the ion trap to release stored ions, controlling the rear ion mirror to a reflection state in which the rear ion mirror reflects ions entering therein from the charge detection cylinder back through the charge detection cylinder and toward the front ion mirror, and after controlling the rear ion mirror to the reflection state thereof, controlling the front ion mirror to a reflection state in which the front ion mirror reflects ions entering therein from the charge detection cylinder back through the charge detection cylinder and toward the rear ion mirror to trap in the ELIT at least one of the ions released from the ion trap such that the trapped at least one ion oscillates between the front and rear ion mirrors each time passing through and inducing a corresponding charge on the charge detection cylinder, wherein a range of mass-to-charge ratios of ions trappable within the ELIT is a function of a distance between the ion trap and the ELIT and on internal axial dimensions of the ELIT.

5. The method of claim 4, further comprising processing, with a processor, detections of a plurality of the induced charges to determine therefrom a mass and a charge of the trapped at least one ion.

6. The method of claim 4, further comprising filtering the ions released from the ion trap, prior to the at least some of the stored ions travelling into the ELIT via the front ion mirror, to pass into the ELIT only ions having mass-to-charge ratios above or below a mass-to-charge ratio threshold or having mass-to-charge ratios within a selected range of mass-to-charge ratios.

7. The method of claim 4, further comprising configuring the spectrometer for trapping of a selected range of ion mass-to-charge ratios within the ELIT by establishing a corresponding distance between the ion trap and the ELIT.

8. The method of claim 4, wherein the rear ion mirror is controlled to the reflection state at a first delay time after controlling the ion trap to release stored ions, wherein the front ion mirror is controlled to the reflection state at a second delay time after controlling the rear ion mirror to the reflection state, and wherein the method further comprises controlling a sum of the first and second delay times to select minimum and maximum values of ion mass-to-charge within the selected range of mass-to-charge ratios of ions trappable within the ELIT.

9. A charge detection mass spectrometer, comprising:

an ion source configured to generate ions from a sample, an ion trap configured to receive and store the generated ions therein and to selectively release stored ions therefrom, an electrostatic linear ion trap (ELIT) spaced apart from the ion trap, the ELIT including first and second ion mirrors and a charge detection cylinder positioned therebetween, and means for selectively controlling the ion trap to release at least some of the stored ions therefrom to travel toward and into the ELIT, and for controlling the first and second ion mirrors in a manner which traps in the ELIT at least one of the ions traveling therein and causes the trapped at least one ion to oscillate back and forth between the first and second ion mirrors each time passing through and inducing a corresponding charge on the charge detection cylinder, wherein the first ion mirror faces the ion trap, an ion exit of the ion trap is spaced apart by a first distance from a first end of the charge detection cylinder facing the first ion mirror, and a length of the charge detection cylinder between the first end thereof and a second end of the charge detection cylinder facing the second ion mirror defines a second distance, the first and second distances selected to define a range of mass-to-charge ratio values of ions trappable within the ELIT.

10. The charge detection mass spectrometer of claim 9, further comprising: a charge sensitive amplifier having an input coupled to the charge detection cylinder and an output, the amplifier responsive to detection of charges induced on the charge detection cylinder by the at least one ion passing therethrough to produce charge detection signals at the output thereof, and processing circuitry configured to process a plurality of the charge detection signals to determine therefrom a mass and a charge of the at least one trapped ion.

11. The charge detection mass spectrometer of claim 9, further comprising a mass-to-charge ratio filter positioned between the ion trap and the ELIT, the mass-to-charge ratio filter configured to pass therethrough only ions having mass-to-charge ratios above a mass-to-charge ratio threshold, below a mass-to-charge ratio threshold or within a selected range of mass-to-charge ratios.

12. The charge detection mass spectrometer of claim 9, wherein the means for selectively controlling the ion trap includes processing circuitry configured to control the first set of voltages from the trapping state to the transmission state thereof for a pulse width duration, and to be responsive to expiration of the pulse width duration to control the first set of voltages from the transmission state to the trapping state thereof.

13. The charge detection mass spectrometer of claim 12, wherein the processing circuitry is configured to control the third set of voltages from the transmission state to the reflection state thereof upon expiration of a first delay time from control of the first set of voltages from the trapping state to the transmission state thereof, wherein the processing circuitry is configured to control the second set of voltages from the transmission state to the reflection state thereof upon expiration of a second delay time from control of the third set of the plurality of voltages from the transmission state to the reflection state, and wherein a sum of the first and second delay times is controlled by the processing circuit to select minimum and maximum values of ion mass-to-charge within the selected range of mass-to-charge ratios of ions to trap in the ELIT.

14. The method of claim 4, further comprising selecting a first distance between an ion exit of the ion trap and an end of the charge detection cylinder facing the front ion mirror of the ELIT, and a second distance between opposite ends of the charge detection cylinder, to establish the range of mass-to-charge ratios of ions trappable within the ELIT.

15. A method of operating a charge detection mass spectrometer including an electrostatic linear ion trap (ELIT) having a charge detection cylinder positioned between front and rear ion mirrors and an ion trap spaced apart from the front ion mirror, the method comprising:

generating ions from a sample, storing the generated ions in the ion trap, controlling the ion trap to release at least some of the stored ions therefrom and travel toward and into the ELIT via the front ion mirror, at a first delay time after controlling the ion trap to release stored ions, controlling the rear ion mirror to a reflection state in which the rear ion mirror reflects ions entering therein from the charge detection cylinder back through the charge detection cylinder and toward the front ion mirror, and at a second delay time after controlling the rear ion mirror to the reflection state thereof, controlling the front ion mirror to a reflection state in which the front ion mirror reflects ions entering therein from the charge detection cylinder back through the charge detection cylinder and toward the rear ion mirror to trap in the ELIT at least one of the ions released from the ion trap such that the trapped at least one ion oscillates between the front and rear ion mirrors each time passing through and inducing a corresponding charge on the charge detection cylinder, wherein minimum and maximum mass-to-charge ratio values of ions trappable within the ELIT is proportional to a sum of the first and second delay times.

16. The method of claim 15, further comprising processing, with a processor, detections of a plurality of the induced charges to determine therefrom a mass and a charge of the trapped at least one ion.

17. The method of claim 15, further comprising filtering the ions released from the ion trap, prior to the at least some of the stored ions travelling into the ELIT via the front ion mirror, to pass into the ELIT only ions having mass-to-charge ratios above or below a mass-to-charge ratio threshold or having mass-to-charge ratios within a selected range of mass-to-charge ratios.

* * * * *